United States Patent
Choi et al.

(10) Patent No.: US 12,464,129 B2
(45) Date of Patent: *Nov. 4, 2025

(54) ENCODING METHOD AND APPARATUS THEREFOR, AND DECODING METHOD AND APPARATUS THEREFOR

(71) Applicant: SAMSUNG ELECTRONICS CO., LTD., Suwon-si (KR)

(72) Inventors: Narae Choi, Suwon-si (KR); Minwoo Park, Suwon-si (KR); Minsoo Park, Suwon-si (KR); Seungsoo Jeong, Suwon-si (KR); Kiho Choi, Suwon-si (KR); Woongil Choi, Suwon-si (KR); Anish Tamse, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 234 days.

This patent is subject to a terminal disclaimer.

(21) Appl. No.: 18/328,503

(22) Filed: Jun. 2, 2023

(65) Prior Publication Data

US 2023/0319283 A1    Oct. 5, 2023

Related U.S. Application Data

(63) Continuation of application No. 17/251,305, filed as application No. PCT/KR2019/006989 on Jun. 11, 2019, now Pat. No. 11,722,673.

(Continued)

(51) Int. Cl.
  *H04N 19/105* (2014.01)
  *H04N 19/132* (2014.01)
  (Continued)

(52) U.S. Cl.
  CPC ......... *H04N 19/132* (2014.11); *H04N 19/105* (2014.11); *H04N 19/159* (2014.11);
  (Continued)

(58) Field of Classification Search
  CPC ..... H04N 19/11; H04N 19/105; H04N 19/593
  See application file for complete search history.

(56) References Cited

U.S. PATENT DOCUMENTS 10,666,937 B2 *   5/2020   Zhao ................. H04N 19/129
10,721,492 B2 *   7/2020   Son .................... H04N 19/176
(Continued)

FOREIGN PATENT DOCUMENTS

CA        3005417 A1    5/2017
CN       111543054 A    8/2020
(Continued)

OTHER PUBLICATIONS

Multiple line based Intra prediction; Li—2016; (Year: 2016).*
(Continued)

*Primary Examiner* — Luis Perez-Fuentes
(74) *Attorney, Agent, or Firm* — Sughrue Mion, PLLC

(57) ABSTRACT

Provided is a video decoding method including: obtaining, from a bitstream, intra prediction mode information indicating an intra prediction mode of a current block; determining an interpolation filter set to be used in prediction of the current block, based on at least one of a size of the current block and the intra prediction mode indicated by the intra prediction mode information; determining a reference location to which a current sample of the current block refers according to the intra prediction mode; determining, in the interpolation filter set, an interpolation filter that corresponds to the reference location; determining a prediction value of the current sample, according to reference samples of the current block and the interpolation filter; and recon- (Continued)

structing the current block, based on the prediction value of the current sample.

3 Claims, 28 Drawing Sheets

Related U.S. Application Data

(60) Provisional application No. 62/699,363, filed on Jul. 17, 2018, provisional application No. 62/683,163, filed on Jun. 11, 2018.

(51) Int. Cl.
*H04N 19/159* (2014.01)
*H04N 19/176* (2014.01)
*H04N 19/46* (2014.01)
*H04N 19/80* (2014.01)

(52) U.S. Cl.
CPC .......... *H04N 19/176* (2014.11); *H04N 19/46* (2014.11); *H04N 19/80* (2014.11)

(56) References Cited

U.S. PATENT DOCUMENTS

| | | | | |
|---|---|---|---|---|
| 10,834,386 B2 * | 11/2020 | Lee | ................. | H04N 19/11 |
| 11,438,582 B2 * | 9/2022 | Lee | ................. | H04N 19/159 |
| 11,695,930 B2 * | 7/2023 | Choi | ................. | H04N 19/176 |
| | | | | 375/240.02 |
| 11,722,673 B2 * | 8/2023 | Choi | ................. | H04N 19/159 |
| | | | | 375/240.02 |
| 2012/0147967 A1 | 6/2012 | Panchal et al. | | |
| 2013/0051463 A1 | 2/2013 | Minoo et al. | | |
| 2014/0226912 A1 | 8/2014 | Lee et al. | | |
| 2014/0233545 A1 | 8/2014 | Ferguson-Jarnes et al. | | |
| 2014/0233646 A1 | 8/2014 | Matsuo et al. | | |
| 2016/0373769 A1 | 12/2016 | Zhao et al. | | |
| 2019/0174128 A1 | 6/2019 | Jang et al. | | |
| 2019/0238842 A1 | 8/2019 | Ryu et al. | | |
| 2020/0137404 A1 | 4/2020 | Yoo et al. | | |
| 2020/0236352 A1 | 7/2020 | Lee et al. | | |
| 2021/0176494 A1 | 6/2021 | Lee et al. | | |

FOREIGN PATENT DOCUMENTS

| | | |
|---|---|---|
| KR | 10-2011-0113592 A | 10/2011 |
| KR | 10-1769574 B1 | 8/2017 |
| KR | 10-2018-0039324 A | 4/2018 |
| WO | 2018/030599 A1 | 2/2018 |
| WO | 2018/062880 A1 | 4/2018 |
| WO | 2019/209028 A1 | 10/2019 |

OTHER PUBLICATIONS

Multiple modes intra prediction in Intra coding; Zhang—2004; (Year: 2004).*

Office Action dated May 2, 2023, issued by European Patent Office for European Application No. 19819658.6.

Office Action dated Apr. 30, 2023, issued by Israeli Patent Office for Israeli Application No. 279326.

Communication dated Sep. 20, 2022, issued by the India Intellectual Property Office in Indian Patent Application No. 202027057283.

Communication dated Apr. 27, 2022 issued by the Korean Intellectual Property Office in counterpart Korean Patent Application No. 10-2020-7028110.

Communication dated Mar. 17, 2022 issued by the European Patent Office in European Patent Application No. 19819658.6.

Choi (Samsung) N et al, CE 3, Results on Multiple 4-tap filter (Test 3.3.1), No. JVET -L0052, Sep. 25, 2018, XP30193743A.

Communication dated Sep. 20, 2019 issued by the International Searching Authority in counterpart Application No. PCT/KR2019/006989 (PCT/ISA/220, PCT/ISA/210, and PCT/ISA/237).

Geert Van der Auwera, Jin Heo, and Alexey Filippov, "Description of Core Experiment 3: Intra Prediction and Mode Coding", Joint Video Experts Team (JVET) of ITU-T SG 16 WP 3 and ISO/IEC JTC 1/SC 29/WG 11, Document: JVET-J1023_r2, May 13, 2018, 51 pages total.

Communication issued on Mar. 27, 2024 by the Intellectual Property Office of Vietnam in corresponding Vietnamese Application No. 1-2021-00130.

Communication dated Dec. 11, 2024, issued by the European Patent Office in European Application No. 19819658.6.

Office Action dated Jun. 24, 2024, issued by Indian Intellectual Property Office for Indian Application No. 202328018961.

Office Action dated Jun. 24, 2024, issued by Indian Intellectual Property Office for Indian Application No. 202328018949.

Office Action dated Jun. 24, 2024, issued by Indian Intellectual Property Office for Indian Application No. 202328018974.

Office Action dated Jun. 24, 2024, issued by Indian Intellectual Property Office for Indian Application No. 202328019087.

Communication dated Mar. 27, 2025, issued by Intellectual Property India in Indian Application No. 202328018961.

* cited by examiner

FIG. 12

| BLOCK SHAPE / DEPTH | 0: SQUARE | 1: NS_VER | 2: NS_HOR |
|---|---|---|---|
| DEPTH D | 1200 | 1210 | 1220 |
| DEPTH D+1 | 1202 | 1212 | 1222 |
| DEPTH D+2 | 1204 | 1214 | 1224 |
| ... | ... | ... | ... |

ENCODING METHOD AND APPARATUS THEREFOR, AND DECODING METHOD AND APPARATUS THEREFOR

CROSS-REFERENCE TO RELATED APPLICATIONS

This is Continuation of U.S. application Ser. No. 17/251,305 filed Dec. 11, 2020, which is a National Stage of International Application No. PCT/KR2019/006989 filed Jun. 11, 2019, claiming priority based on U.S. Provisional Application Nos. 62/683,163 and 62/699,363 filed Jun. 11, 2018 and Jul. 17, 2018, the contents of all of which are incorporated herein by reference in their entirety.

TECHNICAL FIELD

The disclosure relates to a video encoding method and a video decoding method, and more particularly, to methods of efficiently encoding and decoding a video according to an intra prediction method.

BACKGROUND ART

A high quality video requires a large amount of data for encoding. However, there is a limit in a bandwidth available to transmit video data, and thus, a data rate to be applied to transmission of the video data may be limited. Accordingly, in order to efficiently transmit the video data, there is a demand for video data encoding and decoding methods with minimal degradation of image quality and increased compression rates.

Video data may be compressed by removing spatial redundancy and temporal redundancy between pixels. Pixels adjacent to each other generally have common characteristics, and thus, in order to remove redundancy between the adjacent pixels, encoding information is transmitted in a data unit consisting of pixels.

Pixel values of the pixels included in the data unit are not directly transmitted, and a method required for obtaining the pixel values is transmitted. A prediction method of predicting a pixel value similar to an original value is determined for each data unit, and encoding information about the prediction method is transmitted from an encoder to a decoder. Also, because a prediction value is not entirely equal to the original value, residual data of a difference between the original value and the prediction value is transmitted from the encoder to the decoder.

As the accuracy of prediction increases, encoding information required to specify a prediction method increases but a size of residual data decreases. Thus, the prediction method is determined based on the encoding information and the size of the residual data. In particular, data units split from a picture have various sizes, and as a size of a data unit increases, the likelihood of the accuracy of prediction decreasing increases whereas encoding information decreases. Thus, a size of a block is determined in accordance with characteristics of the picture.

Also, prediction methods include into intra prediction and inter prediction. The intra prediction refers to a method of predicting pixels of a block from adjacent pixels of the block. The inter prediction refers to a method of predicting pixels by referring to pixels of another picture, which are referred to by a picture including a block. Thus, spatial redundancy is removed according to the intra prediction, and temporal redundancy is removed according to the inter prediction.

As the number of prediction methods is increased, a size of encoding information for indicating the prediction methods is increased. Thus, the size of the encoding information to be applied to the block may be decreased by predicting the encoding information from another block.

A loss of video data is allowed to the extent that human eyes cannot recognize the loss, and thus, the amount of residual data can be decreased by performing lossy compression on the residual data in transformation and quantization processes.

DESCRIPTION OF EMBODIMENTS

Technical Problem

Provided are a video encoding method and a video encoding apparatus that perform video encoding according to an intra prediction method with respect to a block. Also provided are a video decoding method and a video decoding apparatus that perform video decoding according to an intra prediction method with respect to a block. Also provided is a computer-readable recording medium having recorded thereon a program for executing a video encoding method and a video decoding method, according to an embodiment of the disclosure, on a computer.

Technical Solution to Problem

In the disclosure, provided is a video decoding method including: obtaining, from a bitstream, intra prediction mode information indicating an intra prediction mode of a current block; determining an interpolation filter set to be used in prediction of the current block, based on at least one of a size of the current block and the intra prediction mode indicated by the intra prediction mode information; determining a reference location to which a current sample of the current block refers according to the intra prediction mode; determining, in the interpolation filter set, an interpolation filter that corresponds to the reference location; determining a prediction value of the current sample, according to reference samples of the current block and the interpolation filter; and reconstructing the current block, based on the prediction value of the current sample.

In the disclosure, provided is a video decoding method including: obtaining, from a bitstream, intra prediction mode information of a current block; based on the intra prediction mode information of the current block, determining an intra prediction mode of the current block; when the intra prediction mode of the current block is an angular intra prediction mode, determining an intra prediction direction of the current block which corresponds to the intra prediction mode of the current block, based on a height and a width of the current block; obtaining a prediction block of the current block by intra predicting the current block according to the intra prediction direction of the current block; and reconstructing the current block, based on the prediction block, and wherein the determining of the intra prediction direction of the current block includes: when the current block has a square shape where the width and the height are equal, determining a first intra prediction direction candidate, which is indicated by the intra prediction mode, to be the intra prediction direction of the current block, from among a plurality of first intra prediction direction candidates set based on the square shape; and when the current block has a non-square shape where the width and the height are not equal, determining a second intra prediction direction candidate, which is indicated by the intra prediction mode, to be the intra prediction direction of the current block, from among a plurality of second intra prediction direction candidates set based on the non-square shape.

In the disclosure, provided is a video decoding apparatus including: a memory storing an instruction for performing video decoding; and a processor configured to execute the instruction, wherein the processor is further configured to, according to the instruction, obtain, from a bitstream, intra prediction mode information indicating an intra prediction mode of a current block, determine an interpolation filter set to be used in prediction of the current block, based on at least one of a size of the current block and the intra prediction mode indicated by the intra prediction mode information, determine a reference location to which a current sample of the current block refers according to the intra prediction mode, determine, in the interpolation filter set, an interpolation filter that corresponds to the reference location, determine a prediction value of the current sample by interpolating reference samples of the current block according to the interpolation filter, and reconstruct the current block, based on the prediction value of the current sample.

In the disclosure, provided is a video decoding apparatus including: a memory storing an instruction for performing video decoding; and a processor configured to execute the instruction, wherein the processor is further configured to, according to the instruction, obtain, from a bitstream, intra prediction mode information of a current block, based on the intra prediction mode information of the current block, determine an intra prediction mode of the current block, when the intra prediction mode of the current block is an angular intra prediction mode, determine an intra prediction direction of the current block which corresponds to the intra prediction mode of the current block, based on a height and a width of the current block, obtain a prediction block of the current block by intra predicting the current block according to the intra prediction direction of the current block, and reconstruct the current block, based on the prediction block, and when the current block has a square shape where the width and the height are equal, the intra prediction direction of the current block is determined to be a first intra prediction direction candidate indicated by the intra prediction mode, from among a plurality of first intra prediction direction candidates set based on the square shape, and when the current block has a non-square shape where the width and the height are not equal, the intra prediction direction of the current block is determined to be a second intra prediction direction candidate indicated by the intra prediction mode, from among a plurality of second intra prediction direction candidates set based on the non-square shape.

In the disclosure, provided is a video encoding method including: determining an intra prediction mode of a current block according to prediction accuracy of the current block; and outputting a bitstream including intra prediction mode information indicating the intra prediction mode of the current block, and wherein the determining of the intra prediction mode of the current block according to the prediction accuracy of the current block includes: determining an interpolation filter set to be used in prediction of the current block, based on at least one of a size and the intra prediction mode of the current block; determining a reference location to which a current sample of the current block refers, according to the intra prediction mode; determining, in the interpolation filter set, an interpolation filter that corresponds to the reference location; determining a prediction value of the current sample by interpolating reference samples of the current block according to the interpolation filter; and determining the prediction accuracy of the current block according to the intra prediction mode, based on the prediction value of the current sample.

In the disclosure, provided is a video encoding method including: determining intra prediction direction candidates applicable to a current block, based on a width and a height of the current block; determining an intra prediction mode of the current block, based on prediction accuracies of prediction blocks according to the intra prediction direction candidates; and outputting a bitstream including intra prediction mode information indicating the intra prediction mode of the current block, and wherein the determining of the intra prediction direction candidates includes, when the current block has a square shape where the width and the height are equal, determining a plurality of first intra prediction direction candidates set based on the square shape, and when the current block has a non-square shape where the width and the height are not equal, determining a plurality of second intra prediction direction candidates including a plurality of intra prediction directions set based on the non-square shape.

In the disclosure, provided is a video encoding apparatus including: a memory storing an instruction for performing video encoding; and a processor configured to execute the instruction, wherein the processor is further configured to, according to the instruction, determine an intra prediction mode of a current block according to prediction accuracy of the current block, and output a bitstream including intra prediction mode information indicating the intra prediction mode of the current block, and wherein the prediction accuracy of the intra prediction mode of the current block is determined by determining an interpolation filter set to be used in prediction of the current block, based on at least one of a size and the intra prediction mode of the current block, determining a reference location to which a current sample of the current block refers, according to the intra prediction mode, determining, in the interpolation filter set, an interpolation filter that corresponds to the reference location, determining a prediction value of the current sample by interpolating reference samples of the current block according to the interpolation filter, and determining the prediction accuracy of the current block, based on the prediction value of the current sample.

In the disclosure, provided is a video encoding apparatus including: a memory storing an instruction for performing video encoding; and a processor configured to execute the instruction, wherein the processor is further configured to, according to the instruction, determine intra prediction direction candidates applicable to a current block, based on a width and a height of the current block, determine an intra prediction mode of the current block, based on prediction accuracies of prediction blocks according to the intra prediction direction candidates, and output a bitstream including intra prediction mode information indicating the intra prediction mode of the current block, and wherein, when the current block has a square shape where the width and the height are equal, the intra prediction direction candidates includes a plurality of first intra prediction direction candidates set based on the square shape, and when the current block has a non-square shape where the width and the height are not equal, the intra prediction direction candidates includes a plurality of second intra prediction direction candidates including a plurality of intra prediction directions set based on the non-square shape.

The disclosure provides a computer-recordable recording medium having recorded thereon a program for executing the video encoding method and the video decoding method.

The technical problems of the present embodiment are not limited to the aforementioned technical problems, and other unstated technical problems may be inferred from embodiments below.

Advantageous Effects of Disclosure

An interpolation filter set that is appropriate for intra prediction of a block is selected from among a plurality of interpolation filter sets including a sharp filter set, a smoothing filter set, and the like. Efficiency of intra prediction may be improved by using an interpolation filter set appropriate for the intra prediction. Furthermore, a prediction direction according to an intra prediction mode of a current block is determined based on a shape of the current block, such that efficiency of intra prediction may be improved.

BRIEF DESCRIPTION OF DRAWINGS

FIG. 12 illustrates a process of determining a depth of a coding unit as a shape and a size of the coding unit change, when the coding unit is recursively split such that a plurality of coding units are determined according to an embodiment.

BEST MODE

Figure 1A:
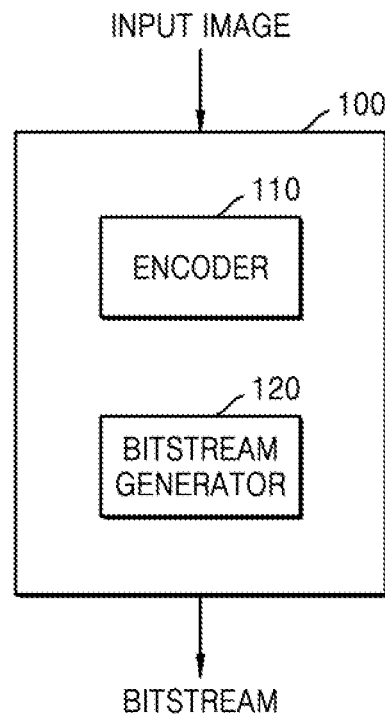
FIG. 1A is a block diagram of an image encoding apparatus based on coding units having a tree structure according to an embodiment of the disclosure.

In the disclosure, provided is a video decoding method including: obtaining, from a bitstream, intra prediction mode information indicating an intra prediction mode of a current block; determining an interpolation filter set to be used in prediction of the current block, based on at least one of a size of the current block and the intra prediction mode indicated by the intra prediction mode information; determining a reference location to which a current sample of the current block refers according to the intra prediction mode; determining, in the interpolation filter set, an interpolation filter that corresponds to the reference location; determining a prediction value of the current sample, according to reference samples of the current block and the interpolation filter; and reconstructing the current block, based on the prediction value of the current sample.

In the disclosure, provided is a video decoding method including: obtaining, from a bitstream, intra prediction mode information of a current block; based on the intra prediction mode information of the current block, determining an intra prediction mode of the current block; when the intra prediction mode of the current block is an angular intra prediction mode, determining an intra prediction direction of the current block which corresponds to the intra prediction mode of the current block, based on a height and a width of the current block; obtaining a prediction block of the current block by intra predicting the current block according to the intra prediction direction of the current block; and reconstructing the current block, based on the prediction block, and wherein the determining of the intra prediction direction of the current block includes: when the current block has a square shape where the width and the height are equal, determining a first intra prediction direction candidate, which is indicated by the intra prediction mode, to be the intra prediction direction of the current block, from among a plurality of first intra prediction direction candidates set based on the square shape; and when the current block has a non-square shape where the width and the height are not equal, determining a second intra prediction direction candidate, which is indicated by the intra prediction mode, to be the intra prediction direction of the current block, from among a plurality of second intra prediction direction candidates set based on the non-square shape.

Mode of Disclosure

Advantages and features of embodiments and methods of accomplishing the same may be understood more readily by reference to the embodiments and the accompanying drawings. In this regard, the disclosure may have different forms and should not be construed as being limited to the embodiments set forth herein. Rather, these embodiments are provided so that this disclosure will be thorough and complete and will fully convey the concept of the disclosure to one of ordinary skill in the art.

The terms used in the specification will be briefly defined, and the embodiments will be described in detail.

All terms including descriptive or technical terms which are used in the specification should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Therefore, the terms used in the disclosure should not be interpreted based on only their names but have to be defined based on the meaning of the terms together with the descriptions throughout the specification.

In the following specification, the singular forms include plural forms unless the context clearly indicates otherwise.

When a part "includes" or "comprises" an element, unless there is a particular description contrary thereto, the part may further include other elements, not excluding the other elements. The term "unit" used herein refers to a software component or a hardware component such as a field-programmable gate array (FPGA) or an application-specific integrated circuit (ASIC), which performs certain tasks. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

The term "current block" refers to one of a coding unit, a prediction unit, and a transform unit which are currently to be encoded or decoded. For convenience of descriptions, a "current coding unit", a "current prediction unit", and a "current transform unit" may be used when other types of blocks such as a prediction unit and a transform unit need to be distinguished from one another. In addition, the term "lower block" refers to a data unit split from the "current block". The term "upper block" refers to a data unit including the "current block".

Also, the term "sample" used herein refers to data that is allocated to a sampling location of an image and is to be processed. For example, pixel values of an image in a spatial domain or transform coefficients in a transform domain may be samples. A unit including at least one sample may be defined as a block.

The disclosure will now be described more fully with reference to the accompanying drawings for one of ordinary skill in the art to be able to perform the disclosure without any difficulty. In addition, portions irrelevant to the descriptions of the disclosure will be omitted in the drawings for clear descriptions of the disclosure.

FIG. 1A is a block diagram of an image encoding apparatus 100 based on coding units having a tree structure according to an embodiment of the disclosure.

The image encoding apparatus 100 includes an encoder 110 and a bitstream generator 120.

The encoder 110 may first split a single picture into one or more slices or one or more tiles. The encoder 110 splits a picture or a slice or a tile included in the picture into a plurality of largest coding units according to a size of a largest coding unit. The largest coding unit may be a data unit having a size of 32×32, 64×64, 128×128, 256×256, or the like, wherein a shape of the data unit is a square shape having a width and length in powers of 2. The encoder 110 may provide largest coding unit size information indicating the size of the largest coding unit to the bitstream generator 120. The bitstream generator 120 may add the largest coding unit size information to a bitstream.

The encoder 110 determines coding units by splitting the largest coding unit. Whether to split a coding unit is determined according to whether splitting of the coding unit is efficient according to rate-distortion optimization. Then, split information indicating whether the coding unit is split may be generated. The split information may be represented in the form of a flag.

A coding unit may be split by using various methods. For example, a square coding unit may be split into four square coding units whose width and height are half those of the square coding unit. A square coding unit may be split into two rectangular coding units whose width is half that of the square coding unit. A square coding unit may be split into two rectangular coding units whose height is half that of the square coding unit. A square coding unit may be split into three coding units by splitting its width or height at 1:2:1.

A rectangular coding unit whose width is twice a height may be split into two square coding units. A rectangular coding unit whose width is twice a height may be split into two rectangular coding units whose width is four times a height. A rectangular coding unit whose width is twice a height may be split into two rectangular coding units and one square coding unit by splitting a width at 1:2:1.

Equally, a rectangular coding unit whose height is twice a width may be split into two square coding units. Also, a rectangular coding unit whose height is twice a width may be split into two rectangular coding units whose height is four times a width. Equally, a rectangular coding unit whose height is twice a width may be split into two rectangular coding units and one square coding unit by splitting its height at 1:2:1.

When the image encoding apparatus 100 can use two or more splitting methods, information about splitting methods that may be used for coding units from among the splitting methods that are usable by the image encoding apparatus 100 may be determined for each picture. Therefore, only specific splitting methods may be determined to be used for each picture. When the image encoding apparatus 100 uses only one splitting method, information about a splitting method that may be used for coding units is not separately determined.

A coding unit having a preset size may be split by using a specific splitting method. For example, when a size of a coding unit is 256×265, the coding unit may be set to be split into only four square units whose width and height are half those of the coding unit.

When split information of a coding unit indicates that the coding unit is split, split shape information indicating a splitting method of the coding unit may be generated. When there is only one splitting method that may be used in a picture to which a coding unit belongs, split shape information may not be generated. When a splitting method is adaptively determined to encoding information around a coding unit, split shape information may not be generated.

As described above, image data of a current picture is split into largest coding units according to a maximum size of a coding unit. Each of the largest coding units may include coding units that are hierarchically split from the largest coding unit. A shape and a location of a lower coding unit may be determined according to a split shape of an upper coding unit. A minimum size of a coding unit that limits splitting of the coding unit may be preset.

The encoder 110 compares coding efficiency when a coding unit is hierarchically split with coding efficiency when the coding unit is not split. Then, the encoder 110 determines whether to split the coding unit according to a result of the comparison. When it is determined that it is more efficient to split the coding unit, the encoder 110 splits the coding unit hierarchically. When it is determined that it is efficient not to split the coding unit according to the result of the comparison, the encoder 110 does not split the coding unit. Whether to split a coding unit may be determined regardless of whether adjacent coding units are split.

A finally split coding unit may be predicted by using intra prediction or inter prediction. Intra prediction refers to a method of predicting samples of a prediction unit by using reference samples around the prediction unit. Inter prediction refers to a method of predicting samples of a prediction unit by obtaining reference samples from a reference picture referenced by a current picture.

For intra prediction, the encoder 110 may select a most efficient intra prediction method by applying a plurality of intra prediction methods to a prediction unit. The intra prediction method includes a DC mode, a planar mode, and a directional mode such as a vertical mode, a horizontal mode, and the like.

When a reconstructed sample around a coding unit is used as a reference sample, intra prediction may be performed for each prediction unit. However, when a reconstructed sample in a coding unit is used as a reference sample, reconstruction of the reference sample in the coding unit has to precede prediction, and thus a prediction order of a prediction unit may depend on a transformation order of a transform unit. Therefore, when the reconstructed sample in the coding unit is used as the reference sample, only an intra prediction method for transform units corresponding to the prediction unit may be determined, and actual intra prediction may be performed on each transform unit.

The encoder 110 may select a most efficient inter prediction method by determining an optimal motion vector and an optimal reference picture. For inter prediction, a coding unit determiner 120 may determine a plurality of motion vector candidates from a coding unit that is spatially and temporally adjacent to a current coding unit, and may determine, from among the motion vector candidates, a most efficient motion vector as a motion vector. Equally, the encoder 110 may determine a plurality of reference picture candidates from the coding unit that is spatially and temporally adjacent to the current coding unit, and may determine a most efficient reference picture from among the reference picture candidates. According to an embodiment, the reference picture may be determined from reference picture lists that are pre-determined for a current picture. According to the embodiment, for accuracy of prediction, the most efficient motion vector from among the plurality of motion vector candidates may be determined as a prediction motion vector, and a motion vector may be determined by correcting the prediction motion vector. Inter prediction may be parallel performed on each prediction unit in the coding unit.

The encoder 110 may reconstruct a coding unit by obtaining only information indicating a motion vector and a reference picture according to a skip mode. According to the skip mode, all encoding information including a residual signal is skipped, except for the information indicating the motion vector and the reference picture. Because the residual signal is skipped, the skip mode may be used when accuracy of prediction is very high.

A partition mode to be used may be limited according to a prediction method for a prediction unit. For example, only partition modes for a prediction unit having a size of 2N×2N or N×N may be applied to intra prediction, whereas partition modes for a prediction unit having a size of 2N×2N, 2N×N, N×2N, or N×N may be applied to inter prediction. In addition, only a partition mode for a prediction unit having a size of 2N×2N may be applied to a skip mode of the inter prediction. A partition mode allowed for each prediction method in the image encoding apparatus 100 may vary according to coding efficiency.

The image encoding apparatus 100 may perform transformation based on a coding unit. The image encoding apparatus 100 may transform residual data that is a difference value between an original value and a prediction value with respect to pixels included in a coding unit, through a preset process. For example, the image encoding apparatus 100 may perform lossy-compression on the residual data through quantization and discrete cosine transform (DCT)/discrete sine transform (DST). Alternatively, the image encoding apparatus 100 may perform lossless-compression on the residual data without quantization.

In conclusion, the encoder 110 determines a most efficient prediction method for a current coding unit from among a plurality of intra prediction methods and inter prediction methods. Then, the encoder 110 determines a prediction method for the current coding unit according to coding efficiency according to a prediction result. Equally, the encoder 110 determines a transformation method according to coding efficiency according to a transformation result. Coding efficiency of a coding unit is finally determined according to a most efficient coding unit prediction method and transformation method determination scheme. The encoder 110 finalizes a hierarchical structure of a largest coding unit according to coding efficiency of a coding unit that is finally split.

The encoder 110 may measure coding efficiency of coding units, prediction efficiency of prediction methods, or the like by using rate-distortion optimization based on Lagrangian multipliers.

The encoder 110 may generate split information indicating whether to split a coding unit according to the determined hierarchical structure of the largest coding unit. Then, the encoder 110 may generate, for split coding units, partition mode information for determining a prediction unit and transform unit split information for determining a transform unit. In addition, when the coding unit may be split by using at least two splitting methods, the encoder 110 may generate both split information and split shape information that indicates a splitting method. The encoder 110 may generate information about a prediction method and a transformation method that are used for the prediction unit and the transform unit.

The bitstream generator 120 may output, in a bitstream, a plurality of pieces of information generated by the encoder 110 according to the hierarchical structure of the largest coding unit.

A method of determining a coding unit, a prediction unit, and a transform unit according to a tree structure of a largest coding unit according to an embodiment will be described below in detail with reference to FIGS. 3 through 12.

Figure 1B:
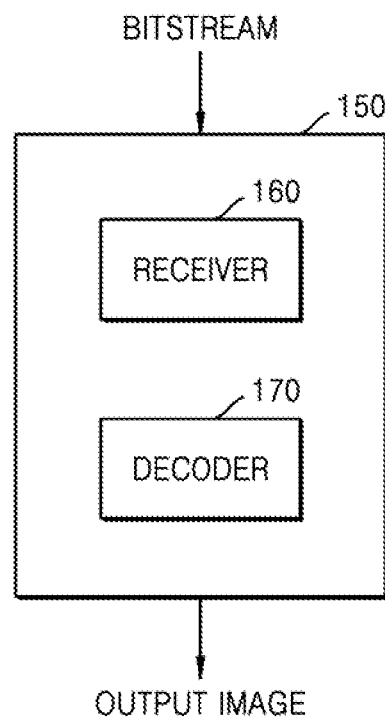
FIG. 1B is a block diagram of an image decoding apparatus based on coding units having a tree structure according to an embodiment.

FIG. 1B is a block diagram of an image decoding apparatus 150 based on coding units having a tree structure according to an embodiment.

The image decoding apparatus 150 includes a receiver 160 and a decoder 170.

Definitions of the terms including a coding unit, a prediction unit, a transform unit, various split information, or the like for a decoding operation performed by the image decoding apparatus 150 are the same as those described above with reference to FIG. 1A and the image encoding apparatus 100. Also, because the image decoding apparatus 150 is designed to reconstruct image data, various encoding methods used by the image encoding apparatus 100 may be applied to the image decoding apparatus 150.

The receiver 160 receives and parses a bitstream regarding an encoded video. The decoder 170 extracts, from the parsed bitstream, a plurality of pieces of information for decoding largest coding units, and provides the information to the decoder 170. The decoder 170 may extract information about a maximum size of a coding unit of a current picture from a header, a sequence parameter set, or a picture parameter set of the current picture.

Furthermore, the decoder 170 extracts, from the parsed bitstream, split information of coding units having a tree structure according to each largest coding unit. The extracted split information is output to the decoder 170. The decoder 170 may determine a tree structure of the largest coding unit by splitting a largest coding unit according to the extracted split information.

The split information extracted by the decoder 170 is split information of a tree structure determined by the image encoding apparatus 100 to cause a minimum coding error. Therefore, the image decoding apparatus 150 may reconstruct an image by decoding data according to a decoding method that causes the minimum coding error.

The decoder 170 may extract split information of a data unit, such as a prediction unit and a transform unit included in a coding unit. For example, the decoder 170 may extract information about a most efficient partition mode for a prediction unit. The decoder 170 may extract transformation split information of a most efficient tree structure for a transform unit.

Also, the decoder 170 may obtain information about a most efficient prediction method for prediction units split from a coding unit. Then, the decoder 170 may obtain information about a most efficient transformation method for transform units split from a coding unit.

The decoder 170 extracts information from a bitstream according to a method in which the bitstream generator 120 of the image encoding apparatus 100 constructs the bitstream.

The decoder 170 may split a largest coding unit into coding units having a most efficient tree structure based on split information. Then, the decoder 170 may split a coding unit into prediction units according to information about a partition mode. The decoder 170 may split a coding unit into transform units according to transformation split information.

The decoder 170 may predict a prediction unit according to information about a prediction method. The decoder 170 may perform inverse quantization and inverse transformation on residual data that is a difference between an original value and a prediction value of a pixel according to information about a method of transforming a transform unit. The decoder 170 may reconstruct pixels of a coding unit according to a prediction result of the prediction unit and a transformation result of the transform unit.

Figure 2:
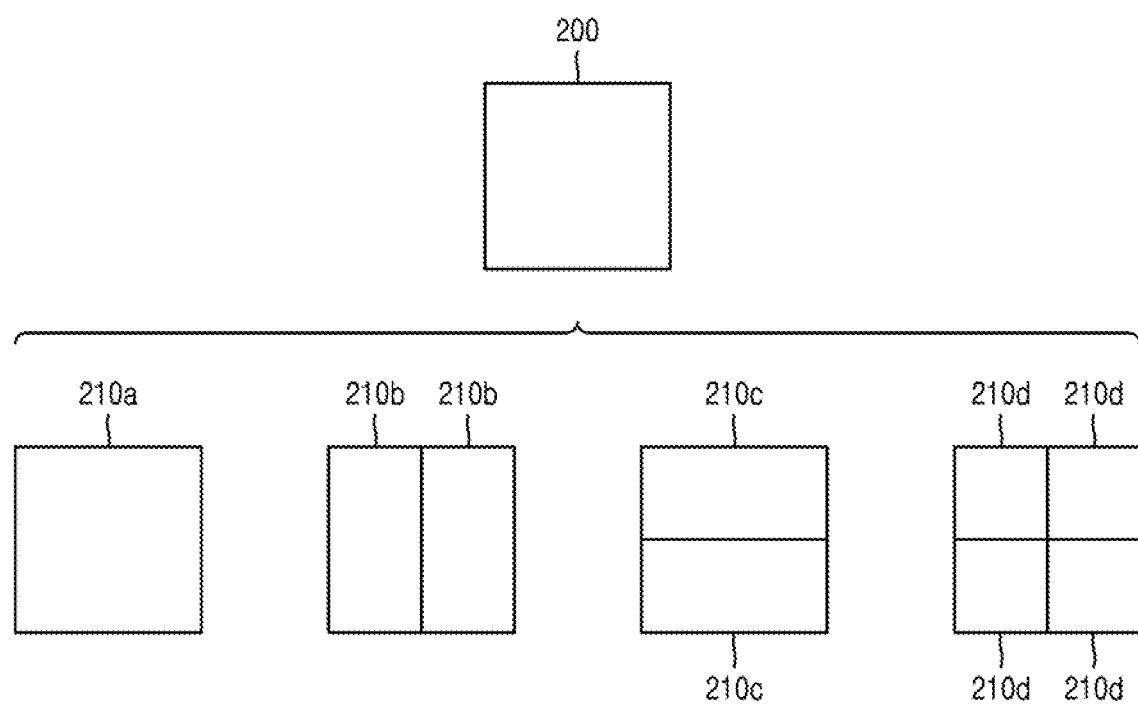
FIG. 2 illustrates a process of determining at least one coding unit by splitting a current coding unit according to an embodiment.

FIG. 2 illustrates a process, performed by the image decoding apparatus 150, of determining at least one coding unit by splitting a current coding unit according to an embodiment.

According to an embodiment, the image decoding apparatus 150 may determine a shape of a coding unit by using block shape information, and may determine a shape according to which the coding unit is to be split by using split shape information. That is, a coding unit splitting method, which is indicated by the split shape information, may be determined according to which block shape is indicated by the block shape information used by the image decoding apparatus 150.

According to an embodiment, the image decoding apparatus 150 may use the block shape information indicating that the current coding unit has a square shape. For example, the image decoding apparatus 150 may determine whether not to split a square coding unit, whether to vertically split the square coding unit, whether to horizontally split the square coding unit, or whether to split the square coding unit into four coding units according to the split shape information. Referring to FIG. 2, when block shape information of a current coding unit 200 indicates a square shape, a decoder 180 may not split a coding unit 210a having the same size as the current coding unit 200 according to split shape information indicating not to perform splitting, or may determine coding units 210b, 210c, and 210d split based on split shape information indicating a preset splitting method.

Referring to FIG. 2, the image decoding apparatus 150 may determine two coding units 210b obtained by vertically splitting the current coding unit 200 based on split shape information indicating to vertically perform splitting according to an embodiment. The image decoding apparatus 150 may determine two coding units 210c obtained by horizontally splitting the current coding unit 200 based on split shape information indicating to horizontally perform splitting. The image decoding apparatus 150 may determine four coding units 210d obtained by vertically and horizontally splitting the current coding unit 200 based on split shape information indicating to vertically and horizontally perform splitting. However, it should not be construed that a split shape for splitting a square coding unit is limited to the above shapes, and the split shape may include various shapes that may be indicated by split shape information. Split shapes for splitting a square coding unit will be described in detail below through various embodiments.

Figure 3:
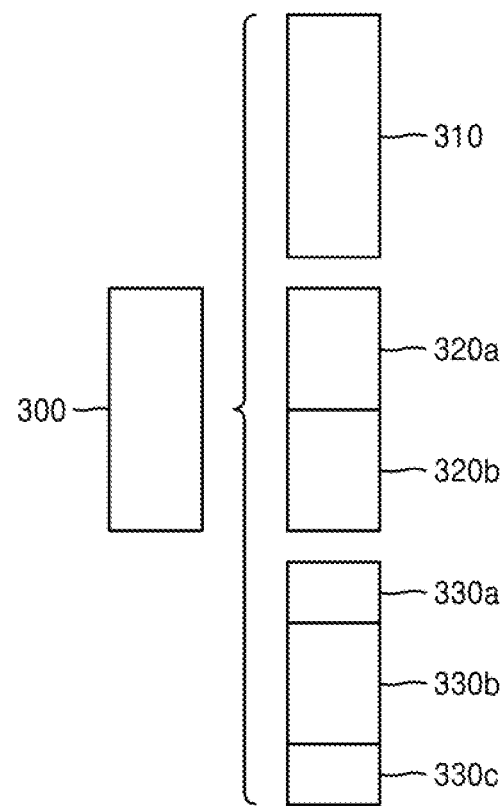
FIG. 3 illustrates a process of determining at least one coding unit by splitting a non-square coding unit according to an embodiment.
Figure 3:
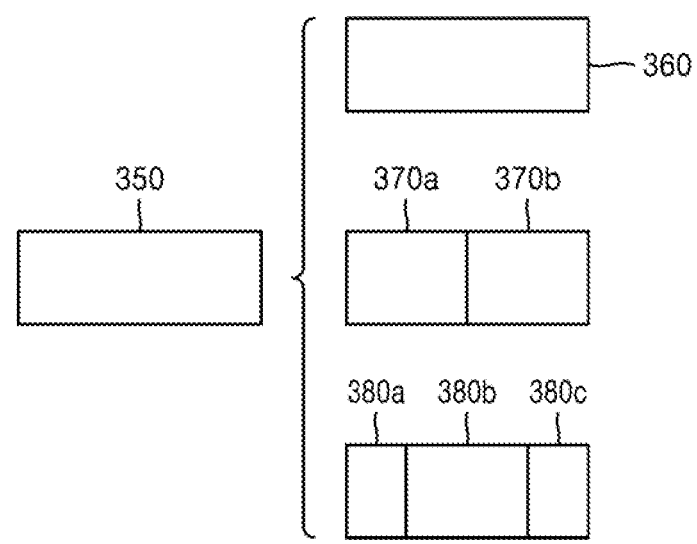

FIG. 3 illustrates a process, performed by the image decoding apparatus 150, of determining at least one coding unit by splitting a non-square coding unit according to an embodiment.

According to an embodiment, the image decoding apparatus 150 may use block shape information indicating that a current coding unit has a non-square shape. The image decoding apparatus 150 may determine, according to split shape information, whether not to split the current non-square coding unit or whether to split the non-square current coding unit by using a preset method. Referring to FIG. 3, when block shape information of a current coding unit 300 or 350 indicates a non-square shape, the image decoding apparatus 150 may not split a coding unit 310 or 360 having the same size as the current coding unit 300 or 350 according to split shape information indicating not to perform splitting, or may determine coding units 320a and 320b, 330a, 330b, and 330c, 370a and 370b, 380a, 380b, and 380c that are split according to split shape information indicating a preset splitting method. A preset splitting method of splitting a non-square coding unit will be described in detail below through various embodiments.

According to an embodiment, the image decoding apparatus 150 may determine a shape according to which a coding unit is to be split by using the split shape information, and in this case, the split shape information may indicate the number of at least one coding unit generated when the coding unit is split. Referring to FIG. 3, when the split shape information indicates that the current coding unit 300 or 350 is split into two coding units, the image decoding apparatus 150 may determine two coding units 320a and 320b or 370a and 370b, which are respectively included in the current coding unit 300 or 350 by splitting the current coding unit 300 or 350 based on the split shape information.

According to an embodiment, when the image decoding apparatus 150 splits the current coding unit 300 or 350 having the non-square shape based on the split shape information, the image decoding apparatus 150 may split the current coding unit 300 or 350 having the non-square shape, in consideration of a location of a long side of the current coding unit 300 or 350. For example, the image decoding apparatus 150 may determine a plurality of coding units by splitting the current coding unit 300 or 350 in a direction of splitting the long side of the current coding unit 300 or 350, in consideration of the shape of the current coding unit 300 or 350.

According to an embodiment, when the split shape information indicates that a coding unit is to be split into an odd number of blocks, the image decoding apparatus 150 may determine an odd number of coding units included in the current coding unit 300 or 350. For example, when the split shape information indicates that the current coding unit 300 or 350 is to be split into three coding units, the image decoding apparatus 150 may split the current coding unit 300 or 350 into three coding units 330a, 330b, and 330c or 380a, 380b, and 380c. According to an embodiment, the image decoding apparatus 150 may determine the odd number of coding units included in the current coding unit 300 or 350, and sizes of the determined coding units may not be uniform. For example, a size of the coding unit 330b or 380b from among the odd number of coding units 330a, 330b, and 330c or 380a, 380b, and 380c may be different from sizes of the coding units 330a and 330c or 380a and 380c. That is, coding units that may be determined when the current coding unit 300 or 350 is split may have multiple types with respect to a size.

According to an embodiment, when the split shape information indicates that a coding unit is to be split into an odd number of blocks, the image decoding apparatus 150 may determine an odd number of coding units included in the current coding unit 300 or 350 and may put a restriction on at least one coding unit from among the odd number of coding units generated by splitting the current coding unit 300 or 350. Referring to FIG. 3, the image decoding apparatus 150 may decode the coding unit 330b or 380b at the center of the three coding units 330a, 330b, and 330c or 380a, 380b, and 380c generated when the current coding unit 300 or 350 is split, in a different manner from the coding units 330a and 330c or 380a and 380c. For example, the image decoding apparatus 150 may restrict the coding unit 330b or 380b at the center not to be further split or to be split only a preset number of times, unlike the coding units 330a and 330c or 380a and 380c.

Figure 4:
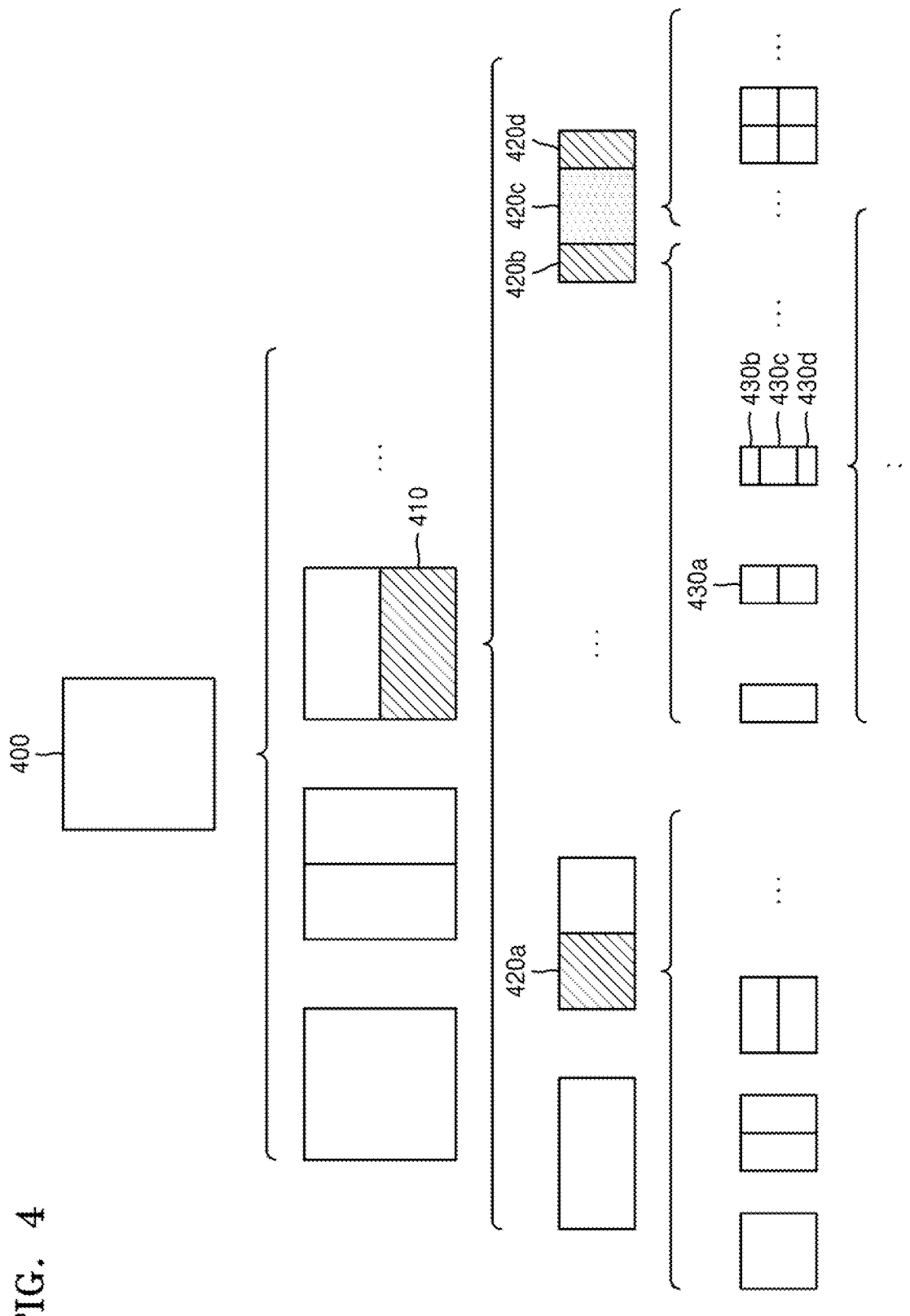
FIG. 4 illustrates a process of splitting a coding unit based on at least one of block shape information and split shape information according to an embodiment.

FIG. 4 illustrates a process, performed by the image decoding apparatus 150, of splitting a coding unit based on at least one of block shape information and split shape information according to an embodiment.

According to an embodiment, the image decoding apparatus 150 may determine to split or not to split a square first coding unit 400 into coding units based on at least one of the block shape information and the split shape information. According to an embodiment, when the split shape information indicates to split the first coding unit 400 in a horizontal direction, the image decoding apparatus 150 may determine a second coding unit 410 by splitting the first coding unit 400 in a horizontal direction. A first coding unit, a second coding unit, and a third coding unit used according to an embodiment are terms used to understand a relation before and after coding units are split. For example, the second coding unit may be determined by splitting the first coding unit, and the third coding unit may be determined by splitting the second coding unit. It will be understood that a relation among the first coding unit, the second coding unit, and the third coding unit is applied to the following descriptions.

According to an embodiment, the image decoding apparatus 150 may determine to split the second coding unit 410 into coding units, based on at least one of the block shape information and the split shape information, or may determine to not split the second coding unit 410. Referring to FIG. 4, the image decoding apparatus 150 may split the non-square second coding unit 410, which is determined by splitting the first coding unit 400, into one or more third coding units 420a, or 420b, 420c, and 420d based on at least one of the block shape information and the split shape information, or may not split the non-square second coding unit 410. The image decoding apparatus 150 may obtain at least one of the block shape information and the split shape information, and may split a plurality of various-shaped second coding units (e.g., 410) by splitting the first coding unit 400, based on at least one of the obtained block shape information and split shape information, and the second coding unit 410 may be split by using a splitting method of the first coding unit 400, based on at least one of the block shape information and the split shape information. According to an embodiment, when the first coding unit 400 is split into the second coding units 410 based on at least one of the block shape information and the split shape information of the first coding unit 400, the second coding unit 410 may also be split into the third coding units 420*a*, or 420*b*, 420*c*, and 420*d* based on at least one of the block shape information and the split shape information of the second coding unit 410. That is, a coding unit may be recursively split based on at least one of the block shape information and the split shape information of each coding unit. A method that may be used to recursively split the coding unit will be described below through various embodiments.

According to an embodiment, the image decoding apparatus 150 may determine to split each of the third coding units 420*a*, or 420*b*, 420*c*, and 420*d* into coding units, based on at least one of the block shape information and the split shape information, based on at least one of the block shape information and the split shape information, or may determine to not split the second coding unit 410. According to an embodiment, the image decoding apparatus 150 may split the non-square second coding unit 410 into the odd number of third coding units 420*b*, 420*c*, and 420*d*. The image decoding apparatus 150 may put a preset restriction on a third coding unit from among the odd number of third coding units 420*b*, 420*c*, and 420*d*. For example, the image decoding apparatus 150 may restrict the third coding unit 420*c* at a center location from among the odd number of third coding units 420*b*, 420*c*, and 420*d* to be no longer split or to be split a settable number of times. Referring to FIG. 4, the image decoding apparatus 150 may restrict the third coding unit 420*c*, which is at the center location from among the odd number of third coding units 420*b*, 420*c*, and 420*d* included in the non-square second coding unit 410, to be no longer split, to be split by using a preset splitting method (e.g., split into only four coding units or split into a shape corresponding to that into which the second coding unit 410 is split), or to be split only a preset number of times (e.g., split only n times (where n>0)). However, the restrictions on the third coding unit 420*c* at the center location are not limited to the above-described examples, and may include various restrictions for decoding the third coding unit 420*c* at the center location differently from the other third coding units 420*b* and 420*d*.

According to an embodiment, the image decoding apparatus 150 may obtain at least one of block shape information and split shape information, which is used to split a current coding unit, from a preset location in the current coding unit.

According to an embodiment, when a current coding unit is split into a preset number of coding units, the image decoding apparatus 150 may select one of the coding units. Various methods that may be used to select one of a plurality of coding units will be described below through various embodiments.

According to an embodiment, the image decoding apparatus 150 may split a current coding unit into a plurality of coding units, and may determine a coding unit at a preset location.

Figure 5:
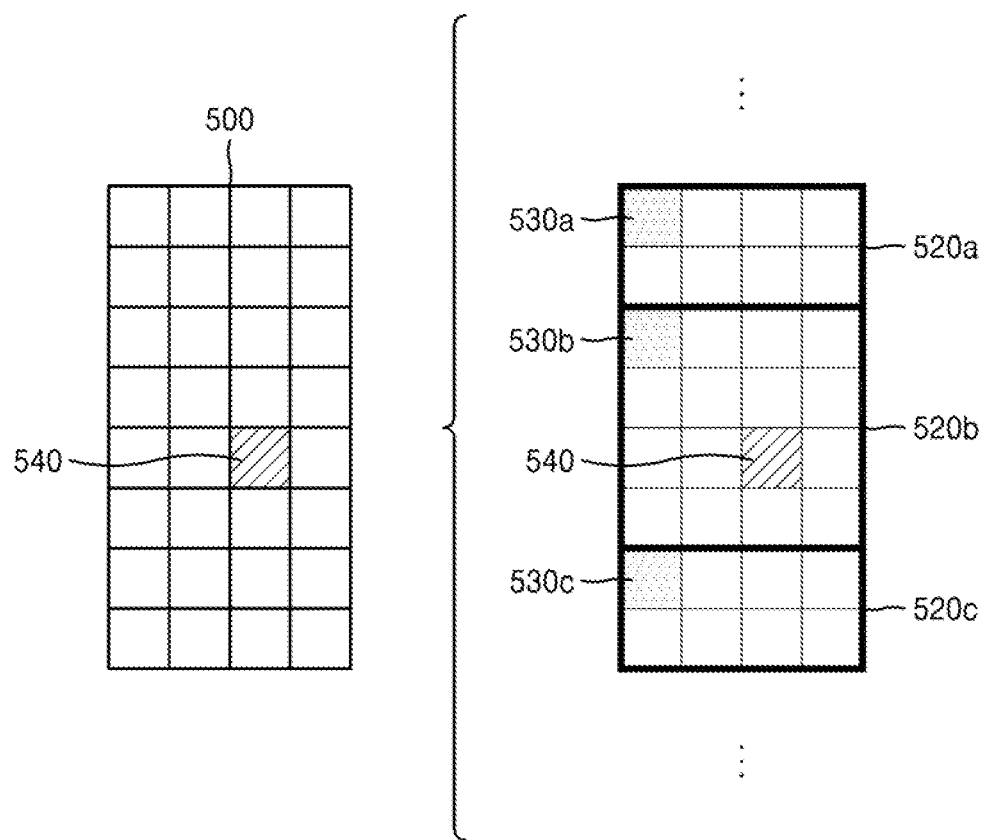
FIG. 5 illustrates a method of determining a preset coding unit from among an odd number of coding units according to an embodiment.

FIG. 5 illustrates a method, performed by the image decoding apparatus 150, of determining a coding unit of a preset location from among an odd number of coding units according to an embodiment.

According to an embodiment, the image decoding apparatus 150 may use information indicating each of locations of an odd number of coding units to determine a coding unit at a center location from among the odd number of coding units. Referring to FIG. 5, the image decoding apparatus 150 may determine an odd number of coding units 520*a*, 520*b*, and 520*c* by splitting a current coding unit 500. The image decoding apparatus 150 may determine the coding unit 520*b* at a center location by using information about locations of the odd number of coding units 520*a*, 520*b*, and 520*c*. For example, the image decoding apparatus 150 may determine the coding unit 520*b* of the center location by determining the locations of the coding units 520*a*, 520*b*, and 520*c* based on information indicating locations of preset samples included in the coding units 520*a*, 520*b*, and 520*c*. In detail, the image decoding apparatus 150 may determine the coding unit 520*b* at the center location by determining the locations of the coding units 520*a*, 520*b*, and 520*c* based on information indicating locations of top left samples 530*a*, 530*b*, and 530*c* of the coding units 520*a*, 520*b*, and 520*c*.

According to an embodiment, the information indicating the locations of the top left samples 530*a*, 530*b*, and 530*c*, which are included in the coding units 520*a*, 520*b*, and 520*c*, respectively, may include information about locations or coordinates of the coding units 520*a*, 520*b*, and 520*c* in a picture. According to an embodiment, the information indicating the locations of the top left samples 530*a*, 530*b*, and 530*c*, which are respectively included in the coding units 520*a*, 520*b*, and 520*c*, may include information indicating widths or heights of the coding units 520*a*, 520*b*, and 520*c* included in the current coding unit 500, and the widths or heights may correspond to information indicating a difference between the coordinates of the coding units 520*a*, 520*b*, and 520*c* in the picture. That is, the image decoding apparatus 150 may determine the coding unit 520*b* at the center location by directly using the information about the locations or coordinates of the coding units 520*a*, 520*b*, and 520*c* in the picture, or by using the information about the widths or heights of the coding units, which correspond to a difference value between the coordinates.

According to an embodiment, information indicating the location of the top left sample 530*a* of the upper coding unit 520*a* may include coordinates (xa, ya), information indicating the location of the top left sample 530*b* of the middle coding unit 520*b* may include coordinates (xb, yb), and information indicating the location of the top left sample 530*c* of the lower coding unit 520*c* may include coordinates (xc, yc). The image decoding apparatus 150 may determine the middle coding unit 520*b* by using the coordinates of the top left samples 530*a*, 530*b*, and 530*c* which are included in the coding units 520*a*, 520*b*, and 520*c*, respectively. For example, when the coordinates of the top left samples 530*a*, 530*b*, and 530*c* are sorted in an ascending or descending order, the coding unit 520*b* including the coordinates (xb, yb) of the sample 530*b* at a center location may be determined as a coding unit at a center location from among the coding units 520*a*, 520*b*, and 520*c* determined by splitting the current coding unit 500. However, the coordinates indicating the locations of the top left samples 530*a*, 530*b*, and 530*c* may include coordinates indicating absolute locations in the picture, or may use coordinates (dxb, dyb) indicating a relative location of the top left sample 530*b* of the middle coding unit 520*b* and coordinates (dxc, dyc) indicating a relative location of the top left sample 530*c* of the lower coding unit 520*c*, with reference to the location of the top left sample 530*a* of the upper coding unit 520*a*. Also, a method of determining a coding unit at a preset location by using coordinates of a sample included in the coding unit as information indicating a location of the sample is not limited to the above-described method, and may include various arithmetic methods capable of using the coordinates of the sample.

According to an embodiment, the image decoding apparatus 150 may split the current coding unit 500 into the plurality of coding units 520*a*, 520*b*, and 520*c*, and may select one of the coding units 520a, 520b, and 520c based on a preset criterion. For example, the image decoding apparatus 150 may select the coding unit 520b whose size is different from that of the others, from among the coding units 520a, 520b, and 520c.

According to an embodiment, the image decoding apparatus 150 may determine the widths or heights of the coding units 520a, 520b, and 520c by using the coordinates (xa, ya) indicating the location of the top left sample 530a of the upper coding unit 520a, the coordinates (xb, yb) indicating the location of the top left sample 530b of the middle coding unit 520b, and the coordinates (xc, yc) indicating the location of the top left sample 530c of the lower coding unit 520c. The image decoding apparatus 150 may determine respective sizes of the coding units 520a, 520b, and 520c by using the coordinates (xa, ya), (xb, yb), and (xc, yc) indicating the locations of the coding units 520a, 520b, and 520c.

According to an embodiment, the image decoding apparatus 150 may determine the width of the upper coding unit 520a to be xb-xa and the height of the upper coding unit 520a to be yb-ya. According to an embodiment, the image decoding apparatus 150 may determine the width of the middle coding unit 520b to be xc-xb and the height of the middle coding unit 520b to be yc-yb. According to an embodiment, the image decoding apparatus 150 may determine the width or height of the lower coding unit 520c by using the width or height of the current coding unit 500 and the widths and heights of the upper and middle coding units 520a and 520b. The image decoding apparatus 150 may determine a coding unit, which has a size different from that of the others, based on the determined widths and heights of the coding units 520a, 520b, and 520c. Referring to FIG. 5, the image decoding apparatus 150 may determine the middle coding unit 520b, which has a size different from the size of the upper and lower coding units 520a and 520c, to be the coding unit of the preset location. However, the above-described method, performed by the image decoding apparatus 150, of determining a coding unit having a size different from the size of the other coding units merely corresponds to an example of determining a coding unit at a preset location by using sizes of coding units, which are determined based on coordinates of samples, and thus various methods of determining a coding unit at a preset location by comparing sizes of coding units, which are determined based on coordinates of preset samples, may be used.

However, locations of samples considered to determine locations of coding units are not limited to the above-described top left locations, and information about arbitrary locations of samples included in the coding units may be used.

According to an embodiment, the image decoding apparatus 150 may select a coding unit at a preset location from among an odd number of coding units determined by splitting a current coding unit, in consideration of a shape of the current coding unit. For example, when the current coding unit whose width is longer than its height has a non-square shape, the image decoding apparatus 150 may determine the coding unit at the preset location in a horizontal direction. That is, the image decoding apparatus 150 may determine one of coding units at different locations in a horizontal direction and may put a restriction on the coding unit. When the current coding unit whose height is longer than its width has a non-square shape, the image decoding apparatus 150 may determine the coding unit at the preset location in a vertical direction. That is, the image decoding apparatus 150 may determine one of coding units at different locations in a vertical direction and may put a restriction on the coding unit.

According to an embodiment, the image decoding apparatus 150 may use information indicating respective locations of an even number of coding units, so as to determine the coding unit at the preset location from among the even number of coding units. The image decoding apparatus 150 may determine an even number of coding units by splitting the current coding unit, and may determine the coding unit at the preset location by using information about locations of the even number of coding units. An operation related thereto may correspond to the operation of determining a coding unit at a preset location (e.g., a center location) from among an odd number of coding units, which has been described in detail above with reference to FIG. 5, and thus detailed descriptions thereof are not provided here.

According to an embodiment, when a non-square current coding unit is split into a plurality of coding units, preset information about a coding unit at a preset location may be used in a splitting operation to determine the coding unit at the preset location from among the plurality of coding units. For example, the image decoding apparatus 150 may use at least one of block shape information and split shape information, which is stored in a sample included in a coding unit at a center location, in a splitting operation to determine the coding unit at the center location from among the plurality of coding units determined by splitting the current coding unit.

Referring to FIG. 5, the image decoding apparatus 150 may split the current coding unit 500 into the plurality of coding units 520a, 520b, and 520c based on at least one of the block shape information and the split shape information, and may determine the coding unit 520b at a center location from among the plurality of the coding units 520a, 520b, and 520c. Furthermore, the image decoding apparatus 150 may determine the coding unit 520b at the center location, in consideration of a location from which at least one of the block shape information and the split shape information is obtained. That is, at least one of the block shape information and the split shape information of the current coding unit 500 may be obtained from a sample 540 at a center location of the current coding unit 500 and, when the current coding unit 500 is split into the plurality of coding units 520a, 520b, and 520c based on at least one of the block shape information and the split shape information, the coding unit 520b including the sample 540 may be determined to be the coding unit at the center location. However, information used to determine the coding unit at the center location is not limited to at least one of the block shape information and the split shape information, and various kinds of information may be used to determine the coding unit at the center location.

According to an embodiment, preset information for identifying the coding unit at the preset location may be obtained from a preset sample included in a coding unit to be determined. Referring to FIG. 5, the image decoding apparatus 150 may use at least one of the block shape information and the split shape information, which is obtained from a sample at a preset location in the current coding unit 500 (e.g., a sample at a center location of the current coding unit 500) to determine a coding unit at a preset location from among the plurality of the coding units 520a, 520b, and 520c determined by splitting the current coding unit 500 (e.g., a coding unit at a center location from among a plurality of split coding units). That is, the image decoding apparatus 150 may determine the sample at the preset location by referring to a block shape of the current coding unit 500, may determine the coding unit 520*b* including a sample, from which preset information (e.g., at least one of the block shape information and the split shape information) may be obtained, from among the plurality of coding units 520*a*, 520*b*, and 520*c* determined by splitting the current coding unit 500, and may put a preset restriction on the coding unit 520*b*. Referring to FIG. 5, according to an embodiment, the image decoding apparatus 150 may determine the sample 540 at the center location of the current coding unit 500 as the sample from which the preset information may be obtained, and may put a preset restriction on the coding unit 520*b* including the sample 540, in a decoding operation. However, the location of the sample from which the preset information may be obtained is not limited to the above-described location, and may include arbitrary locations of samples included in the coding unit 520*b* to be determined for a restriction.

According to an embodiment, the location of the sample from which the preset information may be obtained may be determined based on a shape of the current coding unit 500. According to an embodiment, the block shape information may indicate whether the current coding unit has a square or non-square shape, and the location of the sample from which the preset information may be obtained may be determined based on the shape. For example, the image decoding apparatus 150 may determine a sample located on a boundary for splitting at least one of a width and height of the current coding unit in half, as the sample from which the preset information may be obtained, by using at least one of information about the width of the current coding unit and information about the height of the current coding unit. As another example, when the block shape information of the current coding unit indicates a non-square shape, the image decoding apparatus 150 may determine one of samples adjacent to a boundary for splitting a long side of the current coding unit in half, as the sample from which the preset information may be obtained.

According to an embodiment, when the current coding unit is split into a plurality of coding units, the image decoding apparatus 150 may use at least one of the block shape information and the split shape information so as to determine a coding unit at a preset location from among the plurality of coding units. According to an embodiment, the image decoding apparatus 150 may obtain at least one of the block shape information and the split shape information from a sample at a preset location in a coding unit, and may split the plurality of coding units, which are generated by splitting the current coding unit, by using at least one of the split shape information and the block shape information, which is obtained from the sample of the preset location in each of the plurality of coding units. That is, a coding unit may be recursively split based on at least one of the block shape information and the split shape information, which is obtained from the sample at the preset location in each coding unit. An operation of recursively splitting a coding unit has been described above with reference to FIG. 4, and thus detailed descriptions thereof will not be provided here.

According to an embodiment, the image decoding apparatus 150 may determine one or more coding units by splitting the current coding unit, and may determine an order of decoding the one or more coding units based on a preset block (e.g., the current coding unit).

Figure 6:
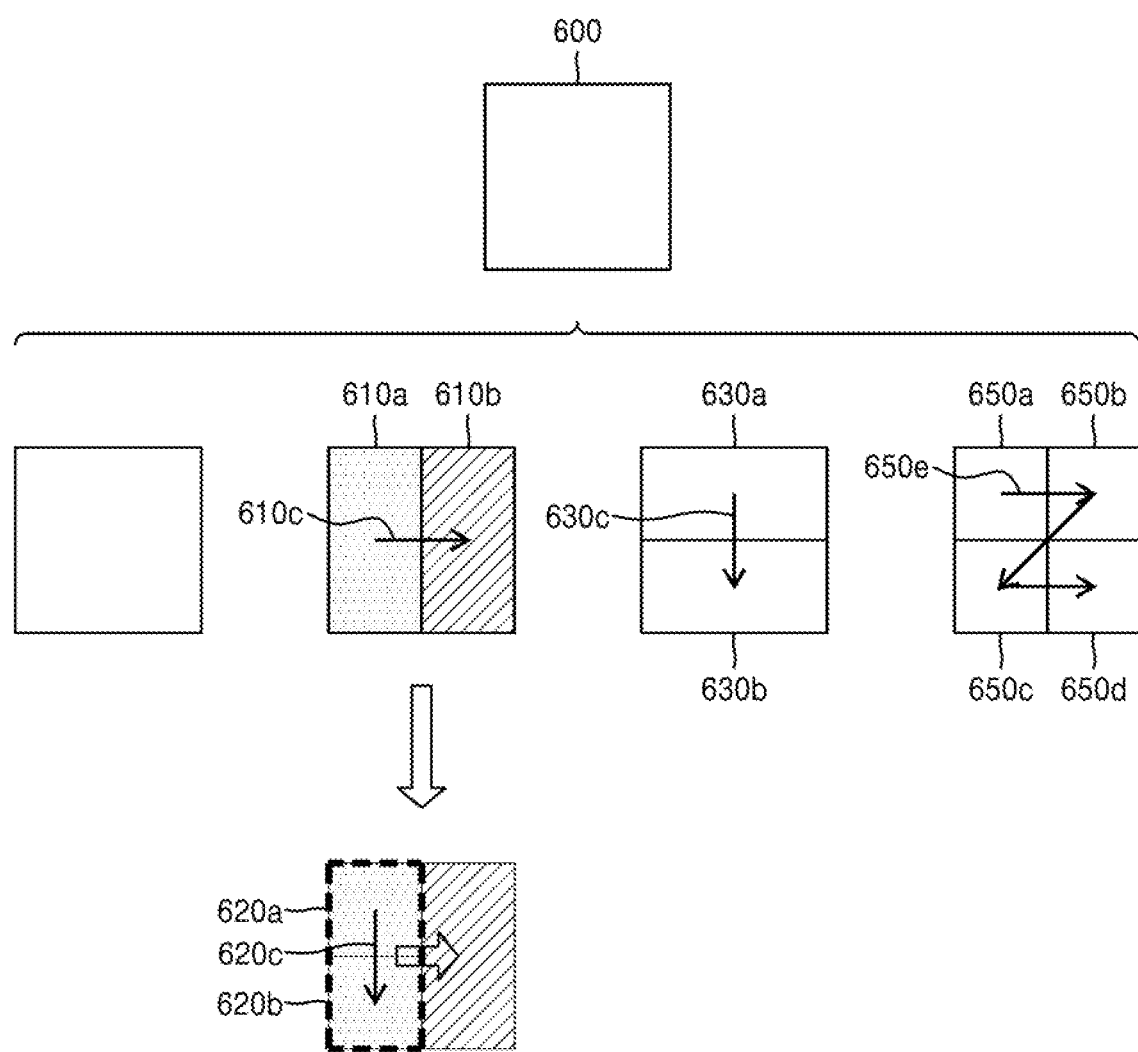
FIG. 6 illustrates an order of processing a plurality of coding units when the plurality of coding units are determined by splitting a current coding unit according to an embodiment.

FIG. 6 illustrates an order of processing a plurality of coding units when the image decoding apparatus 150 determines the plurality of coding units by splitting a current coding unit according to an embodiment.

According to an embodiment, the image decoding apparatus 150 may determine second coding units 610*a* and 610*b* by splitting a first coding unit 600 in a vertical direction, may determine second coding units 630*a* and 630*b* by splitting the first coding unit 600 in a horizontal direction, or may determine second coding units 650*a* to 650*d* by splitting the first coding unit 600 in vertical and horizontal directions, based on block shape information and split shape information.

Referring to FIG. 6, the image decoding apparatus 150 may determine to process the second coding units 610*a* and 610*b*, which are determined by splitting the first coding unit 600 in a vertical direction, in a horizontal direction order 610*c*. The image decoding apparatus 150 may determine to process the second coding units 630*a* and 630*b*, which are determined by splitting the first coding unit 600 in a horizontal direction, in a vertical direction order 630*c*. The image decoding apparatus 150 may determine the second coding units 650*a* to 650*d*, which are determined by splitting the first coding unit 600 in vertical and horizontal directions, according to a preset order (e.g., a raster scan order or a Z-scan order 650*e*) by which coding units in a row are processed and then coding units in a next row are processed.

According to an embodiment, the image decoding apparatus 150 may recursively split coding units. Referring to FIG. 6, the image decoding apparatus 150 may determine the plurality of second coding units 610*a*, 610*b*, 630*a*, 630*b*, 650*a*, 650*b*, 650*c*, and 650*d* by splitting the first coding unit 600, and may recursively split each of the determined plurality of second coding units 610*a*, 610*b*, 630*a*, 630*b*, 650*a*, 650*b*, 650*c*, and 650*d*. A method of splitting the plurality of second coding units 610*a*, 610*b*, 630*a*, 630*b*, 650*a*, 650*b*, 650*c*, and 650*d* may correspond to a method of splitting the first coding unit 600. Accordingly, each of the plurality of second coding units 610*a*, 610*b*, 630*a*, 630*b*, 650*a*, 650*b*, 650*c*, and 650*d* may be independently split into a plurality of coding units. Referring to FIG. 6, the image decoding apparatus 150 may determine the second coding units 610*a* and 610*b* by splitting the first coding unit 600 in a vertical direction, and may determine to independently split or to not split each of the second coding units 610*a* and 610*b*.

According to an embodiment, the image decoding apparatus 150 may determine third coding units 620*a* and 620*b* by splitting the left second coding unit 610*a* in a horizontal direction, and may not split the right second coding unit 610*b*.

According to an embodiment, a processing order of coding units may be determined based on an operation of splitting a coding unit. In other words, a processing order of split coding units may be determined based on a processing order of coding units immediately before being split. The image decoding apparatus 150 may determine a processing order of the third coding units 620*a* and 620*b* determined by splitting the left second coding unit 610*a*, independently of the right second coding unit 610*b*. Because the third coding units 620*a* and 620*b* are determined by splitting the left second coding unit 610*a* in a horizontal direction, the third coding units 620*a* and 620*b* may be processed in a vertical direction order 620*c*. Because the left and right second coding units 610*a* and 610*b* are processed in the horizontal direction order 610*c*, the right second coding unit 610*b* may be processed after the third coding units 620*a* and 620*b* included in the left second coding unit 610*a* are processed in the vertical direction order 620*c*. An operation of determining a processing order of coding units based on a coding unit before being split is not limited to the above-described example, and various methods may be used to independently process coding units, which are split and determined to various shapes, in a preset order.

Figure 7:
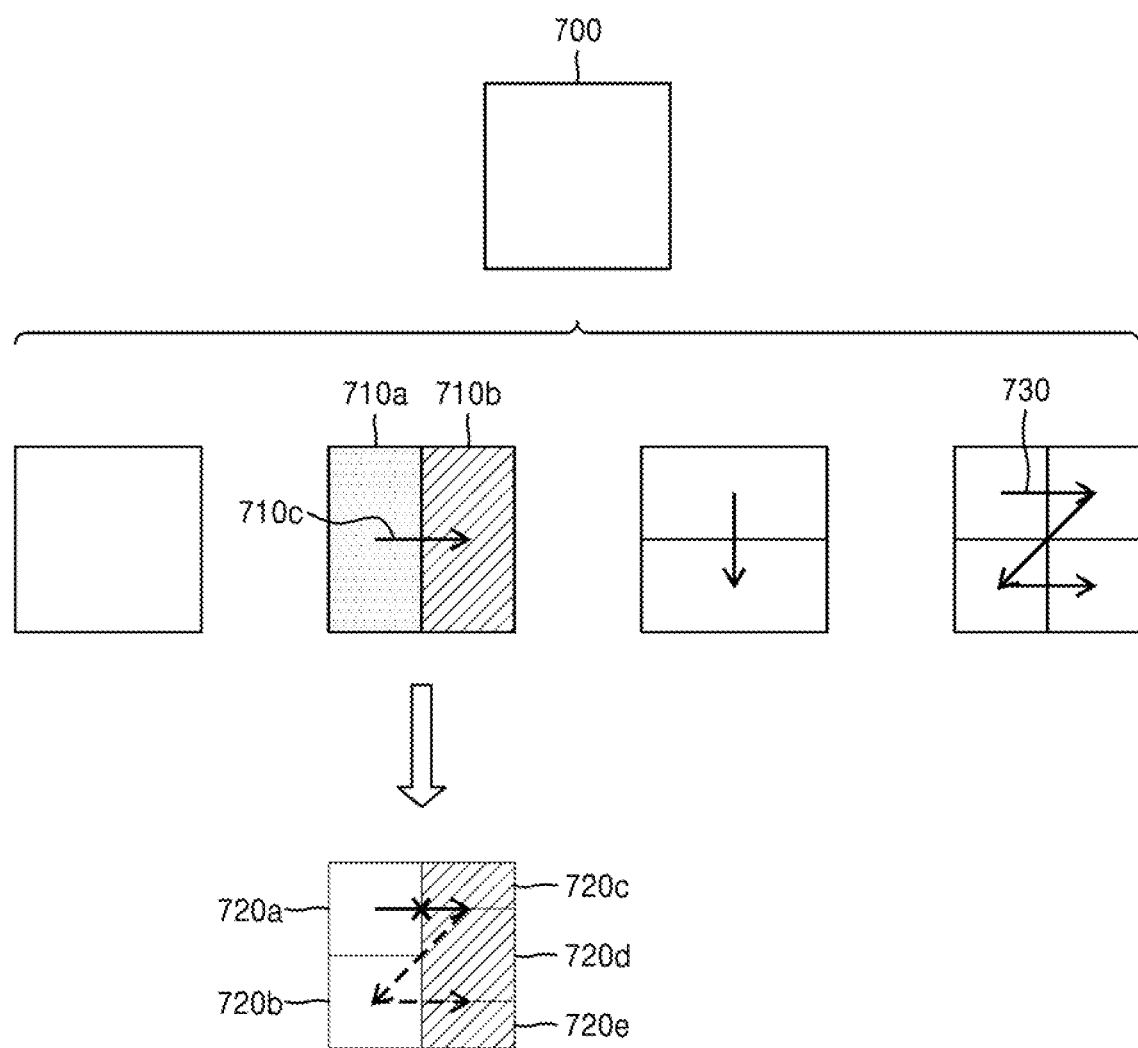
FIG. 7 illustrates a process of determining that a current coding unit is to be split into an odd number of coding units when the coding units are not processable in a preset order according to an embodiment.

FIG. 7 illustrates a process, performed by the image decoding apparatus 150, of determining that a current coding unit is to be split into an odd number of coding units when the coding units are not processable in a preset order according to an embodiment.

According to an embodiment, the image decoding apparatus 150 may determine that the current coding unit is to be split into an odd number of coding units, based on obtained block shape information and split shape information. Referring to FIG. 7, a square first coding unit 700 may be split into non-square second coding units 710a and 710b, and the second coding units 710a and 710b may be independently split into third coding units 720a and 720b, and 720c, 720d, and 720e. According to an embodiment, the image decoding apparatus 150 may determine the plurality of third coding units 720a and 720b by splitting the left second coding unit 710a in a horizontal direction, and may split the right second coding unit 710b into an odd number of third coding units 720c, 720d, and 720e.

According to an embodiment, the image decoding apparatus 150 may determine whether any coding unit is split into an odd number of coding units, by determining whether the third coding units 720a and 720b, and 720c, 720d, and 720e are processable in a preset order. Referring to FIG. 7, the image decoding apparatus 150 may determine the third coding units 720a and 720b, and 720c, 720d, and 720e by recursively splitting the first coding unit 700. The image decoding apparatus 150 may determine whether any of the first coding unit 700, the second coding units 710a and 710b, and the third coding units 720a and 720b, and 720c, 720d, and 720e is to be split into an odd number of coding units, based on at least one of block shape information and split shape information. For example, a second coding unit located in the right from among the second coding units 710a and 710b may be split into an odd number of third coding units 720c, 720d, and 720e. A processing order of a plurality of coding units included in the first coding unit 700 may be a preset order (e.g., a Z-scan order 730), and the image decoding apparatus 150 may determine whether the third coding units 720c, 720d, and 720e, which are determined by splitting the right second coding unit 710b into an odd number of coding units, satisfy a condition for processing in the preset order.

According to an embodiment, the image decoding apparatus 150 may determine whether the third coding units 720a and 720b, and 720c, 720d, and 720e included in the first coding unit 700 satisfy the condition for processing in the preset order, and the condition relates to whether at least one of a width and height of the second coding units 710a and 710b is to be split in half along a boundary of the third coding units 720a and 720b, and 720c, 720d, and 720e. For example, although the third coding units 720a and 720b determined by splitting the height of the non-square left second coding unit 710a in half may satisfy the condition, because boundaries of the third coding units 720c, 720d, and 720e determined by splitting the right second coding unit 710b into three coding units do not split the width or height of the right second coding unit 710b in half, it may be determined that the third coding units 720c, 720d, and 720e do not satisfy the condition. When the condition is not satisfied as described above, the image decoding apparatus 150 may decide disconnection of a scan order, and may determine that the right second coding unit 710b is to be split into an odd number of coding units, based on a result of the decision. According to an embodiment, when a coding unit is split into an odd number of coding units, the image decoding apparatus 150 may put a preset restriction on a coding unit at a preset location from among the split coding units, and the restriction or the preset location has been described above through various embodiments and thus detailed descriptions thereof will not be provided here.

Figure 8:
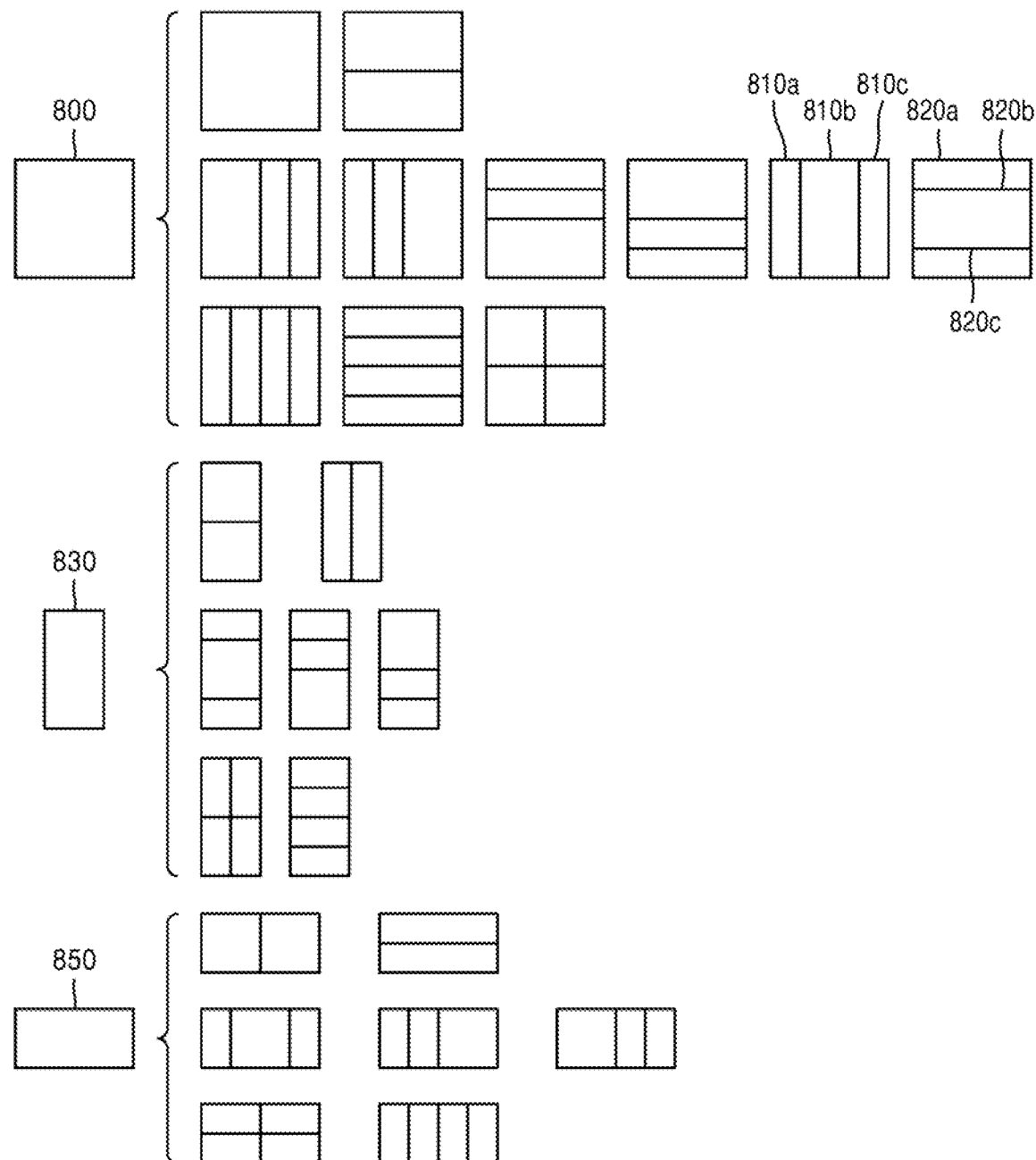
FIG. 8 illustrates a process of determining at least one coding unit by splitting a first coding unit according to an embodiment.

FIG. 8 illustrates a process, performed by the image decoding apparatus 150, of determining at least one coding unit by splitting a first coding unit 800 according to an embodiment. According to an embodiment, the image decoding apparatus 150 may split the first coding unit 800, based on at least one of block shape information and split shape information, which is obtained by the receiver 160. The square first coding unit 800 may be split into four square coding units, or may be split into a plurality of non-square coding units. For example, referring to FIG. 8, when the block shape information indicates that the first coding unit 800 has a square shape and the split shape information indicates to split the first coding unit 800 into non-square coding units, the image decoding apparatus 150 may split the first coding unit 800 into a plurality of non-square coding units. In detail, when the split shape information indicates to determine an odd number of coding units by splitting the first coding unit 800 in a horizontal direction or a vertical direction, the image decoding apparatus 150 may split the square first coding unit 800 into an odd number of coding units, e.g., second coding units 810a, 810b, and 810c determined by splitting the square first coding unit 800 in a vertical direction or second coding units 820a, 820b, and 820c determined by splitting the square first coding unit 800 in a horizontal direction.

According to an embodiment, the image decoding apparatus 150 may determine whether the second coding units 810a, 810b, and 810c, and 820a, 820b, and 820c which are included in the first coding unit 800 satisfy a condition for processing in a preset order, and the condition relates to whether at least one of a width and height of the first coding unit 800 is split in half along a boundary of the second coding units 810a, 810b, and 810c, and 820a, 820b, and 820c. Referring to FIG. 8, because boundaries of the second coding units 810a, 810b, and 810c determined by splitting the square first coding unit 800 in a vertical direction do not split the width of the first coding unit 800 in half, it may be determined that the first coding unit 800 does not satisfy the condition for processing in the preset order. In addition, because boundaries of the second coding units 820a, 820b, and 820c determined by splitting the square first coding unit 800 in a horizontal direction do not split the width of the first coding unit 800 in half, it may be determined that the first coding unit 800 does not satisfy the condition for processing in the preset order. When the condition is not satisfied as described above, the image decoding apparatus 150 may decide disconnection of a scan order, and may determine that the first coding unit 800 is to be split into an odd number of coding units, based on a result of the decision. According to an embodiment, when a coding unit is split into an odd number of coding units, the image decoding apparatus 150 may put a preset restriction on a coding unit at a preset location from among the split coding units, and the restriction or the preset location has been described above through various embodiments and thus detailed descriptions thereof will not be provided here.

According to an embodiment, the image decoding apparatus 150 may determine various-shaped coding units by splitting a first coding unit.

Referring to FIG. 8, the image decoding apparatus 150 may split the square first coding unit 800 or a non-square first coding unit 830 or 850 into various-shaped coding units.

Figure 9:
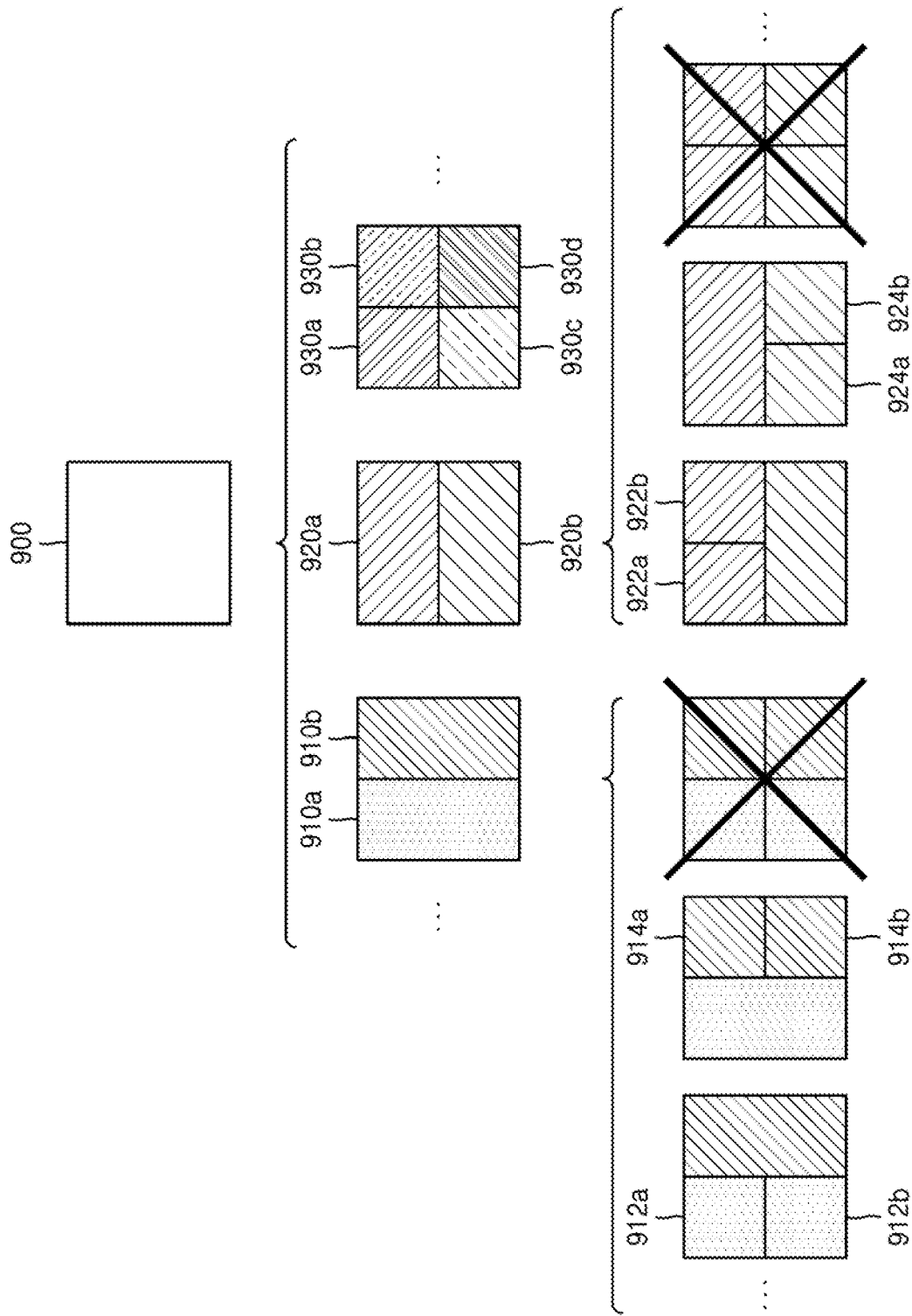
FIG. 9 illustrates that a shape into which a second coding unit is splittable is restricted when a non-square second coding unit determined by splitting a first coding unit satisfies a preset condition according to an embodiment.

FIG. 9 illustrates that a shape into which a second coding unit is splittable by the image decoding apparatus 150 is restricted when a non-square second coding unit determined by splitting a first coding unit 900 satisfies a preset condition according to an embodiment.

According to an embodiment, the image decoding apparatus 150 may determine to split the square first coding unit 900 into non-square second coding units 910a, 910b, 920a, and 920b, based on at least one of block shape information and split shape information, which is obtained by the receiver 160. The second coding units 910a, 910b, 920a, and 920b may be independently split. As such, the image decoding apparatus 150 may determine to split the first coding unit 900 into a plurality of coding units, based on at least one of the block shape information and the split shape information of each of the second coding units 910a, 910b, 920a, and 920b, or may determine to not split the first coding unit 900. According to an embodiment, the image decoding apparatus 150 may determine third coding units 912a and 912b by splitting the non-square left second coding unit 910a, which is determined by splitting the first coding unit 900 in a vertical direction, in a horizontal direction. However, when the left second coding unit 910a is split in a horizontal direction, the image decoding apparatus 150 may restrict the right second coding unit 910b to not be split in a horizontal direction in which the left second coding unit 910a is split. When third coding units 914a and 914b are determined by splitting the right second coding unit 910b in the same direction, because the left and right second coding units 910a and 910b are independently split in a horizontal direction, the third coding units 912a and 912b, and 914a and 914b may be determined. However, this case serves equally as a case in which the image decoding apparatus 150 splits the first coding unit 900 into four square second coding units 930a, 930b, 930c, and 930d, based on at least one of the block shape information and the split shape information, and may be inefficient in terms of image decoding.

According to an embodiment, the image decoding apparatus 150 may determine third coding units 922a and 922b, or third coding units 924a and 924b by splitting the non-square second coding unit 920a or 920b, which is determined by splitting the first coding unit 900 in a horizontal direction, in a vertical direction. However, when a second coding unit (e.g., the upper second coding unit 920a) is split in a vertical direction, for the above-described reason, the image decoding apparatus 150 may restrict the other second coding unit (e.g., the lower second coding unit 920b) to not be split in a vertical direction in which the upper second coding unit 920a is split.

Figure 10:
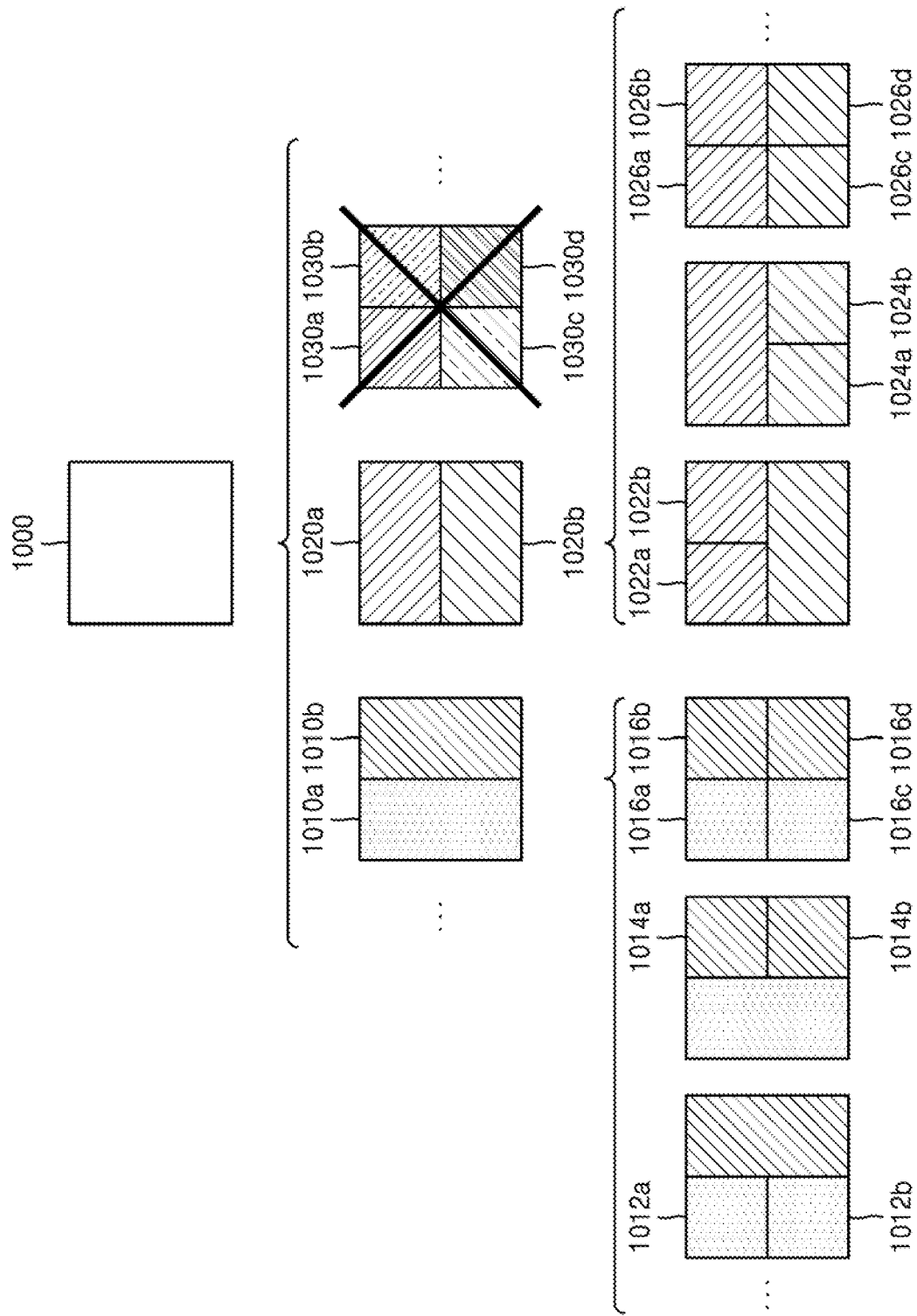
FIG. 10 illustrates a process of splitting a square coding unit when split shape information cannot indicate that the square coding unit is to be split into four square coding units according to an embodiment.

FIG. 10 illustrates a process, performed by the image decoding apparatus 150, of splitting a square coding unit when split shape information cannot indicate that the square coding unit is to be split into four square coding units according to an embodiment.

According to an embodiment, the image decoding apparatus 150 may determine second coding units 1010a, 1010b, 1020a, 1020b, etc. by splitting a first coding unit 1000, based on at least one of block shape information and split shape information. The split shape information may include information about various shapes by which a coding unit may be split, but, the information about various shapes may not be able to include information for splitting a coding unit into four square coding units. According to such split shape information, the image decoding apparatus 150 cannot split the first square coding unit 1000 into four square second coding units 1030a, 1030b, 1030c, and 1030d. The image decoding apparatus 150 may determine the non-square second coding units 1010a, 1010b, 1020a, 1020b, etc., based on the split shape information.

According to an embodiment, the image decoding apparatus 150 may independently split each of the non-square second coding units 1010a, 1010b, 1020a, 1020b, etc. Each of the second coding units 1010a, 1010b, 1020a, 1020b, etc. may be recursively split in a preset order, and this splitting method may correspond to a method of splitting the first coding unit 1000 based on at least one of the block shape information and the split shape information.

For example, the image decoding apparatus 150 may determine square third coding units 1012a and 1012b by splitting the left second coding unit 1010a in a horizontal direction, and may determine square third coding units 1014a and 1014b by splitting the right second coding unit 1010b in a horizontal direction. Furthermore, the image decoding apparatus 150 may determine square third coding units 1016a, 1016b, 1016c, and 1016d by splitting both the left and right second coding units 1010a and 1010b in a horizontal direction. In this case, coding units having the same shape as the four square second coding units 1030a, 1030b, 1030c, and 1030d split from the first coding unit 1000 may be determined.

As another example, the image decoding apparatus 150 may determine square third coding units 1022a and 1022b by splitting the upper second coding unit 1020a in a vertical direction, and may determine square third coding units 1024a and 1024b by splitting the lower second coding unit 1020b in a vertical direction. Furthermore, the image decoding apparatus 150 may determine square third coding units 1026a, 1026b, 1026c, and 1026d by splitting both the upper and lower second coding units 1020a and 1020b in a vertical direction. In this case, coding units having the same shape as the four square second coding units 1030a, 1030b, 1030c, and 1030d split from the first coding unit 1000 may be determined.

Figure 11:
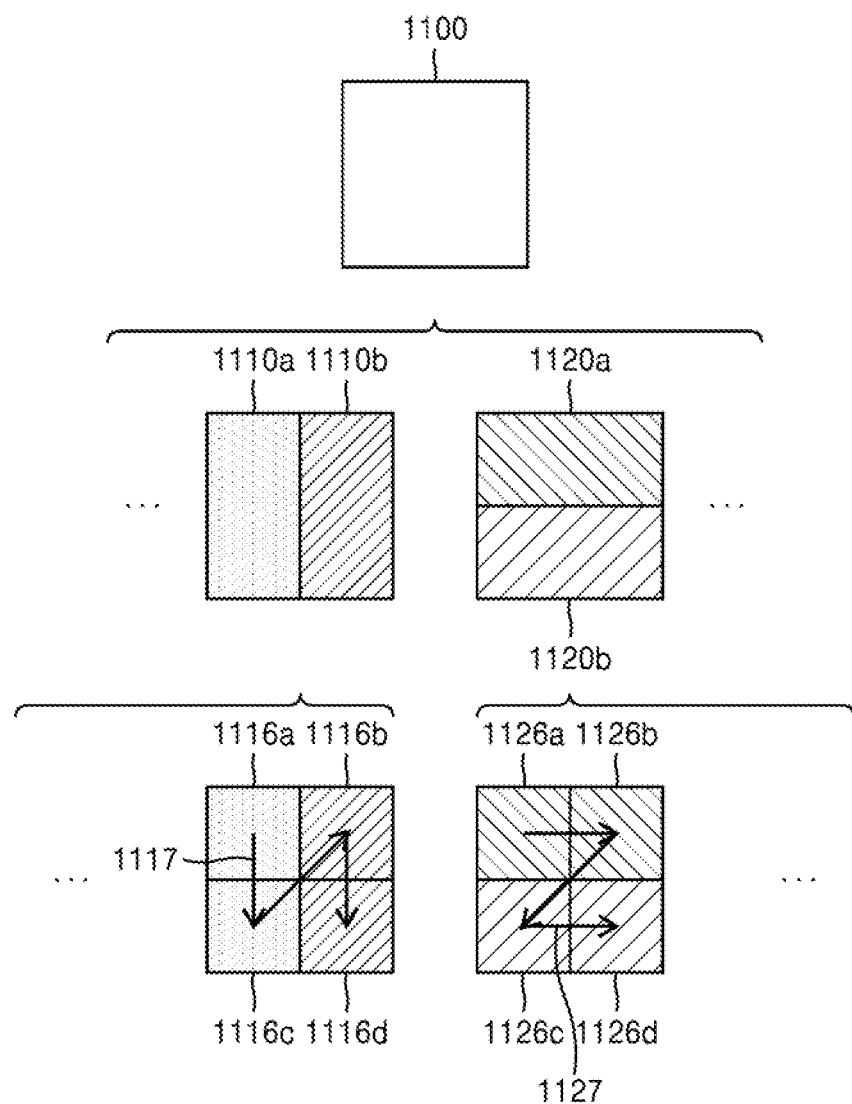
FIG. 11 illustrates that a processing order between a plurality of coding units may be changed depending on a process of splitting a coding unit according to an embodiment.

FIG. 11 illustrates that a processing order between a plurality of coding units may be changed depending on a process of splitting a coding unit according to an embodiment.

According to an embodiment, the image decoding apparatus 150 may split a first coding unit 1100 based on block shape information and split shape information. When the block shape information indicates a square shape and the split shape information indicates to split the first coding unit 1100 in at least one of horizontal and vertical directions, the image decoding apparatus 150 may determine second coding units (e.g., second coding units 1110a, 1110b, 1120a, 1120b, 1130a, 1130b, 1130c, 1130d, etc.) by splitting the first coding unit 1100. Referring to FIG. 11, the non-square second coding units 1110a, 1110b, 1120a, and 1120b determined by splitting the first coding unit 1100 in only a horizontal direction or vertical direction may be independently split based on the block shape information and the split shape information of each coding unit. For example, the image decoding apparatus 150 may determine third coding units 1116a, 1116b, 1116c, and 1116d by splitting the second coding units 1110a and 1110b, which are generated by splitting the first coding unit 1100 in a vertical direction, in a horizontal direction, and may determine third coding units 1126a, 1126b, 1126c, and 1126d by splitting the second coding units 1120a and 1120b, which are generated by splitting the first coding unit 1100 in a horizontal direction, in a vertical direction. An operation of splitting the second coding units 1110a, 1110b, 1120a, and 1120b is described above with reference to FIG. 9, and thus detailed descriptions thereof will not be provided here.

According to an embodiment, the image decoding apparatus 150 may process coding units in a preset order. An operation of processing coding units in a preset order has been described above with reference to FIG. 6, and thus detailed descriptions thereof will not be provided here. Referring to FIG. 11, the image decoding apparatus 150 may determine four square third coding units 1116a, 1116b, 1116c, and 1116d, and 1126a, 1126b, 1126c, and 1126d by splitting the square first coding unit 1100. According to an embodiment, the image decoding apparatus 150 may determine processing orders of the third coding units 1116a, 1116b, 1116c, and 1116d, and 1126a, 1126b, 1126c, and 1126d based on shapes by which the first coding unit 1100 is split.

According to an embodiment, the image decoding apparatus 150 may determine the third coding units 1116a, 1116b, 1116c, and 1116d by splitting the second coding units 1110a and 1110b generated by splitting the first coding unit 1100 in a vertical direction, in a horizontal direction, and may process the third coding units 1116a, 1116b, 1116c, and 1116d in a processing order 1117 for initially processing the third coding units 1116a and 1116c, which are included in the left second coding unit 1110a, in a vertical direction and then processing the third coding unit 1116b and 1116d, which are included in the right second coding unit 1110b, in a vertical direction.

According to an embodiment, the image decoding apparatus 150 may determine the third coding units 1126a, 1126b, 1126c, and 1126d by splitting the second coding units 1120a and 1120b generated by splitting the first coding unit 1100 in a horizontal direction, in a vertical direction, and may process the third coding units 1126a, 1126b, 1126c, and 1126d in a processing order 1127 for initially processing the third coding units 1126a and 1126b, which are included in the upper second coding unit 1120a, in a horizontal direction and then processing the third coding unit 1126c and 1126d, which are included in the lower second coding unit 1120b, in a horizontal direction.

Referring to FIG. 11, the square third coding units 1116a, 1116b, 1116c, and 1116d, and 1126a, 1126b, 1126c, and 1126d may be determined by splitting the second coding units 1110a, 1110b, 1120a, and 1120b, respectively. Although the second coding units 1110a and 1110b are determined by splitting the first coding unit 1100 in a vertical direction differently from the second coding units 1120a and 1120b which are determined by splitting the first coding unit 1100 in a horizontal direction, the third coding units 1116a, 1116b, 1116c, and 1116d, and 1126a, 1126b, 1126c, and 1126d split therefrom eventually show same-shaped coding units split from the first coding unit 1100. As such, by recursively splitting a coding unit in different manners based on at least one of the block shape information and the split shape information, the image decoding apparatus 150 may process a plurality of coding units in different orders even when the coding units are eventually determined to have the same shape.

FIG. 12 illustrates a process of determining a depth of a coding unit as a shape and a size of the coding unit change, when the coding unit is recursively split such that a plurality of coding units are determined according to an embodiment.

According to an embodiment, the image decoding apparatus 150 may determine the depth of the coding unit based on a preset criterion. For example, the preset criterion may be the length of a long side of the coding unit. When the length of a long side of a coding unit before being split is 2n times (n>0) the length of a long side of a split current coding unit, the image decoding apparatus 150 may determine that a depth of the current coding unit is increased from a depth of the coding unit before being split, by n. In the following descriptions, a coding unit having an increased depth is represented as a coding unit of a deeper depth.

Referring to FIG. 12, according to an embodiment, the image decoding apparatus 150 may determine a second coding unit 1202, a third coding unit 1204, etc. of deeper depths by splitting a square first coding unit 1200 based on block shape information indicating a square shape (e.g., the block shape information may indicate '0: SQUARE'). Assuming that the size of the square first coding unit 1200 is 2N×2N, the second coding unit 1202 determined by splitting a width and height of the first coding unit 1200 in half may have a size of N×N. Furthermore, the third coding unit 1204 determined by splitting a width and height of the second coding unit 1202 in half may have a size of N/2×N/2. In this case, a width and height of the third coding unit 1204 correspond to ½ times those of the first coding unit 1200. When a depth of the first coding unit 1200 is D, a depth of the second coding unit 1202, the width and height of which are ½ times those of the first coding unit 1200, may be D+1, and a depth of the third coding unit 1204, the width and height of which are ½ times those of the first coding unit 1200, may be D+2.

According to an embodiment, the image decoding apparatus 150 may determine a second coding unit 1212 or 1222, a third coding unit 1214 or 1224, etc. of deeper depths by splitting a non-square first coding unit 1210 or 1220 based on block shape information indicating a non-square shape (e.g., the block shape information may indicate '1: NS_VER' indicating a non-square shape, a height of which is longer than its width, or as '2: NS_HOR' indicating a non-square shape, a width of which is longer than its height).

The image decoding apparatus 150 may determine the second coding unit 1202, 1212, or 1222 by splitting at least one of a width and height of the first coding unit 1210 having a size of N×2N. That is, the image decoding apparatus 150 may determine the second coding unit 1202 having a size of N×N or the second coding unit 1222 having a size of N×N/2 by splitting the first coding unit 1210 in a horizontal direction, or may determine the second coding unit 1212 having a size of N/2×N by splitting the first coding unit 1210 in horizontal and vertical directions.

According to an embodiment, the image decoding apparatus 150 may determine the second coding unit 1202, 1212, or 1222 by splitting at least one of a width and height of the first coding unit 1220 having a size of 2N×N. That is, the image decoding apparatus 150 may determine the second coding unit 1202 having a size of N×N or the second coding unit 1212 having a size of N/2×N by splitting the first coding unit 1220 in a vertical direction, or may determine the second coding unit 1222 having a size of N×N/2 by splitting the first coding unit 1220 in horizontal and vertical directions.

According to an embodiment, the image decoding apparatus 150 may determine the third coding unit 1204, 1214, or 1224 by splitting at least one of a width and height of the second coding unit 1202 having a size of N×N. That is, the image decoding apparatus 150 may determine the third coding unit 1204 having a size of N/2×N/2, the third coding unit 1214 having a size of N/2×N/2, or the third coding unit 1224 having a size of N/2×N/2 by splitting the second coding unit 1202 in vertical and horizontal directions.

According to an embodiment, the image decoding apparatus 150 may determine the third coding unit 1204, 1214, or 1224 by splitting at least one of a width and height of the second coding unit 1212 having a size of N/2×N. That is, the image decoding apparatus 150 may determine the third coding unit 1204 having a size of N/2×N/2 or the third coding unit 1224 having a size of N/2×N/2 by splitting the second coding unit 1212 in a horizontal direction, or may determine the third coding unit 1214 having a size of N/2×N/2 by splitting the second coding unit 1212 in vertical and horizontal directions.

According to an embodiment, the image decoding apparatus 150 may determine the third coding unit 1204, 1214, or 1224 by splitting at least one of a width and height of the second coding unit 1214 having a size of N×N/2. That is, the image decoding apparatus 150 may determine the third coding unit 1204 having a size of N/2×N/2 or the third coding unit 1214 having a size of N/2×N/2 by splitting the second coding unit 1212 in a vertical direction, or may determine the third coding unit 1224 having a size of N/2×N/2 by splitting the second coding unit 1212 in vertical and horizontal directions.

According to an embodiment, the image decoding apparatus 150 may split a square coding unit (e.g., 1200, 1202, or 1204) in a horizontal or vertical direction. For example, the image decoding apparatus 150 may determine the first coding unit 1210 having a size of N×2N by splitting the first coding unit 1200 having a size of 2N×2N in a vertical direction, or may determine the first coding unit 1220 having a size of 2N×N by splitting the first coding unit 1200 in a horizontal direction. According to an embodiment, when a depth is determined based on the length of a longest side of a coding unit, a depth of a coding unit determined by splitting the first coding unit 1200, 1202, or 1204 having a size of 2N×2N in a horizontal or vertical direction may be the same as a depth of the first coding unit 1200, 1202, or 1204.

According to an embodiment, a width and height of the third coding unit 1214 or 1224 may be ½ times those of the first coding unit 1210 or 1220. When a depth of the first coding unit 1210 or 1220 is D, a depth of the second coding unit 1212 or 1214, the width and height of which are ½ times those of the first coding unit 1210 or 1220, may be D+1, and a depth of the third coding unit 1214 or 1224, the width and height of which are ½ times those of the first coding unit 1210 or 1220, may be D+2.

Figure 13:
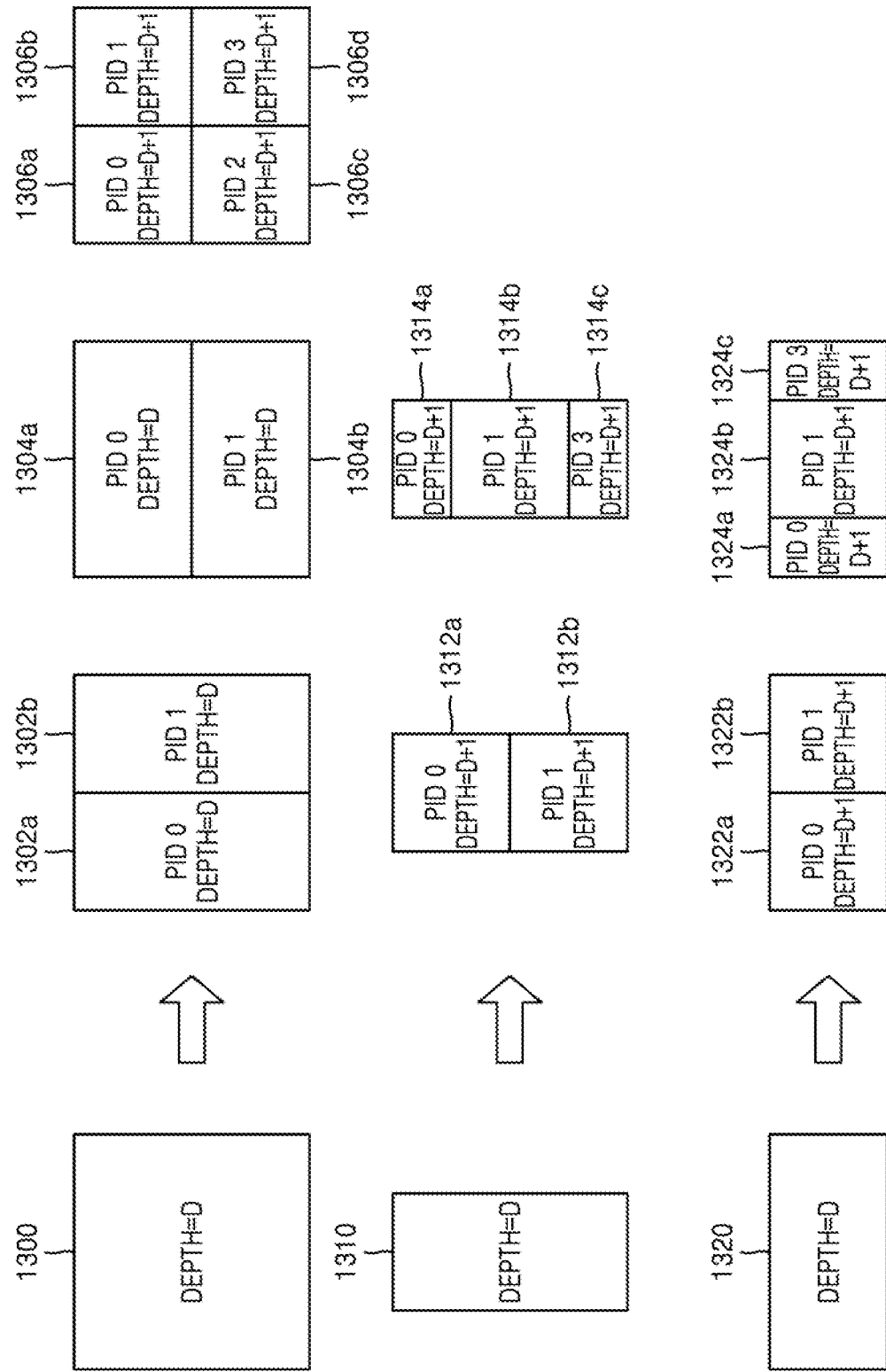
FIG. 13 illustrates depths that are determinable based on shapes and sizes of coding units, and part indexes (PIDs) that are for identifying the coding units according to an embodiment.

FIG. 13 illustrates depths that are determinable based on shapes and sizes of coding units, and part indexes (PIDs) that are for identifying the coding units according to an embodiment.

According to an embodiment, the image decoding apparatus 150 may determine various-shaped second coding units by splitting a square first coding unit 1300. Referring to FIG. 13, the image decoding apparatus 150 may determine second coding units 1302a and 1302b, 1304a and 1304b, and 1306a, 1306b, 1306c, and 1306d by splitting the first coding unit 1300 in at least one of vertical and horizontal directions based on split shape information. That is, the image decoding apparatus 150 may determine the second coding units 1302a and 1302b, 1304a and 1304b, and 1306a, 1306b, 1306c, and 1306d, based on the split shape information of the first coding unit 1300.

According to an embodiment, a depth of the second coding units 1302a and 1302b, 1304a and 1304b, and 1306a, 1306b, 1306c, and 1306d, which are determined based on the split shape information of the square first coding unit 1300, may be determined based on the length of a long side thereof. For example, because the length of a side of the square first coding unit 1300 is equal to the length of a long side of the non-square second coding units 1302a and 1302b, and 1304a and 1304b, the first coding unit 1300 and the non-square second coding units 1302a and 1302b, and 1304a and 1304b may have the same depth, e.g., D. However, when the image decoding apparatus 150 splits the first coding unit 1300 into the four square second coding units 1306a, 1306b, 1306c, and 1306d based on the split shape information, because the length of a side of the square second coding units 1306a, 1306b, 1306c, and 1306d is ½ times the length of a side of the first coding unit 1300, a depth of the second coding units 1306a, 1306b, 1306c, and 1306d may be D+1 which is deeper than the depth D of the first coding unit 1300 by 1.

According to an embodiment, the image decoding apparatus 150 may determine a plurality of second coding units 1312a and 1312b, and 1314a, 1314b, and 1314c by splitting a first coding unit 1310, a height of which is longer than its width, in a horizontal direction based on the split shape information. According to an embodiment, the image decoding apparatus 150 may determine a plurality of second coding units 1322a and 1322b, and 1324a, 1324b, and 1324c by splitting a first coding unit 1320, a width of which is longer than its height, in a vertical direction based on the split shape information.

According to an embodiment, a depth of the second coding units 1312a, 1312b, 1314a, 1314b, and 1314c, or 1322a, 1322b, 1324a, 1324b, and 1324c, which are determined based on the split shape information of the non-square first coding unit 1310 or 1320, may be determined based on the length of a long side thereof. For example, because the length of a side of the square second coding units 1312a and 1312b is ½ times the length of a side of the first coding unit 1310 having a non-square shape, a height of which is longer than its width, a depth of the square second coding units 1302a, 1302b, 1304a, and 1304b is D+1 which is deeper than the depth D of the non-square first coding unit 1310 by 1.

Furthermore, the image decoding apparatus 150 may split the non-square first coding unit 1310 into an odd number of second coding units 1314a, 1314b, and 1314c, based on the split shape information. The odd number of second coding units 1314a, 1314b, and 1314c may include the non-square second coding units 1314a and 1314c and the square second coding unit 1314b. In this case, because the length of a long side of the non-square second coding units 1314a and 1314c and the length of a side of the square second coding unit 1314b are ½ times the length of a side of the first coding unit 1310, a depth of the second coding units 1314a, 1314b, and 1314c may be D+1 which is deeper than the depth D of the first coding unit 1310 by 1. The image decoding apparatus 150 may determine depths of coding units split from the non-square first coding unit 1320, a width of which is longer than its height, by using the above-described method of determining depths of coding units split from the first coding unit 1310.

According to an embodiment, the image decoding apparatus 150 may determine PIDs for identifying split coding units, based on a size ratio between the coding units when an odd number of split coding units do not have equal sizes. Referring to FIG. 13, the coding unit 1314b of a center location among the odd number of split coding units 1314a, 1314b, and 1314c may have a width which is equal to that of the other coding units 1314a and 1314c and a height which is two times that of the other coding units 1314a and 1314c. That is, in this case, the coding unit 1314b at the center location may include two of the other coding unit 1314*a* or 1314*c*. Therefore, when a PID of the coding unit 1314*b* at the center location is 1 based on a scan order, a PID of the coding unit 1314*c* located next to the coding unit 1314*b* may be increased by 2 and thus may be 3. That is, discontinuity in PID values may be present. According to an embodiment, the image decoding apparatus 150 may determine whether an odd number of split coding units do not have equal sizes based on whether discontinuity is present in PIDs for identifying the split coding units.

According to an embodiment, the image decoding apparatus 150 may determine whether to use a specific splitting method based on PID values for identifying a plurality of coding units determined by splitting a current coding unit. Referring to FIG. 13, the image decoding apparatus 150 may determine an even number of coding units 1312*a* and 1312*b* or an odd number of coding units 1314*a*, 1314*b*, and 1314*c* by splitting the first coding unit 1310 having a rectangular shape, a height of which is longer than its width. The image decoding apparatus 150 may use PIDs indicating respective coding units so as to identify the respective coding units. According to an embodiment, the PID may be obtained from a sample of a preset location (e.g., a top left sample) of each coding unit.

According to an embodiment, the image decoding apparatus 150 may determine a coding unit at a preset location from among the split coding units, by using the PIDs for identifying the coding units. According to an embodiment, when the split shape information of the first coding unit 1310 having a rectangular shape, a height of which is longer than its width, indicates to split a coding unit into three coding units, the image decoding apparatus 150 may split the first coding unit 1310 into three coding units 1314*a*, 1314*b*, and 1314*c*. The image decoding apparatus 150 may assign a PID to each of the three coding units 1314*a*, 1314*b*, and 1314*c*. The image decoding apparatus 150 may compare PIDs of an odd number of split coding units to determine a coding unit at a center location from among the coding units. The image decoding apparatus 150 may determine the coding unit 1314*b* having a PID corresponding to a middle value among the PIDs of the coding units, as the coding unit at the center location from among the coding units determined by splitting the first coding unit 1310. According to an embodiment, the image decoding apparatus 150 may determine PIDs for identifying split coding units, based on a size ratio between the coding units when the split coding units do not have equal sizes. Referring to FIG. 13, the coding unit 1314*b* generated by splitting the first coding unit 1310 may have a width which is equal to that of the other coding units 1314*a* and 1314*c* and a height which is two times that of the other coding units 1314*a* and 1314*c*. In this case, when the PID of the coding unit 1314*b* at the center location is 1, the PID of the coding unit 1314*c* located next to the coding unit 1314*b* may be increased by 2 and thus may be 3. When the PID is not uniformly increased as described above, the image decoding apparatus 150 may determine that a coding unit is split into a plurality of coding units including a coding unit having a size different from that of the other coding units. According to an embodiment, when the split shape information indicates to split a coding unit into an odd number of coding units, the image decoding apparatus 150 may split a current coding unit in such a manner that a coding unit of a preset location (e.g., a coding unit of a center location) among an odd number of coding units has a size different from that of the other coding units. In this case, the image decoding apparatus 150 may determine the coding unit of the center location, which has a different size, by using PIDs of the coding units. However, the PID and the size or location of the coding unit of the preset location to be determined are not limited to the above-described examples, and various PIDs and various locations and sizes of coding units may be used.

According to an embodiment, the image decoding apparatus 150 may use a preset data unit where a coding unit starts to be recursively split.

Figure 14:
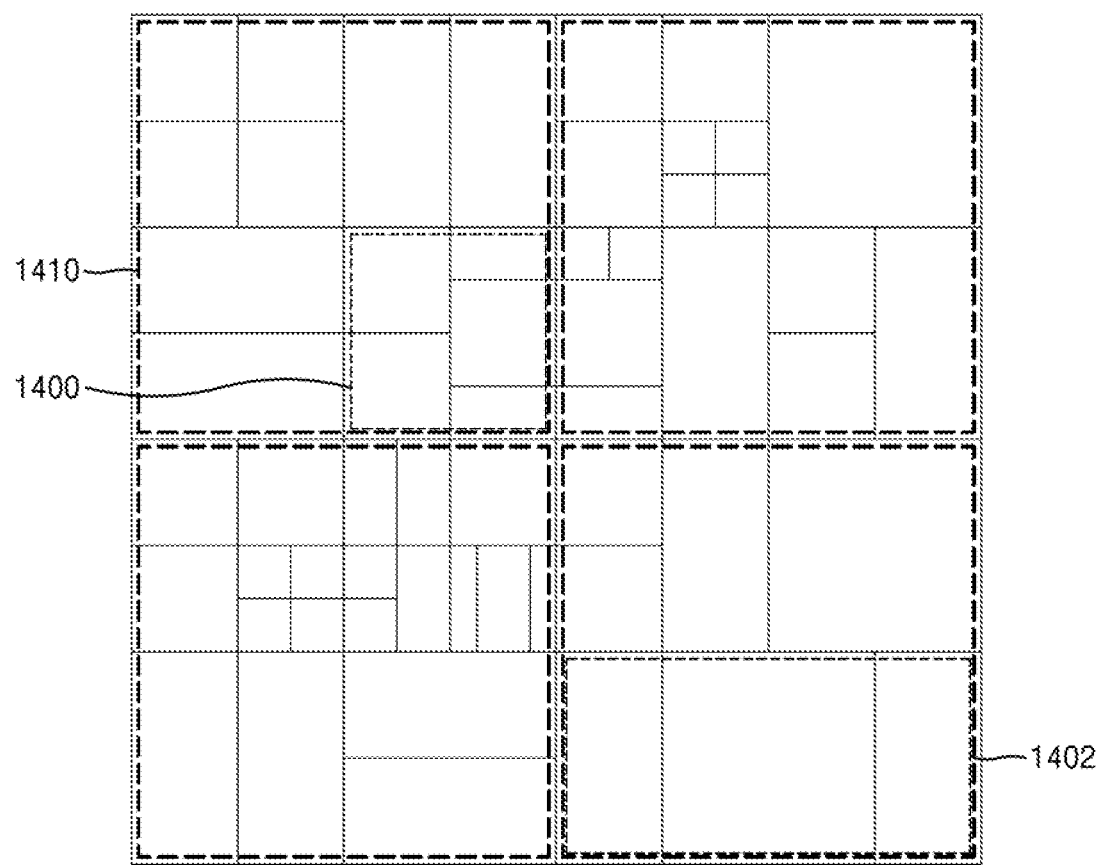
FIG. 14 illustrates that a plurality of coding units are determined based on a plurality of preset data units included in a picture according to an embodiment.

FIG. 14 illustrates that a plurality of coding units are determined based on a plurality of preset data units included in a picture according to an embodiment.

According to an embodiment, a preset data unit may be defined as a data unit where a coding unit starts to be recursively split by using at least one of block shape information and split shape information. That is, the preset data unit may correspond to a coding unit of an uppermost depth, which is used to determine a plurality of coding units split from a current picture. In the following descriptions, for convenience of explanation, the preset data unit is referred to as a reference data unit.

According to an embodiment, the reference data unit may have a preset size and a preset shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 150 may split a current picture into a plurality of reference data units. According to an embodiment, the image decoding apparatus 150 may split the plurality of reference data units, which are split from the current picture, by using split shape information for each reference data unit. An operation of splitting the reference data unit may correspond to a splitting operation using a quadtree structure.

According to an embodiment, the image decoding apparatus 150 may previously determine a minimum size allowed for the reference data units included in the current picture. Accordingly, the image decoding apparatus 150 may determine various reference data units having sizes equal to or greater than the minimum size, and may determine one or more coding units by using the split shape information and block shape information with reference to the determined reference data units.

Referring to FIG. 14, the image decoding apparatus 150 may use a square reference coding unit 1400 or a non-square reference coding unit 1402. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 160 of the image decoding apparatus 150 may obtain, from a bitstream, at least one of reference coding unit shape information and reference coding unit size information for each of the various data units. An operation of determining one or more coding units included in the square reference coding unit 1400 has been described above in relation to the operation of splitting the current coding unit 300 of FIG. 10, and an operation of determining one or more coding units included in the non-square reference coding unit 1402 has been described above in relation to the operation of splitting the current coding unit 1100 or 1150 of FIG. 11, and thus, detailed descriptions thereof will not be provided here.

According to an embodiment, the image decoding apparatus 150 may use a PID for identifying the size and shape of reference coding units, to determine the size and shape of reference coding units according to some data units previously determined based on a preset condition. That is, the receiver 160 may obtain, from the bitstream, only the PID for identifying the size and shape of reference coding units for each slice, slice segment, tile, tile group, or largest coding unit which is a data unit satisfying a preset condition (e.g., a data unit having a size equal to or smaller than a slice) among the various data units (e.g., sequences, pictures, slices, slice segments, tiles, tile groups, largest coding units, or the like). The image decoding apparatus 150 may determine the size and shape of reference data units for each data unit, which satisfies the preset condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be predetermined. That is, the image decoding apparatus 150 may determine at least one of the size and shape of reference coding units included in a data unit serving as a unit for obtaining the PID, by selecting the previously determined at least one of the size and shape of reference coding units based on the PID.

According to an embodiment, the image decoding apparatus 150 may use one or more reference coding units included in one largest coding unit. That is, a largest coding unit split from an image may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 150 may determine the reference coding units by splitting the largest coding unit n times based on a quadtree structure, and may split the reference coding unit based on at least one of the block shape information and the split shape information according to various embodiments.

Figure 15:
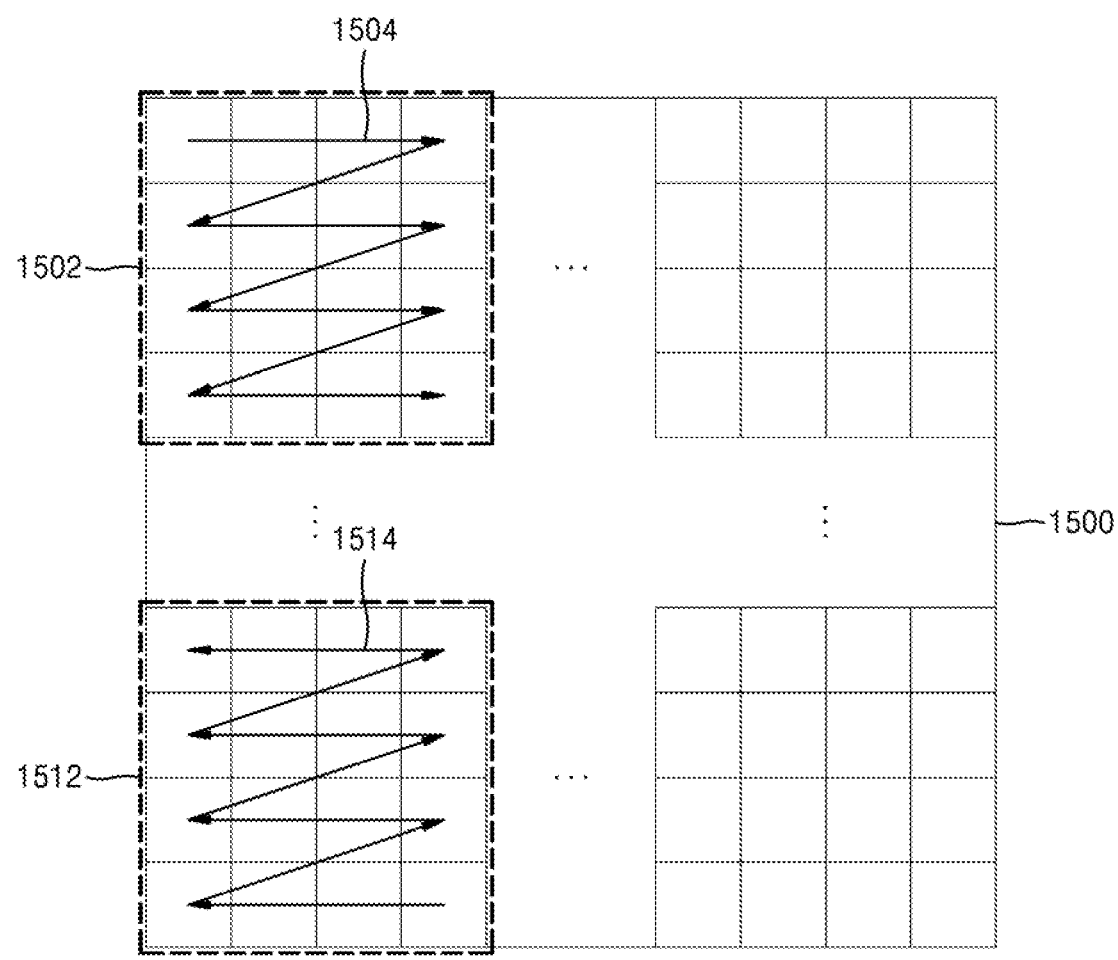
FIG. 15 illustrates a processing block serving as a unit for determining a determination order of reference coding units included in a picture according to an embodiment.

FIG. 15 illustrates a processing block serving as a unit for determining a determination order of reference coding units included in a picture 1500 according to an embodiment.

According to an embodiment, the image decoding apparatus 150 may determine one or more processing blocks split from a picture. The processing block is a data unit including one or more reference coding units split from an image, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined for each processing block, may be one of various orders, e.g., raster scan, Z-scan, N-scan, up-right diagonal scan, horizontal scan, and vertical scan, but is not limited to the above-mentioned scan orders.

According to an embodiment, the image decoding apparatus 150 may obtain processing block size information and may determine the size of one or more processing blocks included in the image. The image decoding apparatus 150 may obtain the processing block size information from a bitstream and may determine the size of one or more processing blocks included in the image. The size of processing blocks may be a preset size of data units, which is indicated by the processing block size information.

According to an embodiment, the receiver 160 of the image decoding apparatus 150 may obtain the processing block size information from the bitstream for each specific data unit. For example, the processing block size information may be obtained from the bitstream in a data unit such as an image, sequence, picture, slice, slice segment, tile, or tile group. That is, the receiver 160 may obtain the processing block size information from the bitstream for each of the various data units, the image decoding apparatus 150 may determine the size of one or more processing blocks, which are split from the picture by using the obtained processing block size information, and the size of the processing blocks may be integer times that of the reference coding units.

According to an embodiment, the image decoding apparatus 150 may determine the size of processing blocks 1502 and 1512 included in the picture 1500. For example, the image decoding apparatus 150 may determine the size of processing blocks based on the processing block size information obtained from the bitstream. Referring to FIG. 15, according to an embodiment, the image decoding apparatus 150 may determine the width of the processing blocks 1502 and 1512 to be four times the width of the reference coding units, and may determine the height of the processing blocks 1502 and 1512 to be four times the height of the reference coding units. The image decoding apparatus 150 may determine a determination order of one or more reference coding units in one or more processing blocks.

According to an embodiment, the image decoding apparatus 150 may determine the processing blocks 1502 and 1512, which are included in the picture 1500, based on the size of processing blocks, and may determine a determination order of one or more reference coding units included in the processing blocks 1502 and 1512. According to an embodiment, determination of reference coding units may include determination of the size of the reference coding units.

According to an embodiment, the image decoding apparatus 150 may obtain, from the bitstream, determination order information of one or more reference coding units included in one or more processing blocks, and may determine a determination order of one or more reference coding units based on the obtained determination order information. The determination order information may be defined as an order or direction for determining the reference coding units in the processing block. That is, the determination order of reference coding units may be independently determined for each processing block.

According to an embodiment, the image decoding apparatus 150 may obtain, from the bitstream, the determination order information of reference coding units for each specific data unit. For example, the receiver 160 may obtain the determination order information of reference coding units from the bitstream according to each data unit such as an image, sequence, picture, slice, slice segment, tile, tile group, or processing block. Because the determination order information of reference coding units indicates an order for determining reference coding units in a processing block, the determination order information may be obtained for each specific data unit including an integer number of processing blocks.

According to an embodiment, the image decoding apparatus 150 may determine one or more reference coding units based on the determined determination order.

According to an embodiment, the receiver 160 may obtain the determination order information of reference coding units from the bitstream as information related to the processing blocks 1502 and 1512, and the image decoding apparatus 150 may determine a determination order of one or more reference coding units included in the processing blocks 1502 and 1512 and may determine one or more reference coding units, which are included in the picture 1500, based on the determination order of the reference coding units. Referring to FIG. 15, the image decoding apparatus 150 may determine determination orders 1504 and 1514 of one or more reference coding units in the processing blocks 1502 and 1512, respectively. For example, when the determination order information of reference coding units is obtained for each processing block, different types of the determination order information of reference coding units may be obtained for the processing blocks 1502 and 1512. When the determination order 1504 of reference coding units in the processing block 1502 is a raster scan order, reference coding units included in the processing block 1502 may be determined according to the raster scan order. On the contrary, when the determination order 1514 of reference coding units in the other processing block 1512 is a backward raster scan order, reference coding units included in the processing block 1512 may be determined according to the backward raster scan order.

With reference to FIGS. 1A to 15, a method of splitting an image into largest coding units and splitting the largest coding units into coding units having a hierarchical tree structure is described. With reference to FIGS. 16 to 28, various embodiments of a block intra predicting method are now provided.

Figure 16:
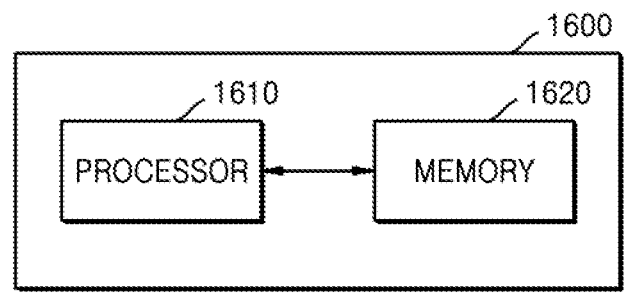
FIG. 16 is a block diagram of a video decoding apparatus 1600 for performing video decoding according to the block intra predicting method.

FIG. 16 is a block diagram of a video decoding apparatus 1600 for performing video decoding according to the block intra predicting method.

Referring to FIG. 16, the video decoding apparatus 1600 according to an embodiment may include a processor 1610 and a memory 1620.

The processor 1610 according to an embodiment may generally control the video decoding apparatus 1600. The processor 1610 according to an embodiment may execute one or more programs stored in the memory 1620.

The memory 1620 according to an embodiment may store various data, program, or application for driving and controlling the video decoding apparatus 1600. The program stored in the memory 1620 may include one or more instructions. The program (the one or more instructions) or the application stored in the memory 1620 may be executed by the processor 1610.

Figure 17:
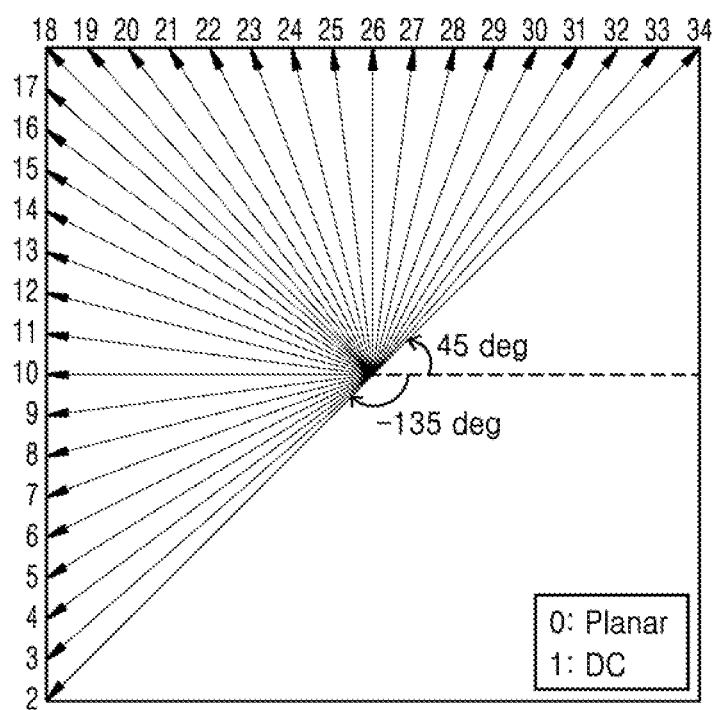
FIGS. 17 and 18 illustrate an intra prediction mode indicating an intra prediction method.
Figure 18:
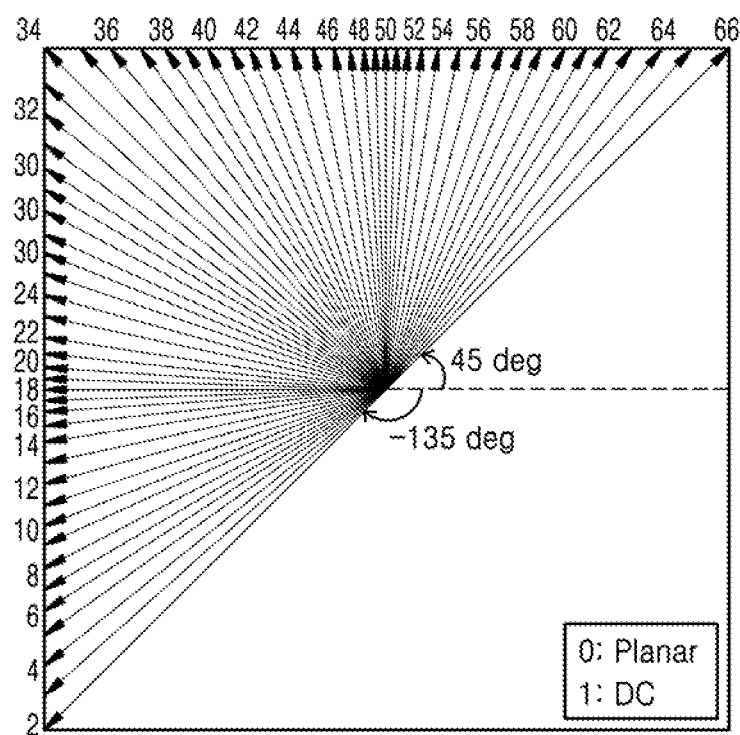

In order to promote understanding of intra prediction to be performed by the processor 1610, FIGS. 17 and 18 illustrate intra prediction modes indicating intra prediction methods. FIG. 17 illustrates 35 intra prediction modes according to an embodiment, and FIG. 18 illustrates 67 intra prediction modes according to another embodiment.

Intra prediction modes according to various embodiments may include a non-angular intra prediction mode including a planar mode and a direct current (DC) mode that do not have directivity, and an angular intra prediction mode having directivity. A non-angular mode may include a plane mode and a bi-linear mode as well as the planar mode and the DC mode.

Referring to FIGS. 17 and 18, the angular intra prediction mode includes intra prediction modes indicating particular directions within a range between −135 degrees and −180 degrees and a range between 45 degrees and 180 degrees with respect to directions of 45 degrees and −135 degrees.

In the descriptions below, angles of prediction directions in a range between 0 degree and 180 degrees which indicate directions on Quadrants I and II may be represented as +, and angles of prediction directions in a range between −180 degrees and 0 degree which indicate directions on Quadrants III and IV may be represented as −. A predetermined angle of −a (where "a" is a positive real number) indicating a direction on Quadrants III and IV corresponds to an angle of (360− a) degrees. For example, the direction of −135 degrees corresponds to the direction of 225 degrees, and the direction of −180 degrees corresponds to the direction of 180 degrees.

Prediction directions represented as arrows shown in FIGS. 17 and 18 indicate directions of adjacent pixels to be used in intra prediction, with respect to a current pixel of a current block which is to be intra predicted. Numbers marked in FIGS. 17 and 18 are examples of intra prediction mode indices (predModeIntra) according to intra prediction directions. Hereinafter, the intra prediction mode indices may also be referred to as predModeIntra. PredModeIntra of the planar mode and predModeIntra of the DC mode, which are the non-angular intra prediction modes, may be set as 0 and 1, respectively.

Referring to FIG. 17, angular intra prediction modes according to an embodiment may include 33 intra prediction modes obtained by dividing a gap between 45 degrees and −135 degrees by 33. The 33 angular intra prediction modes may sequentially have predModeIntra values of 2 through 34 in a clockwise direction from the direction of −135 degrees. For example, in FIG. 17, an intra prediction mode whose predModeIntra is 2 may indicate an intra prediction mode indicating a diagonal direction in the direction of −135 degrees, an intra prediction mode whose predModeIntra is 10 may indicate an intra prediction mode indicating a horizontal direction in the direction of −180 (180) degrees, an intra prediction mode whose predModeIntra is 26 may indicate an intra prediction mode indicating a vertical direction in the direction of 90 degrees, and an intra prediction mode whose predModeIntra is 34 may indicate an intra prediction mode indicating a diagonal direction in the direction of 45 degrees.

Referring to FIG. 18, angular intra prediction modes according to another embodiment may include 65 intra prediction modes obtained by dividing a gap between −135 degrees and −180 degrees and a gap between 45 degrees and 180 degrees with respect to directions of 45 degrees and −135 degrees by 65. The 65 angular intra prediction modes may sequentially have predModeIntra values of 2 through 66 in a clockwise direction from the direction of −135 degrees. For example, in FIG. 18, an intra prediction mode whose predModeIntra is 2 may indicate an intra prediction mode indicating a diagonal direction in the direction of −135 degrees, an intra prediction mode whose predModeIntra is 18 may indicate an intra prediction mode indicating a horizontal direction in the direction of −180 (180) degrees, an intra prediction mode whose predModeIntra is 50 may indicate an intra prediction mode indicating a vertical direction in the direction of 90 degrees, and an intra prediction mode whose predModeIntra is 66 may indicate an intra prediction mode indicating a diagonal direction in the direction of 45 degrees.

However, predModeIntra values of intra prediction modes are not limited to those shown in FIGS. 17 and 18 and may be changed. For example, the number of angular intra prediction modes in a clockwise direction from the direction of 45 degrees may not be limited to 33 or 65 and may be changed, predModeIntra values of the angular intra prediction modes may be sequentially set in a counterclockwise direction from the direction of 45 degrees, and the set predModeIntra values may also be changed. The angular intra prediction modes are not limited thereto and may include a predetermined number of intra prediction modes indicating particular directions in a range between random A degrees (where "A" is a real number) and B degrees (where "B" is a real number).

The intra prediction modes described with reference to FIGS. 17 and 18 are set, in consideration of a square shape. However, as described above with reference to FIGS. 3 to 5, according to an embodiment, data units including a coding unit, a prediction unit, and transform units may each have a square shape or a non-square shape. Also, according to a 4:2:2 format, even when a luma block has a square shape, a block of a chroma component corresponding thereto may have a non-square shape. Also, according to an embodiment, a data unit to be used in intra prediction may not have a fixed size as that of a macroblock according to the related art but may have various sizes.

According to an embodiment, in a case where an intra prediction mode of the luma block is applied to the chroma block, when shapes of the luma block and the chroma block are different, a prediction direction of the intra prediction mode to be applied to the luma block may be different from a prediction direction of the intra prediction mode to be applied to the chroma block. According to an embodiment, even when the shapes of the luma block and the chroma block are different, the intra prediction mode of the luma block may be changelessly applied to the chroma block. According to another embodiment, when the shapes of the luma block and the chroma block are different, the prediction direction the intra prediction mode which is applied to the luma block may be applied to the chroma block. In the embodiment, an index value of the intra prediction mode applied to the luma block may be different from an index value of the intra prediction mode applied to the chroma block.

Therefore, according to a 4:2:2 format, when the luma block has a square shape and the chroma block has a non-square shape, even when the prediction direction of the luma block and the prediction direction of the chroma block are determined to be the same, index values of the intra prediction modes of the luma block and the chroma block may be different.

According to an embodiment, according to the luma block and the chroma block, the number of intra prediction mode candidates may be adaptively determined. For example, when the intra prediction mode of FIG. 18 is used for the luma block, the intra prediction mode of FIG. 17 may be used for the chroma block. Alternatively, in contrast, when the intra prediction mode of FIG. 17 is used for the luma block, the intra prediction mode of FIG. 18 may be used for the chroma block.

According to an embodiment, an intra prediction mode candidate to be used in intra prediction of a current block may be adaptively changed, in consideration of at least one of a size and a shape of the current block.

In detail, according to an embodiment, directions and the number of intra prediction modes to be applied to the current block may be adaptively set, in proportion to the size of the current block to be intra predicted. The number of intra prediction modes that are applicable to the current block may be increased, in proportion to the size of the current block. Also, according to an embodiment, blocks may be grouped according to their sizes, and the number of intra prediction modes to be applied to a group of larger blocks may be increased. For example, when the size of the current block is equal to or smaller than 8×8, a minimum a number (where a is a positive integer) of intra prediction modes may be applied, a b number (where b is a positive integer, b>a) of intra prediction modes may be applied to 16×16 and 32×32 blocks, and a c number (where c is a positive integer, c>b) of intra prediction modes may be applied to blocks equal to or greater than 64×64.

On the other hand, according to another embodiment, directions and the number of intra prediction modes to be applied to the current block may be adaptively set, in inverse proportion to the size of the current block to be intra predicted. That is, the number of intra prediction modes that are applicable to the current block may be decreased, in proportion to the size of the current block. Also, according to an embodiment, blocks may be grouped according to their sizes, and the number of intra prediction modes to be applied to a group of larger blocks may be decreased. For example, when the size of the current block is equal to or smaller than 8×8, a maximum c number of intra prediction modes may be applied, a b number of intra prediction modes may be applied to 16×16 and 32×32 blocks, and an a number of intra prediction modes may be applied to blocks equal to or greater than 64×64.

According to another embodiment, the number of intra prediction modes to be applied to blocks of all sizes may be equal, regardless of sizes of the blocks.

According to an embodiment, the number of intra prediction modes may be determined based on an intra prediction mode number flag obtained for a picture unit, a coding tree unit (CTU) unit, or a coding unit (CU).

Also, according to another embodiment, directions and the number of intra prediction modes to be applied to the current block may be adaptively set, based on a shape of the current block or a height and width of the current block. In detail, when the current block has a square shape, as described above with reference to FIGS. 17 and 18, predetermined intra prediction modes may be used, and when the current block has a non-square shape, intra prediction modes may be set to finely indicate one of a height direction and a width direction. Hereinafter, with reference to FIGS. 19A and 19B, an embodiment of intra prediction modes to be applied to a non-square shape will now be described.

Figure 19A:
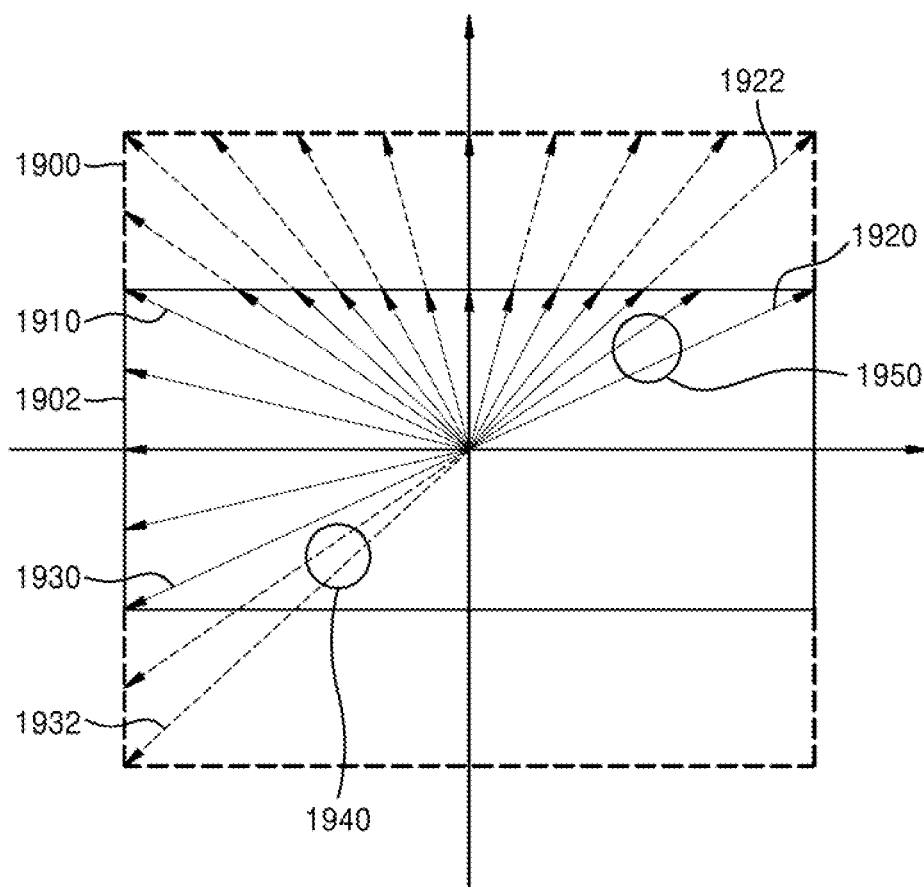
FIGS. 19A and 19B illustrate an embodiment of intra prediction modes to be applied to a non-square shape.

Referring to FIG. 19A, intra prediction directions to be applied to a non-square shape block 1902 may include a first intra prediction direction 1910 that is a direction indicating a top-left vertex from a center of the block 1900, a second intra prediction direction 1920 that is a direction indicating a top-right vertex from the center of the block 1900, and a third intra prediction direction 1930 that is a direction indicating a bottom-left vertex from the center of the block 1900. Also, the intra prediction directions to be applied to the non-square shape block 1902 may include vertical-part intra prediction directions between the first intra prediction direction 1910 and the second intra prediction direction 1920, and horizontal-part intra prediction directions between the first intra prediction direction 1910 and the third intra prediction direction 1930.

According to an embodiment, some of the intra prediction directions that are applicable to the square shape block 1900 may also be applied to a non-square shape block 1902. For example, a fourth intra prediction direction 1922, a third intra prediction direction 1930, and intra prediction directions between the fourth intra prediction direction 1922 and the third intra prediction direction 1930 which are applicable to the square shape block 1900 may also be applied to the non-square shape block 1902.

However, because a fifth intra prediction direction 1932 and intra prediction directions 1940 between the third intra prediction direction 1930 and the fifth intra prediction direction 1932 indicate a lower part of the non-square shape block 1902, they are not used in intra prediction of the non-square shape block 1902. On the other hand, the second intra prediction direction 1920 and intra prediction directions 1950 between the second intra prediction direction 1920 and the fourth intra prediction direction 1922 which are not applied to the square shape block 1900 may be applied to the non-square shape block 1902.

According to an embodiment, the number of horizontal-part intra prediction directions and the number of vertical-part intra prediction directions may be set based on a width and a height of a block. With respect to a non-square shape block, the number of intra prediction directions indicating a long side may be set to be greater than the number of intra prediction directions indicating a shorter side. For example, because the block 1902 has a width that is greater than its height, the number of vertical-part intra prediction directions indicating a top side is set to be greater than the number of horizontal-part intra prediction directions indicating a left side.

In contrast, with respect to a non-square shape block, the number of intra prediction directions indicating a long side may be set to be smaller than the number of intra prediction directions indicating a shorter side. For example, in a manner opposite to the descriptions above, in FIG. 19, the number of horizontal-part intra prediction directions may be set to be greater than the number of vertical-part intra prediction directions.

According to various embodiments, a horizontal intra prediction direction in the direction of 180 degrees and a vertical intra prediction direction in the direction of 90 degrees are generally determined to be intra prediction directions, such that intra prediction directions may be set to densely indicate a horizontal direction in the direction of 180 degrees or a vertical direction in the direction of 90 degrees.

Figure 19B:
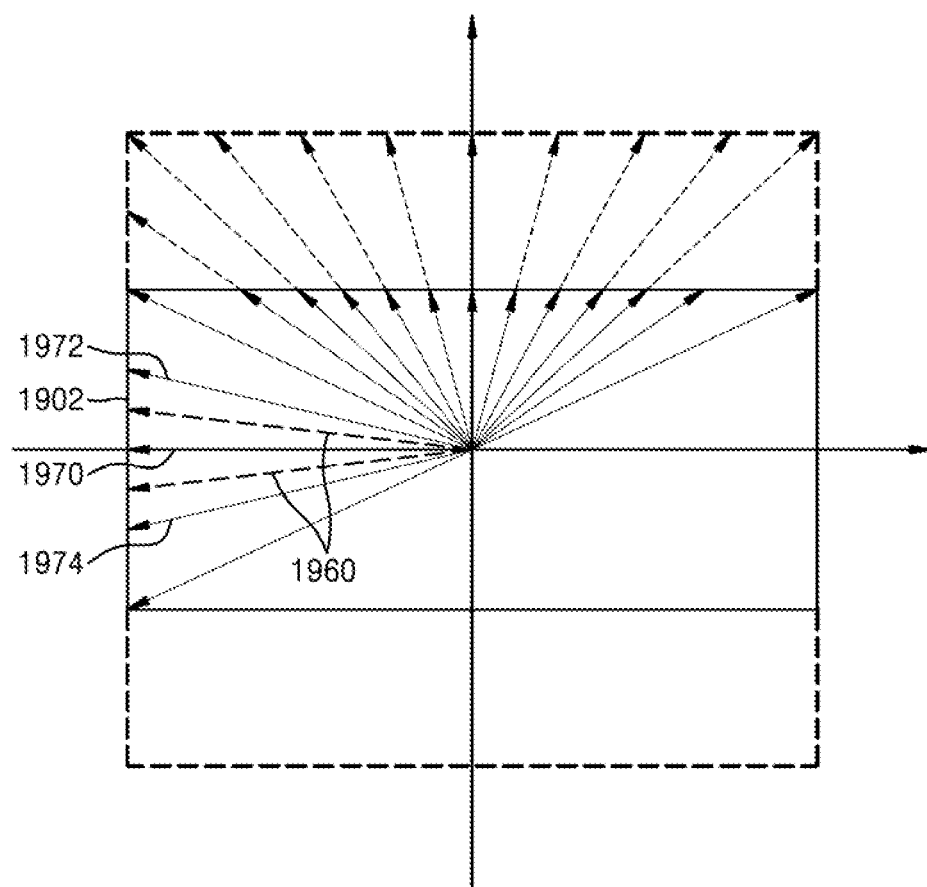

According to another embodiment, with respect to a non-square shape block, an angle between intra prediction directions indicating a side distant from a center of a block may be set to be smaller than an angle between intra prediction directions indicating a side close to the center of the block. Referring to FIG. 19B, a distance between a center of the block 1902 and a left side may be greater than a distance between the center of the block 1902 and an upper side. Accordingly, angles between horizontal-part intra prediction directions of the block 1902 may be set to be smaller than angles between vertical-part intra prediction directions of the block 1902.

For example, two additional horizontal-part intra prediction directions 1960 may be added to the horizontal-part intra prediction directions. The two additional horizontal-part intra prediction directions 1960 may be positioned among a first horizontal intra prediction direction 1970, a second horizontal intra prediction direction 1972, and a third horizontal intra prediction direction 1974. Also, although not illustrated in FIG. 19B, instead of the two additional horizontal-part intra prediction directions 1960 being added to the block 1902, two vertical intra prediction directions from among illustrated vertical intra prediction directions may be excluded from intra prediction directions of the block 1902.

Hereinafter, a method of determining intra prediction direction candidates of a current block, based on a shape of the current block, and determining an intra prediction direction of the current block from among the intra prediction direction candidates will now be described.

The processor 1610 obtains, from a bitstream, intra prediction mode information of a current block. Then, the processor 1610 determines an intra prediction mode of the current block, based on the intra prediction mode information of the current block.

According to an embodiment, the processor 1610 may configure a Most Probable Mode (MPM) list by using an intra prediction mode of an adjacent block of the current block. Then, the processor 1610 may determine the intra prediction mode of the current block, based on the determined MPM list.

Intra prediction modes included in the MPM list are determined based on a prediction mode of a left adjacent block of the current block and a prediction mode of an upper adjacent block of the current block. When the current block has a non-square shape, priorities of MPMs included in the MPM list may be determined based on a height and a width of the current block.

When the intra prediction mode of the current block is an angular intra prediction mode, the processor 1610 determines an intra prediction direction of the current block which corresponds to the intra prediction mode of the current block, based on the height and the width of the current block.

When the current block has a square shape where the width and the height are equal, the processor 1610 determines a first intra prediction direction candidate, which is indicated by the intra prediction mode, to be the intra prediction direction of the current block, from among a plurality of first intra prediction direction candidates set based on the square shape.

When the current block has a non-square shape where the width and the height are not equal, the processor 1610 determines a second intra prediction direction candidate, which is indicated by the intra prediction mode, to be the intra prediction direction of the current block, from among a plurality of second intra prediction direction candidates set based on the non-square shape.

According to an embodiment, when the current block has a non-square shape whose width is greater than its height, the second intra prediction direction candidates may include, instead of a preset number of intra prediction directions selected in a lower-left direction from among the first intra prediction direction candidates, intra prediction directions set in an upper-right direction other than intra prediction directions included in the first intra prediction direction candidates. Also, when the current block has a non-square shape whose height is greater than its width, the second intra prediction direction candidates may include, instead of a preset number of intra prediction directions selected in an upper-right direction from among the first intra prediction direction candidates, intra prediction directions set in a lower-left direction other than intra prediction directions included in the first intra prediction direction candidates.

According to an embodiment of the disclosure, the intra prediction direction included in the second intra prediction direction candidates, other than the intra prediction direction included in the first intra prediction direction candidates, may indicate a direction opposite to a particular direction indicated by a substituted intra prediction direction included in the first intra prediction direction candidates.

According to an embodiment of the disclosure, when the current block has the non-square shape whose width is greater than its height, the second intra prediction direction candidates may further include an intra prediction direction indicating a direction close to a horizontal direction, in addition to the first intra prediction direction candidates. Also, when the current block has the non-square shape whose height is greater than its width, the second intra prediction direction candidates may further include an intra prediction direction indicating a direction close to a vertical direction, in addition to the first intra prediction direction candidates.

According to an embodiment, the second intra prediction direction candidates may be determined, according to a ratio of the height and the width of the current block having a non-square shape. In FIGS. 19A and 19B, a ratio of the height and the width of the block 1902 is 1:2, and intra prediction direction candidates of the block 1902 are determined by deleting unnecessary intra prediction directions from the intra prediction direction candidates of the block 1902 and adding a necessary intra prediction direction thereto. When a ratio of a height and a width of a block includes 1:4, 1:8, 1:16, 2:1, 4:1, 8:1, and 16:1, intra prediction direction candidates may be determined according to the method described with reference to FIGS. 19A and 19B. Furthermore, when a ratio of the height and the width of the block includes $2^n:1$ and $1:2^n$ (where n is an integer), an intra prediction direction look-up table indicating intra prediction direction candidates according to the method described with reference to FIGS. 19A and 19B may be preset.

However, when an intra prediction direction look-up table is set even when a ratio of the height and the width of the block includes $2^n:m$ and $m:2^n$ (where n is a natural number and m is an odd number other than 1), coding complexity may increase. Therefore, for the above case, an intra prediction direction look-up table that is preset for similar ratios of a height and a width may be used. For example, when a ratio of a height and a width of a block is 3:4, 4:3, 7:8, or 8:7, an intra prediction direction look-up table used when a ratio of the height and the width of the block is 1:1 may be used for the block. As another example, when a ratio of a height and a width of a block is 3:8 or 5:8, an intra prediction direction look-up table used when a ratio of the height and the width of the block is 1:2 may be used for the block. Also, when a ratio of a height and a width of a block is 8:3 or 8:5, an intra prediction direction look-up table used when a ratio of the height and the width of the block is 2:1 may be used for the block.

According to another embodiment, when a difference between sizes of a height and a width of a block is large, a particular intra prediction direction look-up table may be used. For example, when a difference between sizes of the height and the width of the current block is at least 8 times, an intra prediction direction look-up table used when a ratio of a height and a width of a block is 4:1 or 1:4 may be used for the current block. As another example, when a difference between sizes of the height and the width of the current block is at least 16 times, an intra prediction direction look-up table used when a ratio of a height and a width of a block is 8:1 or 1:8 may be used for the current block.

The processor 1610 intra predicts the current block according to the intra prediction direction of the current block, thereby obtaining a prediction block of the current block. Then, the processor 1610 reconstructs the current block according to the prediction block.

When the processor 1610 intra predicts the current block in a manner described above, technical characteristics of the intra prediction directions of FIGS. 17 to 19B may be applied.

Hereinafter, an MPM list used when the processor 1610 determines an intra prediction mode will now be described in detail.

As described above, a total of 35 or 67 intra prediction modes including two non-angular modes of a DC mode and a planar mode, and 33 or 65 angular prediction modes may be used. As the number of intra prediction modes is increased, an amount of information to indicate an intra prediction mode of a current block may be increased. In general, when an image is processed by being split into blocks, a current block and its adjacent block have a high probability of a similar image characteristic. Therefore, there is a high probability that an intra prediction mode of an intra-predicted current block is equal to or similar to an intra prediction mode of an adjacent block. According to various embodiments, based on the fact that adjacent blocks have a high probability of a similar characteristic therebetween, an intra prediction mode candidate list including candidate intra prediction modes may be obtained by using prediction mode information of an adjacent block of a current block, the candidate intra prediction modes having a high probability to be an intra prediction mode of the current block. Hereinafter, the intra prediction mode candidate list obtained by using the prediction mode information of the adjacent block may be referred to as an MPM list.

When the intra prediction mode of the current block is one in the MPM list, an amount of bits required to signal the intra prediction mode of the current block may be decreased. For example, when the number of all intra prediction modes is 67, at least 7 bits are required to signal one of 67 intra prediction modes. However, when 5 or 6 MPM lists are used, there is a high probability that the intra prediction mode of the current block is determined to be one in the MPM lists, and even when the intra prediction mode of the current block is not included in the MPM lists, the rest of intra prediction modes may be signaled by using only 6 bits except for 5 or 6 MPM lists. Therefore, when an MPM list is used, an amount of all bits required to signal an intra prediction mode of an intra-predicted block from among blocks constituting a picture may be decreased.

An MPM list may be obtained by using a prediction mode A of a left adjacent block and a prediction mode B of an upper adjacent block which are processed before a current block. The left adjacent block may be a block including a pixel located in the left of a bottom-left pixel located at a bottom-left vertex of the current block.

Hereinafter, in an embodiment of an MPM list determining method, it is assumed that 67 intra prediction modes including two non-angular intra prediction modes (planar and DC) and 65 angular intra prediction modes as shown in FIG. 18 are used, and predmodeIntra of a planar mode is 0, predModeIntra of a DC mode is 1, and predModeIntra of 2 to 66 are set in a clockwise direction to the angular intra prediction modes. As described above, predModeIntra of an intra prediction mode indicating a horizontal direction (H) may be set to 18, and predModeIntra of an intra prediction mode indicating a vertical direction (V) may be set to 50. Also, it is assumed that 6 intra prediction mode candidates are included in the MPM list.

According to an embodiment, first, availability of the left adjacent block and the upper adjacent block is checked. When it is determined that an adjacent block or an inter-predicted adjacent block included in a tile or slice different from the current block is not available, an intra prediction mode of the adjacent block determined to be not available is set to be a planar mode whose predModeIntra is 0, as a default. When an adjacent block is included in a same tile or slice as the current block and is intra predicted, an intra prediction mode of the adjacent block is changelessly set to be an intra prediction mode of the adjacent block. When intra prediction modes of the left adjacent block and the upper adjacent block are all non-angular intra prediction modes, i.e., a planar mode or a DC mode, the MPM list may include {planar, DC, H, V, V+4, V−4} or may include {planar, DC, H, V, H+4, H−4}. H denotes a horizontal intra prediction mode, and V denotes a vertical intra prediction mode. For example, in a case where an intra prediction mode of the left adjacent block is a DC intra prediction mode (predModeIntra=1), and the upper adjacent block is a planar mode (predModeInta=0), the MPM list may include {0, 1, 50, 18, 46, 54} or {0, 1, 50, 18, 14, 22}.

In a case where one of the intra prediction modes of the left adjacent block and the upper adjacent block is a non-angular intra prediction mode and the other one is an angular intra prediction mode, a greater intra prediction mode index from among intra prediction mode indices A and B of the left adjacent block and the upper adjacent block is set as maxAB. That is, when it is assumed that predModeIntra of the intra prediction mode of the left adjacent block is A and predModeIntra of the intra prediction mode of the upper adjacent block is B, maxAB=Max(A, B). In this case, the MPM list may include {planar, maxAB, DC, maxAB−1, maxAB+1, maxAB−2}. For example, in a case where the intra prediction mode of the left adjacent block has an intra prediction mode index of 60 (predModeIntra=60), and the upper adjacent block is a DC mode (predModeInta=1), maxAB=Max(60, 1)=60, and the MPM list includes {0, 60, 1, 59, 61, 58}.

When the intra prediction modes of the left adjacent block and the upper adjacent block are all angular intra prediction modes and are not same intra prediction modes, the MPM list may be set based on an angular difference between the intra prediction modes of the left adjacent block and the upper adjacent block. When a value of a difference between predModeIntra (A) of the left adjacent block and predModeIntra (B) of the upper adjacent block is within a predetermined range, e.g., between 2 and 62, the MPM list may include {planar, A, B, DC, maxAB−1, maxAB+1}. For example, in a case where the intra prediction mode of the left adjacent block has predModeIntra of 60, and the upper adjacent block has predModeIntra of 50, a value of a difference between predModeIntra (A) of the left adjacent block and predModeIntra (B) of the upper adjacent block is included in a range of 2 to 60, and thus, the MPM list includes {0, 60, 50, 1, 59, 61}.

In a case where a value of a difference between predModeIntra (A) of the left adjacent block and predModeIntra (B) of the upper adjacent block is smaller than 2 or greater than 62, the MPM list may include {planar, A, B, DC, maxAB−2, maxAB+2}. For example, in a case where the intra prediction mode of the left adjacent block has predModeIntra of 3, and the upper adjacent block has predModeIntra of 4, the MPM list includes {0, 3, 4, 1, 2, 6}.

When the intra prediction modes of the left adjacent block and the upper adjacent block are all angular intra prediction modes and same intra prediction modes, the MPM list may include {planar, A, A−1, A+1, DC mode, A−2} or {planar, B, B−1, B+1, DC mode, B−2}. For example, when all the intra prediction modes of the left adjacent block and the upper adjacent block have predModeIntra of 60, the MPM list may include {0, 60, 59, 61, 1, 58}.

Various tools including multi-reference line extension in which, as a reference sample of a current block, not only adjacent samples adjacent to the current block but also adjacent samples distant from the current block by a predetermined distance are selectively used, intra sub-partitioning in which a block to be intra predicted is split into sub-partitions, a hybrid prediction method where inter prediction and intra prediction are combined, or the like may be used in a process of encoding/decoding the current block. In order to decrease complexity, an MPM list may be selectively set according to a tool used in an encoding process of the current block. For example, when the multi-reference line extension is used in the encoding process of the current block, a planar mode and a DC mode may be excluded from the MPM list, and when the intra sub-partitioning is used, the DC mode may be excluded from the MPM list. For a block for which neither the multi-reference line extension nor the intra sub-partitioning is used, the planar mode and the DC mode are included in the MPM list, such that complexity of when the MPM list is set may be decreased. However, when a MPM list generation scheme is changed according to whether or not a particular tool is used, a possibility that an intra prediction mode biased toward the particular tool is to be selected may be increased.

According to an embodiment, a MPM list may be selectively used based on encoding information of an intra-predicted current block. In other words, according to an embodiment, it is not the case that a MPM list is used for all intra-predicted current block or an intra prediction mode of a current block is determined from candidate intra prediction modes included in a MPM list. Only when encoding information of a current block satisfies a particular condition, a MPM list may be used or an intra prediction mode of the current block may be determined from candidate intra prediction modes included in a MPM list.

According to an embodiment, when encoding information related to an intra-predicted block satisfies a predetermined condition, a MPM list may be generated without separate flag information. When the encoding information related to the intra-predicted block does not satisfy the predetermined condition, separate flag information related to whether to generate the MPM list for the intra-predicted block may be signaled. Also, according to an embodiment, before a MPM list is generated, whether an intra prediction mode of a current block is a particular intra prediction mode (e.g., a non-angular mode) may be first determined, and then, when the intra prediction mode of the current block is not the particular intra prediction mode, the MPM list may be generated, and an intra prediction mode of the current block may be determined by using a MPM index (MPM idx) indicating one of candidate intra prediction modes included in the MPM list. Also, whether to apply an encoding tool to be used for a current block may be determined from intra prediction mode candidates included in a MPM list. According to another embodiment, a MPM list of a current block may be equally generated, regardless of encoding information related to the current block. The encoding information may include information about whether to apply a predetermined encoding tool applied to the current block, reference sample information to be used in intra prediction with respect to the current block, and sub-partition information indicating whether the current block is to be split into sub-partitions.

Figure 20:
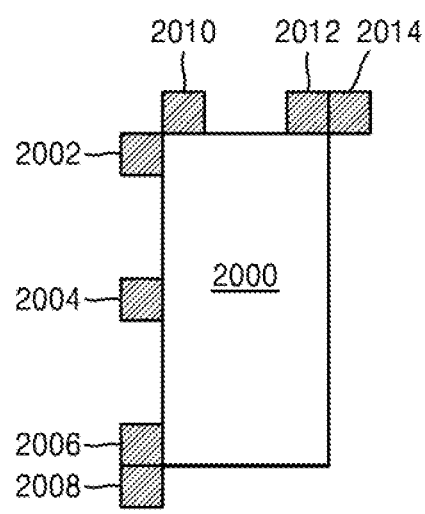
FIG. 20 illustrates an embodiment of a method of determining a Most Probable Mode (MPM) of a non-square block.

With reference to FIG. 20, a method of determining an MPM of a non-square block according to an embodiment will now be described.

According to an embodiment, in order to determine a prediction mode of a left adjacent block, samples 2002, 2004, 2006, and 2008 positioned in the left of a current block 2000 may be scanned from top to bottom. When it is possible to extract an intra prediction mode from a block located at the sample 2002, the intra prediction mode extracted from the block located at the sample 2002 When it is not possible to extract the intra prediction mode from the block located at the sample 2002, whether it is possible to extract an intra prediction mode from a block located at the sample 2204 may be determined. Equally, when it is not possible to extract the intra prediction mode from the block located at the sample 2004, whether it is possible to extract an intra prediction mode is determined sequentially with respect to a block located at the sample 2206 and a block located at the sample 2208.

According to an embodiment, the samples 2002, 2004, 2006, and 2008 may be scanned from bottom to top. Alternatively, unlike FIG. 20, the number of samples to be scanned may be determined to be equal to or smaller than 3 or equal to or greater than 5.

According to an embodiment, in order to determine a prediction mode of an upper adjacent block, samples 2010, 2012, and 2014 located above the current block 2000 may be sequentially scanned from left to right. Until a block from which an intra prediction mode is not detectable is found, the samples 2010, 2012, and 2014 located above may be scanned. According to an embodiment, the samples 2010, 2012, and 2014 located above may be sequentially scanned from right to left. Alternatively, unlike FIG. 20, the number of samples to be scanned may be determined to be equal to or smaller than 2 or equal to or greater than 4.

In FIG. 20, because a height of the block 2000 is greater than its width, the number of the samples 2002, 2004, 2006, and 2008 located in the left which are necessary to determine an MPM is greater than the number of the samples 2010, 2012, and 2014 located above. On the contrary, unlike FIG. 20, when a width of a block is greater than its height, the number of samples located above which are necessary to determine an MPM may be determined to be greater than the number of samples located in the left. Alternatively, according to an embodiment, regardless of a height and a width of a block, the number of samples located in the left which are necessary to determine an MPM may be determined to be equal to the number of samples located above.

According to an embodiment, with respect to a non-square block, two or more intra prediction modes may be extracted from a longer side from among a height and a width. For example, because a height of the block 2000 is greater than its width, two or more intra prediction modes may be extracted from the samples 2002, 2004, 2006, and 2008 located in the left. Then, based on the two or more intra prediction modes extracted from the samples 2002, 2004, 2006, and 2008 located in the left and one intra prediction mode extracted from the samples 2010, 2012, and 2014 located above, an MPM list may be determined. Also, according to an embodiment, two or more intra prediction modes may be extracted from the samples 2010, 2012, and 2014 located above. Then, an MPM list may be determined based on the two or more intra prediction modes extracted from the samples 2010, 2012, and 2014 located above.

According to an embodiment, with respect to a non-square block, an intra prediction mode extracted from a longer side from among a height and a width has priority over an intra prediction mode extracted from a shorter side in an MPM list. For example, because a height of the block 2000 is greater than its width, an intra prediction mode extracted from the samples 2002, 2004, 2006, and 2008 located in the left may have priority over an intra prediction mode extracted from the samples 2010, 2012, and 2014 located above in an MPM list.

According to an embodiment, an MPM index used in intra prediction of an adjacent block may be obtained from the adjacent block neighboring a current block. Then, based on the MPM index of the adjacent block, priorities of MPMs in an MPM list of the current block may be changed. For example, when a plurality of MPM indices extracted from a plurality of adjacent blocks neighboring the block 2000 indicate an MPM No. 2, the MPM list may be changed such that the MPM No. 2 has higher priority in the MPM list of the block 2000.

Hereinafter, a technical characteristic of adaptively selecting an interpolation filter for a current block, the interpolation filter being used in intra prediction, will now be described.

The processor 1610 obtains intra prediction mode information indicating an intra prediction mode of a current block from a bitstream. The intra prediction mode information may be obtained with respect to the current block. Alternatively, the intra prediction mode information may be obtained with respect to an upper block of the current block. For example, the current block may be a transformation block, and the upper block may be a coding block including the current block. The processor 1610 may determine an intra prediction mode of the current block by parsing the intra prediction mode information.

Based on the intra prediction mode of the current block, the processor 1610 may determine reference samples to be used in intra prediction of the current block, from adjacent samples of the current block.

The processor 1610 may determine whether to filter the reference samples. Then, the processor 1610 may filter the reference samples according to a reference sample interpolation filter. Because the reference samples are filtered, continuity between adjacent reference samples may increase.

According to an embodiment, when a size of the current block is greater than a preset block size, the processor 1610 may filter the reference samples. When the size of the current block is small, a coding efficiency increase due to reference sample filtering may not be significant. Therefore, when the size of the current block is smaller than the preset block size, the processor 1610 does not filter the reference samples, thereby increasing coding efficiency and decreasing coding complexity.

According to an embodiment, the processor 1610 may determine whether to filter the reference samples, according to an interpolation filter set to be used in prediction of a current sample. For example, the reference samples are filtered according to a smoothing filter. Therefore, as the reference samples are filtered according to the smoothing filter, continuity between the reference samples increases. Therefore, in a case where the interpolation filter set includes a sharp filter that lowers continuity between reference samples, it is not necessary to filter the reference samples. Therefore, when a selected interpolation filter set corresponds to a sharp filter set, the processor 1610 may not filter the reference samples.

Alternatively, even when the selected interpolation filter set corresponds to a smoothing filter, the processor 1610 may not filter the reference samples. Because the reference sample is smoothed according to the interpolation filter set, it may not be necessary to previously filter the reference sample according to the smoothing filter. According to an embodiment, when a particular interpolation filter set is selected among a plurality of interpolation filter set candidates, it may be set not to filter a reference sample.

According to an embodiment, the processor 1610 may determine a reference sample filtering flag indicating whether to filter a reference sample, according to an intra prediction mode of a current block. When the intra prediction mode of the current block is a planar mode, an intra prediction mode in an upper-left diagonal direction, an intra prediction mode in an upper-right diagonal direction, or an intra prediction mode of a lower-left diagonal direction, the processor 1610 may determine the reference sample filtering flag to indicate filtering of a reference sample. Also, when the intra prediction mode of the current block is an intra prediction mode corresponding to an intra prediction direction between 0 degree and 45 degrees, the processor 1610 may determine the reference sample filtering flag to indicate filtering of a reference sample. Also, when the intra prediction mode of the current block is an intra prediction mode corresponding to an intra prediction direction between −90 degrees and −135 degrees, the processor 1610 may determine the reference sample filtering flag to indicate filtering of a reference sample. When the intra prediction mode of the current block is a different intra prediction mode other than the aforementioned intra prediction modes, the processor 1610 may determine the reference sample filtering flag to indicate that a reference sample is not to be filtered.

Then, the processor 1610 may determine whether to filter the reference sample, according to the reference sample filtering flag. Also, the processor 1610 may determine the interpolation filter set, according to the reference sample filtering flag.

As described above, a prediction value of the current sample may be determined based on a filtered reference sample or a not-filtered reference sample.

The processor 1610 determines the interpolation filter set to be used in prediction of the current block, based on at least one of the size of the current block and the intra prediction mode indicated by the intra prediction mode information.

According to an embodiment, the processor 1610 may obtain interpolation filter set information indicating the interpolation filter set. The interpolation filter set information may be obtained for a picture unit, a slice unit, a slice segment unit, a tile unit, a CTU unit, or a CU unit. Interpolation filter set information for a luma block may also be applied to a chroma block. Alternatively, interpolation filter set information for the chroma block may be obtained separately from the interpolation filter set information for the luma block. Then, the processor 1610 may determine the interpolation filter set of the current block, based on the interpolation filter set information.

According to an embodiment, the processor 1610 may determine the interpolation filter set, based on the reference sample filtering flag. When reference sample filtering is performed, the processor 1610 may select an interpolation filter set without a smoothing function. In contrast, when the reference sample filtering is not performed, the processor 1610 may select an interpolation filter set with a smoothing function. As another example, when the intra prediction mode of the current block corresponds to the upper-left diagonal direction, and the reference sample filtering is not performed, the processor 1610 may select the interpolation filter set with a smoothing function.

According to an embodiment, the processor 1610 may determine an interpolation filter set, according to whether the size of the current block is greater than the preset block size. For example, when the size of the current block is smaller than the preset block size, the processor 1610 may use only one interpolation filter set. However, when the size of the current block is greater than the preset block size, the processor 1610 may determine an interpolation filter set of the current block from among a plurality of interpolation filter sets.

According to an embodiment, the processor 1610 may determine the interpolation filter set, based on a remainder determined by dividing an index value of the intra prediction mode of the current block by a preset integer. For example, when the preset integer is 2, the remainder of the index value of the intra prediction mode is determined to be 0 or 1. Therefore, when the intra prediction mode is 34, the interpolation filter set of the current block is determined as an interpolation filter set corresponding to the remainder that is 0. When the intra prediction mode is 35, the interpolation filter set of the current block is determined as an interpolation filter set corresponding to the remainder that is 1.

According to an embodiment, when the size of the current block is smaller than the preset block size, the processor 1610 may determine the interpolation filter set of the current block according to the intra prediction mode of the current block. When the current block is small, prediction results of adjacent intra prediction modes are similar, such that encoding of the interpolation filter set information is omitted by determining the interpolation filter set of the current block according to the intra prediction mode. Because the encoding of the interpolation filter set information is omitted, coding efficiency may increase. In contrast, when the size of the current block is greater than the preset block size, the processor 1610 may determine the interpolation filter set of the current block, based on the interpolation filter set information.

According to an embodiment, the processor 1610 may select an interpolation filter set that is most frequently used in the intra prediction mode of the current block, statistically.

According to an embodiment, the processor 1610 may apply a same interpolation filter set to a luma block and a chroma block. In contrast, the processor 1610 may apply different interpolation filter sets to the luma block and the chroma block, respectively.

According to an embodiment, the processor 1610 may determine an interpolation filter set to be used in prediction of a current sample from among a plurality of interpolation filter set candidates. The plurality of interpolation filter set candidates may include at least one of a sharp filter set and a smoothing filter set. The sharp filter set may decrease continuity between adjacent samples and may increase a difference between sample values of the adjacent samples. The smoothing filter set may increase continuity between the adjacent samples and may decrease the difference between the sample values of the adjacent samples.

For example, the plurality of interpolation filter set candidates may include two or more sharp filter sets. Alternatively, the plurality of interpolation filter set candidates may include two or more smoothing filter sets. Alternatively, the plurality of interpolation filter set candidates may include at least one sharp filter set and at least one smoothing filter set.

Alternatively, the plurality of interpolation filter set candidates may include a general interpolation filter without a smoothing function nor a sharpening function. Accordingly, the plurality of interpolation filter set candidates may include the general interpolation filter and at least one sharp filter set or the general interpolation filter and at least one smoothing filter set.

According to an embodiment, the processor 1610 may determine two or more interpolation filter sets for prediction of the current block. The processor 1610 may determine interpolation filter sets for respective current samples from among the two or more interpolation filter sets, according to distance between a reference sample of the current block and the current sample. The processor 1610 may determine an interpolation filter corresponding to a reference location in an interpolation filter set corresponding to a current sample. An interpolation filter set with weak filtering strength may be applied to a current sample in a close range to the reference sample. In contrast, an interpolation filter set with strong filtering strength may be applied to a current sample in a distant range from the reference sample.

In first embodiment, the processor 1610 may select 4 interpolation filter sets so as to predict the current block. The first interpolation filter set may be applied to a current sample directly neighboring the reference sample. The second interpolation filter set may be applied to a current sample distant from the reference sample by 1 pixel. The third interpolation filter set may be applied to a current sample distant from the reference sample by 2 pixels to 3 pixels. The fourth interpolation filter set may be applied to a current sample distant from the reference sample by at least 4 pixels.

In a second embodiment, the first interpolation filter set may be applied to a current sample that directly neighbors the reference sample and a current sample that is distant from the reference sample by 1 pixel. The second interpolation filter set may be applied to a current sample distant from the reference sample by 2 pixels to 3 pixels. The third interpolation filter set may be applied to a current sample distant from the reference sample by 4 pixels to 7 pixels. The fourth interpolation filter set may be applied to a current sample distant from the reference sample by at least 8 pixels.

According to an embodiment of the disclosure, the processor 1610 may determine, based on a size of a current block, a pixel distance between a reference sample and a current sample to which an interpolation filter set is to be applied. For example, when the size of the current block is 4×4, the processor 1610 may use 4 interpolation filter sets for prediction of the current block, according to the first embodiment. Alternatively, when the size of the current block is 8×8, the processor 1610 may use 4 interpolation filter sets for prediction of the current block, according to the second embodiment.

The processor 1610 determines a reference location to which a current sample of the current block refers, according to the intra prediction mode. Then, the processor 1610 determines, in an interpolation filter set, an interpolation filter that corresponds to the reference location.

The reference location is configured of an integer position and a fraction position. The processor 1610 determines reference samples to be applied to the interpolation filter according to the integer position. Then, the processor 1610 determines an interpolation filter in the interpolation filter set, according to the fraction position.

The processor 1610 determines a prediction value of the current sample, according to the reference samples of the current block and the interpolation filter. The processor 1610 may determine the prediction value of the current sample, according to a filter coefficient of the interpolation filter which is determined according to the fraction position and sample values of the reference samples determined based on the integer position. The processor 1610 reconstructs the current block, based on the determined prediction value of the current sample.

Figure 21:
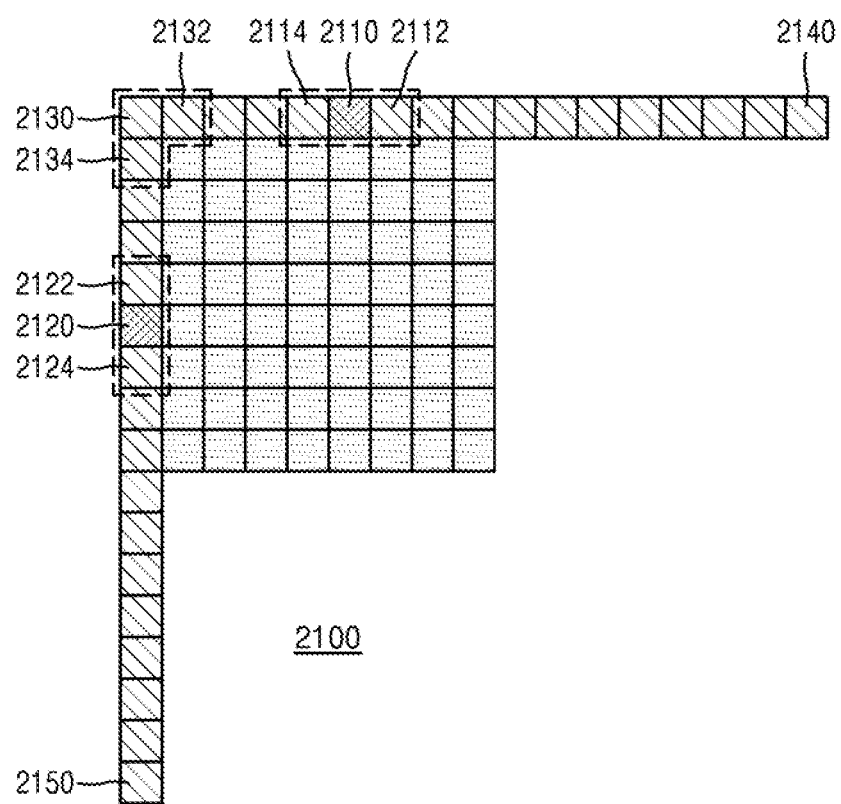
FIG. 21 illustrates an embodiment of a method of filtering a reference sample neighboring a current block.

FIG. 21 illustrates an embodiment of a method of filtering a reference sample neighboring a current block.

As described above, the processor 1610 may determine whether to filter reference samples. According to an embodiment, the processor 1610 may determine whether to filter the reference samples, according to a size of a current block and an interpolation filter set to be used in prediction of a current sample. When it is determined that the reference samples are to be filtered, the reference samples are to be filtered in a manner below.

According to an embodiment, a smoothing filter may be used as a reference sample filter. The number of taps of the smoothing filter may vary in embodiments. The number of taps of the smoothing filter may be 3 in FIG. 21. Therefore, in order to filter a reference sample, the reference sample to be filtered, and two reference samples neighboring the reference sample to be filtered are used.

For example, in order to filter a reference sample 2110 located above a current block 2100, reference samples 2110, 2112, and 2114 are used. In order to filter a reference sample 2120 located in the left of the current block 2100, reference samples 2120, 2122, and 2124 are used. In order to filter a reference sample 2130 located in an upper-left vertex of the current block 2100, reference samples 2130, 2132, and 2134 are used.

According to an embodiment, filter coefficients of a smoothing filter may be [¼, ¾, ¼] in FIG. 21. Therefore, a filtered sample value of the reference sample 2110 may correspond to a value obtained by adding a value obtained by multiplying a sample value of the reference sample 2110 by ¾, a value obtained by multiplying a sample value of the reference sample 2112 by ¼, and a value obtained by multiplying a sample value of the reference sample 2114 by ¼. Equally, a filtered sample value of the reference sample 2120 may correspond to a value obtained by adding a value obtained by multiplying a sample value of the reference sample 2120 by ¾, a value obtained by multiplying a sample value of the reference sample 2122 by ¼, and a value obtained by multiplying a sample value of the reference sample 2124 by ¼. Also, a filtered sample value of the reference sample 2130 may correspond to a value obtained by adding a value obtained by multiplying a sample value of the reference sample 2130 by ¾, a value obtained by multiplying a sample value of the reference sample 2132 by ¼, and a value obtained by multiplying a sample value of the reference sample 2134 by ¼.

According to an embodiment, a reference sample 2140 and a reference sample 2150 which are located in the ends in the reference samples may not be filtered.

According to the filtered reference samples, the prediction value of the current block may be determined.

Figure 22:
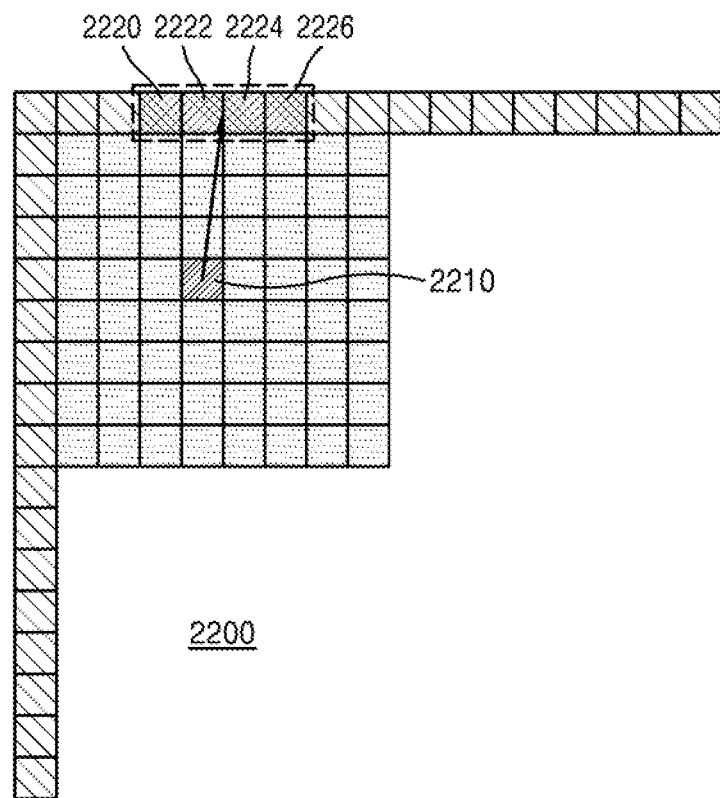
FIGS. 22 and 23 illustrate an embodiment of a method of determining a prediction value of a current block according to an interpolation filter.
Figure 23:
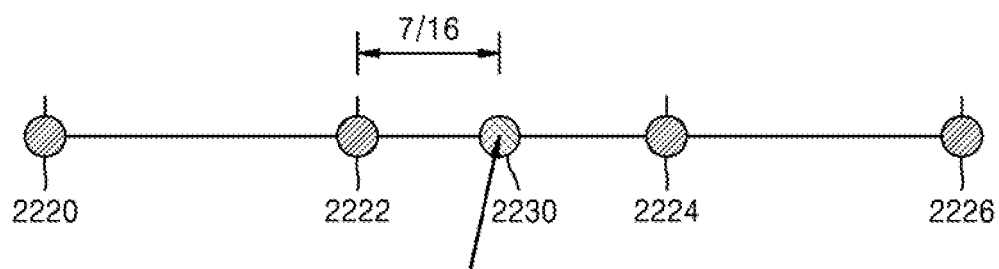

FIGS. 22 and 23 illustrate an embodiment of a method of determining a prediction value of a current block according to an interpolation filter will now be described.

Referring to FIG. 22, in order to determine a prediction value of a current sample 2210, a 4-tap interpolation filter is used. Therefore, a prediction value of the current sample 2210 is determined according to 4 reference samples neighboring a reference location in an intra prediction direction from a location of the current sample 2210. For example, the reference location to which the current sample 2210 refers is between a reference sample 2222 and a reference sample 2224. Therefore, the prediction value of the current sample 2210 is determined by applying an interpolation filter to the reference samples 2220, 2222, 2224, and 2226. All samples of a current block 2200 are determined using a same method applied to the current sample 2210.

Referring to FIG. 23, a reference location 2230 that is located in an intra prediction direction from a location of a current sample is illustrated. An integer position of the reference location 2230 corresponds to a location of a reference sample 2222. A fraction position of the reference location 2230 corresponds to a difference between the reference location 2230 and the reference sample 2222. Referring to FIG. 23, the fraction position of the reference location 2230 is 7/16. Therefore, an interpolation filter that corresponds to the fraction position of 7/16 in an interpolation filter set is used to obtain the prediction value of the current sample 2210.

As described above, the interpolation filter set may be determined based on vertical distances between the current sample 2210 and the reference samples 2220, 2222, 2224, and 2226. Also, the interpolation filter set may be determined according to a size and an intra prediction mode of the current block 2200.

According to an embodiment, the processor 1610 may determine whether to filter the reference samples, according to an interpolation filter set to be used in prediction of a current sample. For example, a reference sample is filtered according to a smoothing filter. Therefore, due to filtering of the reference samples according to the smoothing filter, continuity between the reference samples increases. Accordingly, in a case where the interpolation filter set includes a sharp filter that lowers continuity between the reference samples, it is not necessary to filter the reference samples. Therefore, when a selected interpolation filter set corresponds to a sharp filter set, the processor 1610 may not filter the reference samples.

Alternatively, even when the selected interpolation filter set corresponds to a smoothing filter, the processor 1610 may not filter the reference samples. Because the reference sample is smoothed according to the interpolation filter set, it may not be necessary to previously filter the reference sample according to the smoothing filter. According to an embodiment, when a particular interpolation filter set is selected among a plurality of interpolation filter set candidates, it may be set not to filter a reference sample.

As described above, a prediction value of the current sample may be determined based on a filtered reference sample or a not-filtered reference sample.

The aforementioned technical characteristics of the processor 1610 may be performed by the decoder 170 of FIG. 1B.

Figure 24:
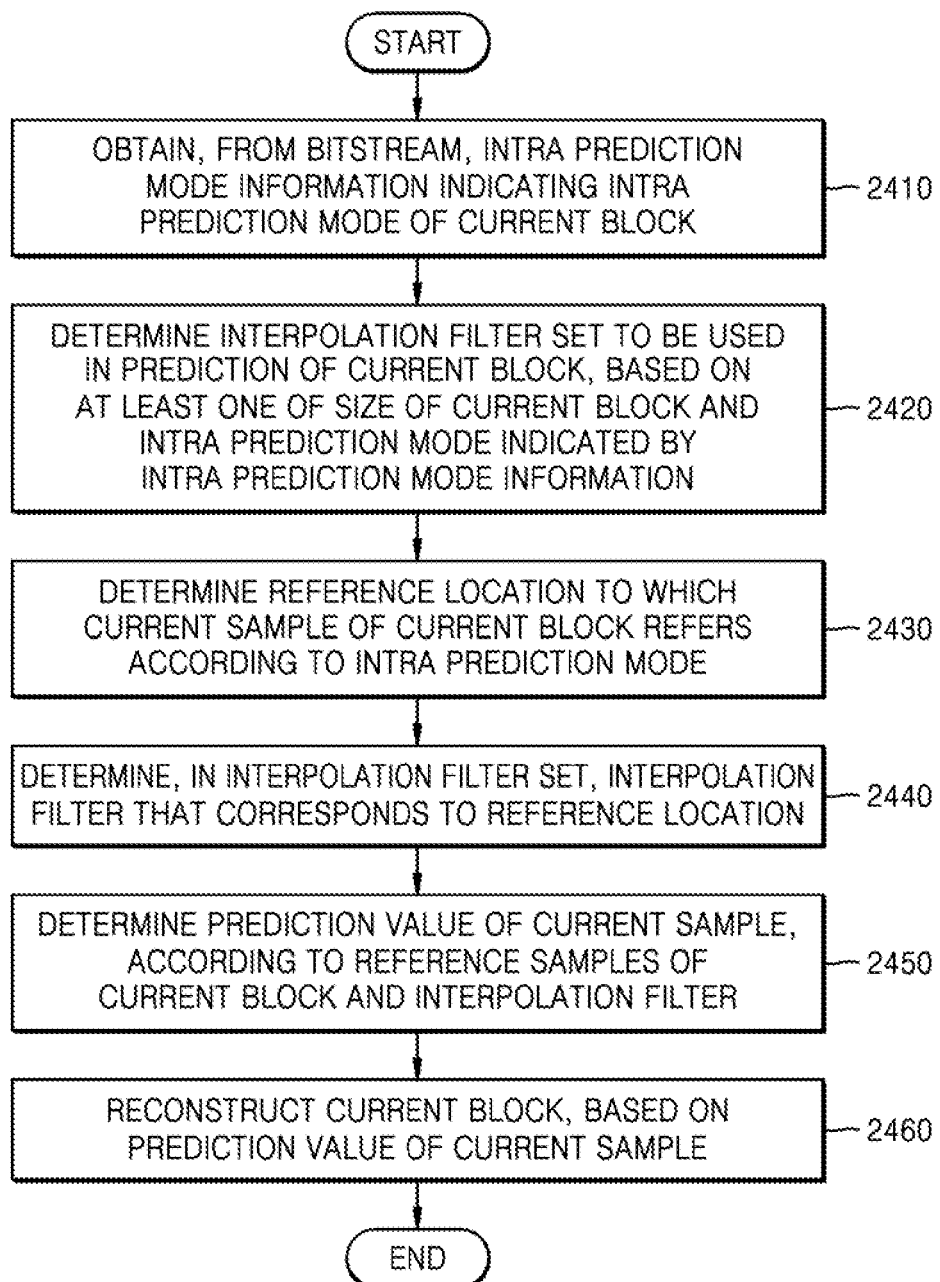
FIG. 24 illustrates a flowchart of a video decoding method including adaptively selecting an interpolation filter for a current block, the interpolation filter being used in intra prediction.

FIG. 24 illustrates a flowchart of a video decoding method including adaptively selecting an interpolation filter for a current block, the interpolation filter being used in intra prediction.

The video decoding method of FIG. 24 may further include determining, from adjacent samples of the current block, reference samples to be used in intra prediction of the current block, according to the intra prediction mode of the current block. The video decoding method of FIG. 24 may include determining whether to filter the reference samples. Also, the video decoding method of FIG. 24 may include filtering the reference samples, according to a reference sample interpolation filter. In operation 2410, a filtered reference sample may be used.

When a size of the current block is greater than a preset block size, the reference samples may be determined to be filtered. Alternatively, whether the reference samples are to be filtered may be determined, according to an interpolation filter set determined in operation 2420. In contrast, the interpolation filter set may be determined in operation 2420, according to whether the reference samples are to be filtered.

In operation 2410, intra prediction mode information indicating an intra prediction mode of the current block is obtained from a bitstream.

In operation 2420, the interpolation filter set to be used in prediction of the current block is determined, based on at least one of the size of the current block and the intra prediction mode indicated by the intra prediction mode information.

According to an embodiment, interpolation filter set information indicating an interpolation filter set may be obtained. Then, the interpolation filter set may be determined based on the interpolation filter set information.

According to an embodiment, the interpolation filter set is determined from among a plurality of interpolation filter set candidates, according to whether the size of the current block is greater than a preset block size.

According to an embodiment, the interpolation filter set is determined from among the plurality of interpolation filter set candidates, based on a remainder determined by dividing an index value of the intra prediction mode of the current block by a preset integer.

According to an embodiment, two or more interpolation filter sets are determined. Then, from among the two or more interpolation filter sets, an interpolation filter set is determined for each of current samples, according to distance between a reference sample of the current block and the current sample. In operation 2440, an interpolation filter that corresponds to a reference location is determined, in the determined interpolation filter set corresponding to the current sample.

In operation 2430, the reference location to which the current sample of the current block refers according to the intra prediction mode is determined.

In operation 2440, the interpolation filter that corresponds to the reference location is determined in the interpolation filter set.

In operation 2450, a prediction value of the current sample is determined, according to the reference samples of the current block and the interpolation filter.

In operation 2460, the current block is reconstructed based on the prediction value of the current sample.

The technical characteristics implemented by the processor 1610 of FIG. 16 may be implemented in the video decoding method of FIG. 24.

Figure 25:
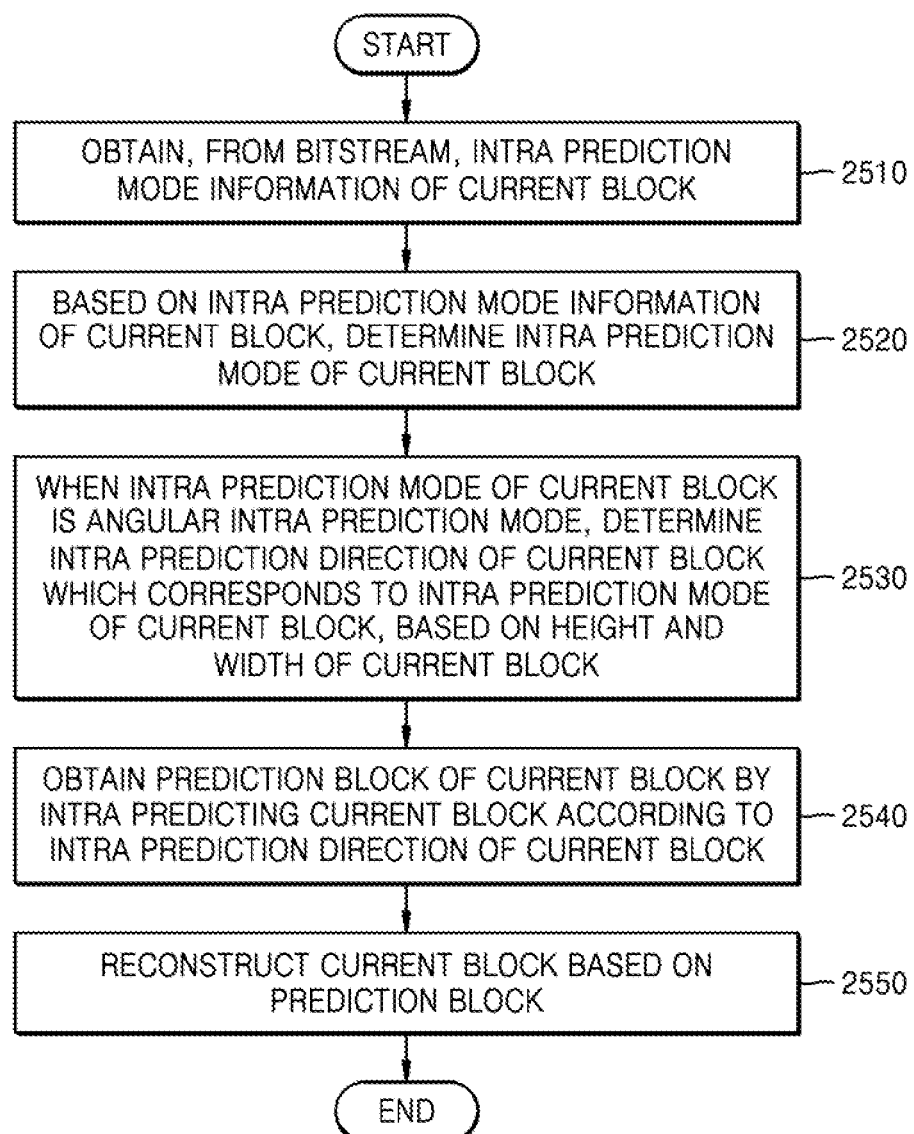
FIG. 25 illustrates a flowchart of a video decoding method of determining intra prediction direction candidates of a current block, based on a shape of the current block, and determining an intra prediction direction of the current block from among the intra prediction direction candidates.

FIG. 25 illustrates a flowchart of a video decoding method of determining intra prediction direction candidates of a current block, based on a shape of the current block, and determining an intra prediction direction of the current block from among the intra prediction direction candidates.

In operation 2510, intra prediction mode information of the current block is obtained from a bitstream.

In operation 2520, based on the intra prediction mode information of the current block, an intra prediction mode of the current block is determined.

In operation 2530, when the intra prediction mode of the current block is an angular intra prediction mode, an intra prediction direction of the current block which corresponds to the intra prediction mode of the current block is determined, based on a height and a width of the current block.

In operation 2540, a prediction block of the current block is obtained by intra predicting the current block according to the intra prediction direction of the current block.

In operation 2550, the current block is reconstructed based on the prediction block.

In operation 2530, when the current block has a square shape where the width and the height are equal, a first intra prediction direction candidate, which is indicated by the intra prediction mode, is determined to be the intra prediction direction of the current block, from among a plurality of first intra prediction direction candidates set based on the square shape.

In operation 2530, when the current block has a non-square shape where the width and the height are not equal, a second intra prediction direction candidate, which is indicated by the intra prediction mode, is determined to be the intra prediction direction of the current block, from among a plurality of second intra prediction direction candidates set based on the non-square shape.

According to an embodiment, in operation 2530, when the current block has a non-square shape whose width is greater than its height, instead of a preset number of intra prediction directions selected in a lower-left direction from among the first intra prediction direction candidates, intra prediction directions set in an upper-right direction other than intra prediction directions included in the first intra prediction direction candidates are included. Also, when the current block has a non-square shape whose height is greater than its width, instead of a preset number of intra prediction directions selected in an upper-right direction from among the first intra prediction direction candidates, intra prediction directions set in a lower-left direction other than intra prediction directions included in the first intra prediction direction candidates are included.

According to an embodiment, in operation 2530, the intra prediction direction included in the second intra prediction direction candidates, other than the intra prediction direction included in the first intra prediction direction candidates, may indicate a direction opposite to a particular direction indicated by a substituted intra prediction direction included in the first intra prediction direction candidates.

According to an embodiment, in operation 2530, when the current block has the non-square shape whose width is greater than its height, the second intra prediction direction candidates may further include an intra prediction direction indicating a direction close to a horizontal direction, and when the current block has the non-square shape whose height is greater than its width, the second intra prediction direction candidates may further include an intra prediction direction indicating a direction close to a vertical direction, in addition to the first intra prediction direction candidates.

According to an embodiment, in operation 2530, an intra prediction direction look-up table according to ratios of the height and the width of the current block may be obtained. When the intra prediction direction look-up table according to the ratios of the height and the width of the current block does not exist, an intra prediction direction look-up table corresponding to ratios of the height and the width with a small difference from ratios of the height and the width of the current block. Then, the intra prediction direction may be determined based on the obtained intra prediction direction look-up table.

According to an embodiment, in operation 2530, an MPM list may be determined by using a prediction mode of a left adjacent block of the current block and a prediction mode of an upper adjacent block of the current block, and the intra prediction mode of the current block may be determined according to the MPM list. When the current block has a non-square shape, priorities of MPMs included in the MPM list may be determined based on the height and the width of the current block.

The technical characteristics implemented by the processor 1610 of FIG. 16 may be implemented in the video decoding method of FIG. 25.

Figure 26:
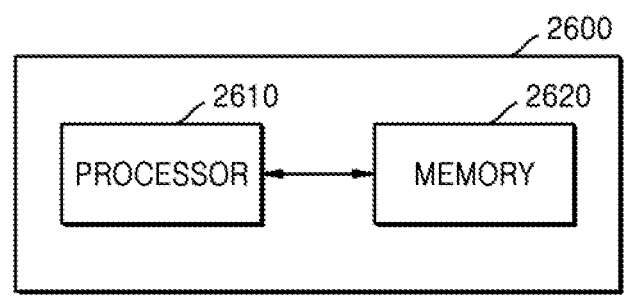
FIG. 26 illustrates a block diagram of a video encoding apparatus 2600 that performs video encoding according to a block intra predicting method.

FIG. 26 illustrates a block diagram of a video encoding apparatus 2600 that performs video encoding according to a block intra predicting method.

Referring to FIG. 26, the video encoding apparatus 2600 according to an embodiment may include a processor 2610 and a memory 2620.

The processor 2610 according to an embodiment may generally control the video encoding apparatus 2600. The processor 2610 according to an embodiment may execute one or more programs stored in the memory 2620.

The memory 2620 according to an embodiment may store various data, program, or application for driving and controlling the video encoding apparatus 2600. The program stored in the memory 2620 may include one or more instructions. The program (the one or more instructions) or the application stored in the memory 2620 may be executed by the processor 2610.

Hereinafter, a video encoding method of determining an optimal intra prediction mode for a current block by adaptively selecting an interpolation filter for a current block, the interpolation filter being used in intra prediction will now be described.

The processor 2610 may determine an intra prediction mode of a current block, according to prediction accuracy of the current block. Prediction accuracies of respective intra prediction modes may be determined in a manner below.

The processor 2610 may determine an interpolation filter set to be used in prediction of the current block, based on at least one of a size and the intra prediction mode of the current block. Then, the processor 2610 may determine a reference location to which a current sample of the current block refers, according to the intra prediction mode.

The processor 2610 may determine, in the interpolation filter set, an interpolation filter corresponding to the reference location. The processor 2610 may determine a prediction value of the current sample by interpolating reference samples of the current block according to the interpolation filter. Then, the processor 2610 may determine prediction accuracy of the current block according to the intra prediction mode, based on the prediction value of the current sample.

The processor 2610 calculates prediction accuracies of the current block with respect to all intra prediction modes, thereby determining the optimal intra prediction mode of the current block.

The processor 2610 may output a bitstream including intra prediction mode information indicating the intra prediction mode of the current block.

Hereinafter, a video encoding method of determining intra prediction direction candidates of a current block, based on a shape of the current block, and determining an intra prediction direction of the current block will now be described.

The processor 2610 may determine, based on a width and a height of the current block, the intra prediction direction candidates that may be applied to the current block.

When the current block has a square shape where the width and the height are equal, the processor 2610 may include a plurality of first intra prediction direction candidates set based on the square shape.

When the current block has a non-square shape where the width and the height are not equal, the processor 2610 may include a plurality of second intra prediction direction candidates including a plurality of intra prediction directions set based on the non-square shape.

The processor 2610 may determine an intra prediction mode of the current block, based on prediction accuracies of prediction blocks according to the intra prediction direction candidates.

The processor 2610 may output a bitstream including intra prediction mode information indicating the intra prediction mode of the current block.

Technical characteristics of video decoding described with reference to the video decoding apparatus 1600 may be applied to the video encoding apparatus 2600. Functions of the processor 2610 may be performed by the encoder 110 of FIG. 1A.

Figure 27:
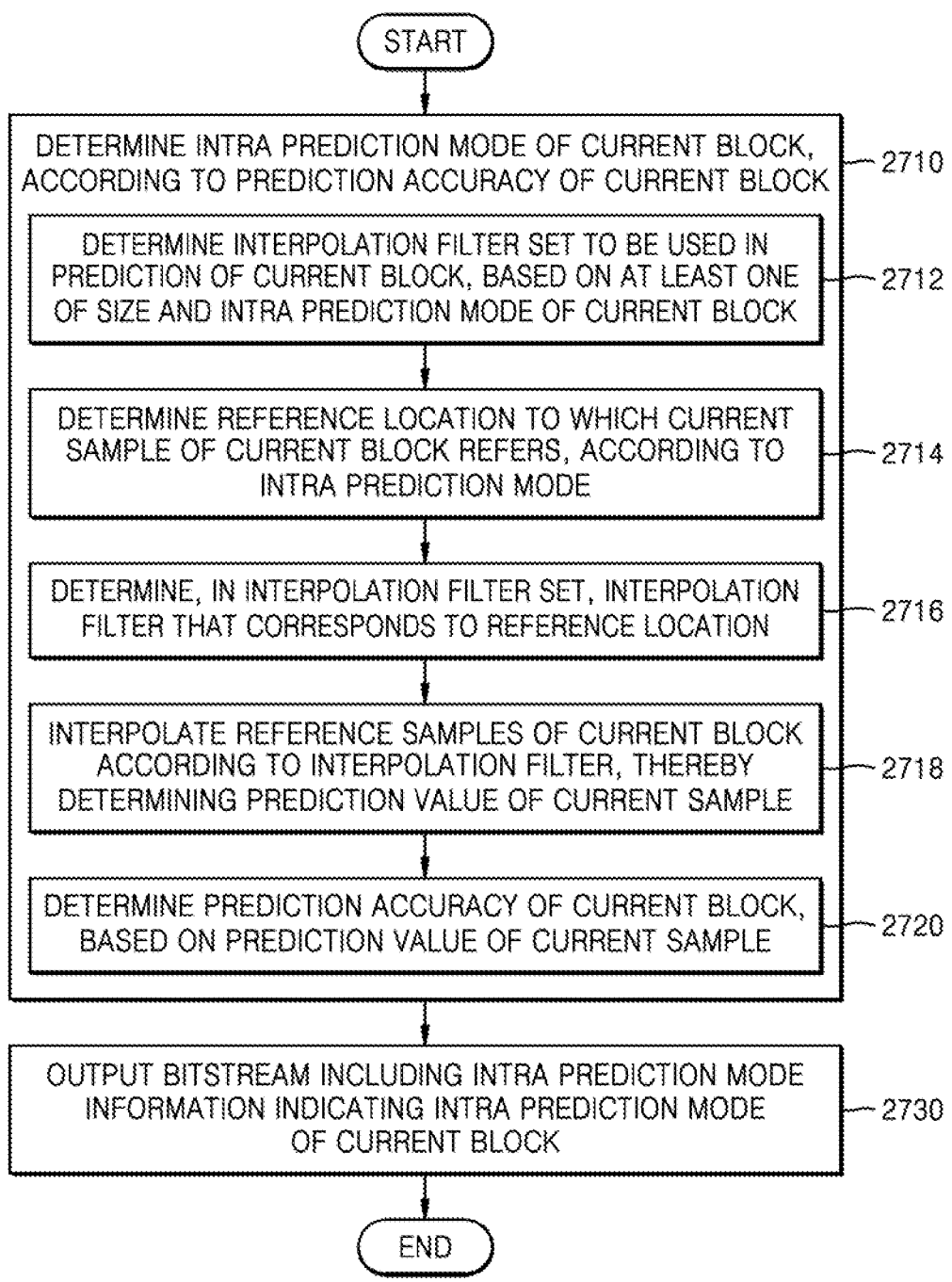
FIG. 27 illustrates a flowchart of a video encoding method including adaptively selecting an interpolation filter for a current block, the interpolation filter being used in intra prediction.

FIG. 27 illustrates a flowchart of a video encoding method including adaptively selecting an interpolation filter for a current block, the interpolation filter being used in intra prediction.

In operation 2710, an intra prediction mode of a current block is determined according to prediction accuracy of the current block.

Operation 2710 includes operation 2712 to operation 2720. According to operation 2712 to operation 2720, the prediction accuracy of the current block according to the intra prediction mode is determined.

The video encoding method may include, in operation 2712, determining an interpolation filter set to be used in prediction of the current block, based on at least one of a size and an intra prediction mode of the current block;

in operation 2714, determining a reference location to which the current sample of the current block refers, according to the intra prediction mode;

in operation 2716, determining, in the interpolation filter set, an interpolation filter that corresponds to the reference location; and in operation 2718, determining a prediction value of a current sample by interpolating reference samples of the current block according to the interpolation filter.

In operation 2720, the prediction accuracy of the current block according to the intra prediction mode is determined, based on the prediction value of the current sample.

In operation 2712 to operation 2720, prediction accuracies of the current block are calculated with respect to all intra prediction modes, such that an optimal intra prediction mode of the current block is determined.

Then, in operation 2730, a bitstream including intra prediction mode information indicating the intra prediction mode of the current block is output.

The technical characteristics implemented by the processor 2610 of FIG. 26 may be implemented in the video encoding method of FIG. 27.

Figure 28:
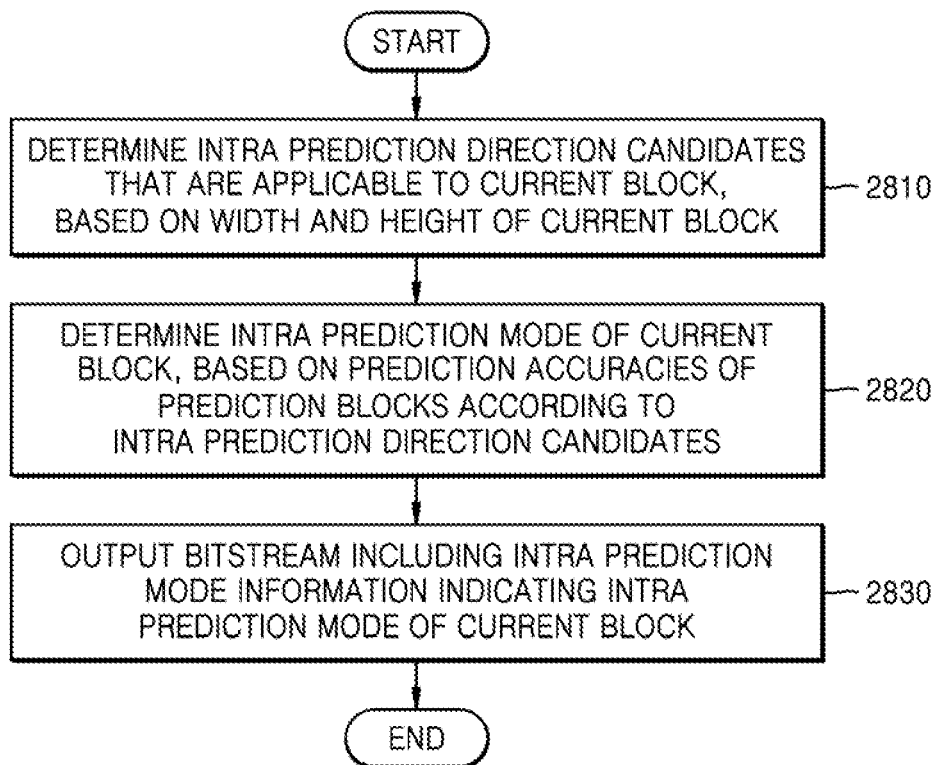
FIG. 28 illustrates a flowchart of a video encoding method of determining intra prediction direction candidates of a current block, based on a shape of the current block, and determining an intra prediction direction of the current block from among the intra prediction direction candidates.

FIG. 28 illustrates a flowchart of a video encoding method of determining intra prediction direction candidates of a current block, based on a shape of the current block, and determining an intra prediction direction of the current block from among the intra prediction direction candidates.

In operation 2810, intra prediction direction candidates that are applicable to a current block are determined, based on a width and a height of the current block.

In operation 2820, an intra prediction mode of the current block is determined, based on prediction accuracies of prediction blocks according to the intra prediction direction candidates.

In operation 2830, a bitstream including intra prediction mode information indicating the intra prediction mode of the current block is output.

In operation 2810, when the current block has a square shape where the width and the height are equal, a plurality of first intra prediction direction candidates set based on the square shape are determined, and when the current block has a non-square shape where the width and the height are not equal, a plurality of second intra prediction direction candidates including a plurality of intra prediction directions set based on the non-square shape are determined.

The technical characteristics implemented by the processor 2610 of FIG. 26 may be implemented in the video encoding method of FIG. 28.

According to a video encoding scheme based on coding units having a tree structure described with reference to FIGS. 1A to 28, image data in a spatial domain is encoded for each of the coding units having the tree structure, and according to a video decoding scheme based on the coding units having the tree structure, decoding is performed on each of largest coding units and the image data in the spatial domain is reconstructed, and thus a video such as a picture and a picture sequence may be reconstructed. The reconstructed video may be reproduced by a reproducing device, may be stored in a storage medium, or may be transmitted over a network.

Meanwhile, the embodiments of the disclosure may be implemented as a computer-executable program, and may be implemented in a general-purpose digital computer that operates the program using a computer-readable recording medium.

While optimal embodiments of the disclosure are described, it will be understood by one of ordinary skill in the art that various substitutes, modifications, and amendments may be made to the one or more embodiments. That is, the substitutes, modifications, and amendments do not depart from the scope of the disclosure and are construed as being included in the disclosure. Therefore, the embodiments should be considered in a descriptive sense only and not for purposes of limitation.

The invention claimed is:

1. A video decoding method comprising:
    obtaining, from a bitstream, intra prediction mode information indicating an intra prediction mode of a current coding block including a current transform block;
    determining reference samples for intra prediction on the current transform block;
    when the intra prediction mode indicated by the intra prediction mode information is an intra prediction mode with a diagonal prediction direction, filtering the reference samples;
    determining a first value among a plurality of values including the first value and a second value as interpolation filter information for the filtered reference samples, wherein the first value indicates a first interpolation filter set and the second value indicates a second interpolation filter set;
    determining the first interpolation filter set, among a plurality of interpolation filter sets including the first interpolation filter set and the second interpolation filter set, based on the interpolation filter information; and
    obtaining prediction samples of the current transform block by performing an interpolation on the filtered reference samples using a plurality of first interpolation filter coefficients in the first interpolation filter set,
    wherein:
        the plurality of first interpolation filter coefficients in the first interpolation filter set are different from a plurality of second interpolation filter coefficients in the second interpolation filter set,
a difference between a maximum coefficient and a minimum coefficient among the plurality of first interpolation filter coefficients is greater than a difference between a maximum coefficient and a minimum coefficient among the plurality of second interpolation filter coefficients, and
the diagonal prediction direction is one of a diagonal direction in the direction of −135 degrees, a diagonal direction in the direction of 135 degrees, and a diagonal direction in the direction of 45 degrees.

2. A video encoding method comprising:
generating intra prediction mode information indicating an intra prediction mode of a current coding block including a current transform block;
determining reference samples for intra prediction on the current transform block;
when the intra prediction mode indicated by the intra prediction mode information is an intra prediction mode with a diagonal prediction direction, filtering the reference samples;
determining a first value among a plurality of values including the first value and a second value as interpolation filter information for the filtered reference samples, wherein the first value indicates a first interpolation filter set and the second value indicates a second interpolation filter set;
determining the first interpolation filter set, among a plurality of interpolation filter sets including the first interpolation filter set and the second interpolation filter set, based on the interpolation filter information; and
generating a bitstream comprising the intra prediction mode information by obtaining prediction samples of the current transform block by performing an interpolation on the filtered reference samples using a plurality of first interpolation filter coefficients in the first interpolation filter set,
wherein:
the plurality of first interpolation filter coefficients in the first interpolation filter set are different from a plurality of second interpolation filter coefficients in the second interpolation filter set,
a difference between a maximum coefficient and a minimum coefficient among the plurality of first interpolation filter coefficients is greater than a difference between a maximum coefficient and a minimum coefficient among the plurality of second interpolation filter coefficients, and
the diagonal prediction direction is one of a diagonal direction in the direction of −135 degrees, a diagonal direction in the direction of 135 degrees, and a diagonal direction in the direction of 45 degrees.

3. A non-transitory computer-readable medium for recording a bitstream, the bitstream comprising:
intra prediction mode information indicating an intra prediction mode of a current coding block including a current transform block,
wherein the intra prediction mode information is obtained by:
generating the intra prediction mode information;
determining reference samples for intra prediction on the current transform block;
when the intra prediction mode indicated by the intra prediction mode information is an intra prediction mode with a diagonal prediction direction, filtering the reference samples;
determining a first value among a plurality of values including the first value and a second value as interpolation filter information for the filtered reference samples, wherein the first value indicates a first interpolation filter set and the second value indicates a second interpolation filter set;
determining the first interpolation filter set, among a plurality of interpolation filter sets including the first interpolation filter set and the second interpolation filter set, based on the interpolation filter information; and
generating the bitstream comprising the intra prediction mode information by obtaining prediction samples of the current transform block by performing an interpolation on the filtered reference samples using a plurality of first interpolation filter coefficients in the first interpolation filter set,
wherein:
the plurality of first interpolation filter coefficients in the first interpolation filter set are different from a plurality of second interpolation filter coefficients in the second interpolation filter set, and
a difference between a maximum coefficient and a minimum coefficient among the plurality of first interpolation filter coefficients is greater than a difference between a maximum coefficient and a minimum coefficient among the plurality of second interpolation filter coefficients, and
the diagonal prediction direction is one of a diagonal direction in the direction of −135 degrees, a diagonal direction in the direction of 135 degrees, and a diagonal direction in the direction of 45 degrees.

\* \* \* \* \*